United States Patent [19]

Kawai et al.

[11] Patent Number: 5,499,112
[45] Date of Patent: Mar. 12, 1996

[54] LIGHT GUIDE, ILLUMINATING DEVICE HAVING THE LIGHT GUIDE, AND IMAGE READING DEVICE AND INFORMATION PROCESSING APPARATUS HAVING THE ILLUMINATING DEVICE

[75] Inventors: Tatsundo Kawai, Hadano; Osamu Hamamoto; Shinichi Takeda, both of Hiratsuka; Satoshi Itabashi, Chigasaki; Toshimitsu Iso, Hiratsuka, all of Japan

[73] Assignee: Cannon Kabushiki Kaisha, Tokyo, Japan

[21] Appl. No.: 183,367

[22] Filed: Jan. 19, 1994

[30] Foreign Application Priority Data

Jan. 19, 1993 [JP] Japan ..................... 5-006925
Apr. 9, 1993 [JP] Japan ..................... 5-105983

[51] Int. Cl.$^6$ ..................................... H04N 1/04
[52] U.S. Cl. ................. 358/475; 358/471; 358/484
[58] Field of Search ..................... 358/475, 474, 358/487, 484, 509, 471, 400; 347/3; 346/107 R; 385/901, 116; 252/227.31; 362/31, 32, 800

[56] References Cited

U.S. PATENT DOCUMENTS

| | | | |
|---|---|---|---|
| 4,371,897 | 2/1983 | Kramer | 358/509 |
| 4,714,983 | 12/1987 | Lang | 362/31 |
| 4,733,332 | 3/1988 | Yamashita et al. | 362/32 |
| 5,005,108 | 4/1991 | Pristash et al. | 362/31 |
| 5,070,431 | 12/1991 | Kitazawa et al. | 362/31 |
| 5,099,343 | 3/1992 | Margerum et al. | 362/31 |
| 5,202,950 | 4/1993 | Arego et al. | 385/901 |
| 5,276,504 | 1/1994 | Zwirner et al. | 362/31 |
| 5,289,351 | 2/1994 | Kashima et al. | 362/31 |
| 5,295,047 | 3/1994 | Windross | 362/31 |
| 5,359,691 | 10/1994 | Tai et al. | 362/32 |

FOREIGN PATENT DOCUMENTS 0058364  5/1981  Japan .................... 358/475

Primary Examiner—Edward L. Coles, Sr.
Assistant Examiner—Fan Lee
Attorney, Agent, or Firm—Fitzpatrick, Cella, Harper & Scinto

[57] ABSTRACT

There is disclosed an illumination device in which a light guide is adapted to emit the light from a face thereof and is provided with an area, on a face opposite to the light emitting face, for diffusing and/or reflecting the light introduced into the light guide from an end face thereof or is provided with uneven light emitting characteristics along the longitudinal direction of the light guide, and the center of the light source positioned at the end of the light guide is placed at a position aberrated from the normal line to said area, whereby attained are compactness, a low cost, a low electric power consumption, a high efficiency of utilization of the light emitted by the light source, and excellent and uniform illumination characteristics. There are also disclosed an image reading device and an information processing apparatus, equipped with the above-mentioned illumination device.

65 Claims, 47 Drawing Sheets

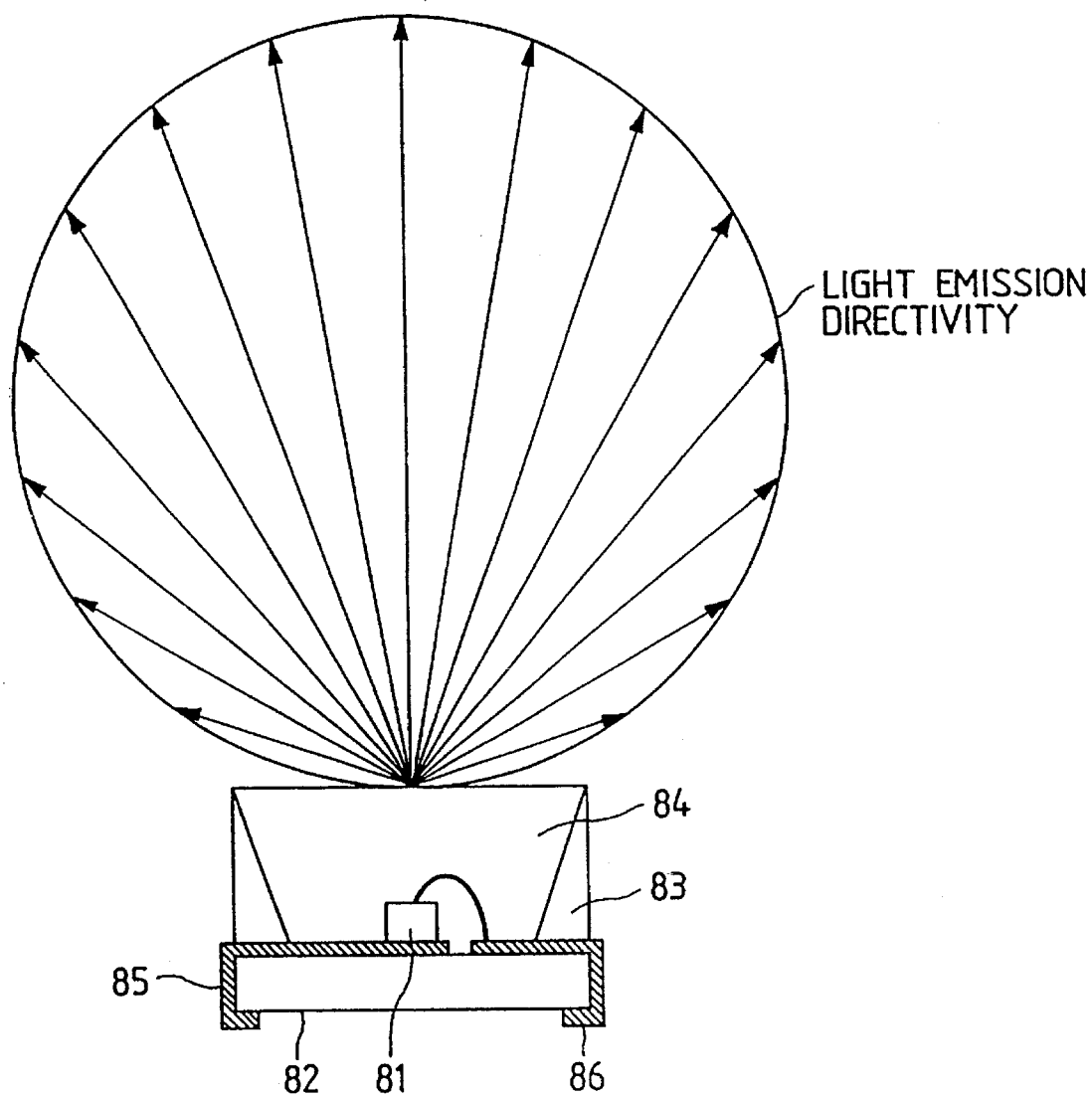

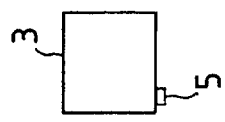
FIG. 17B
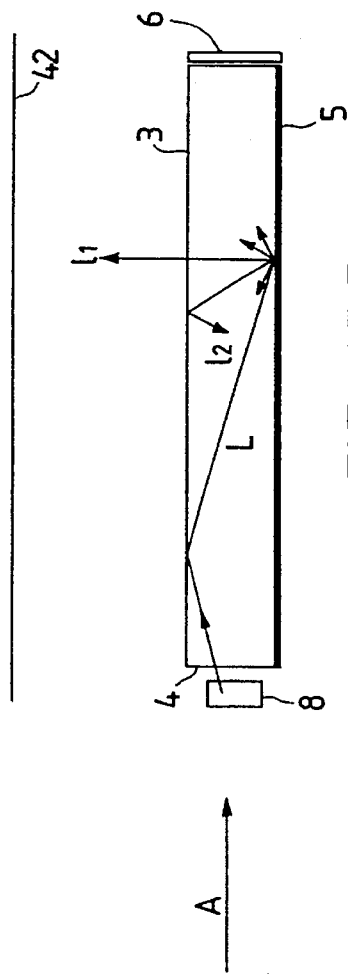
FIG. 17A
FIG. 17C
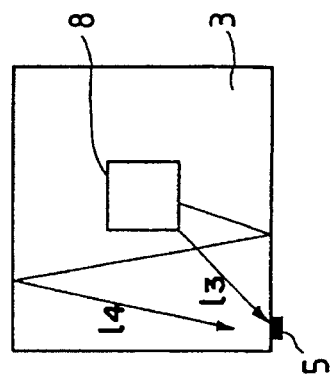
FIG. 18
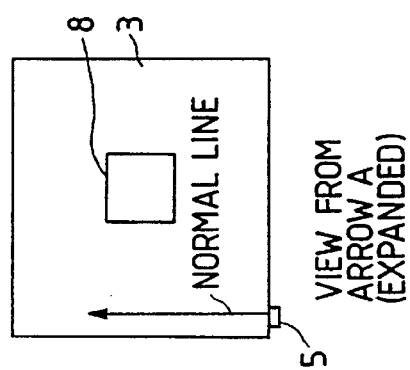
VIEW FROM ARROW A (EXPANDED)

VIEW FROM ARROW A
(EXPANDED)

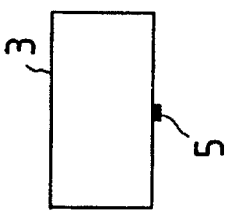
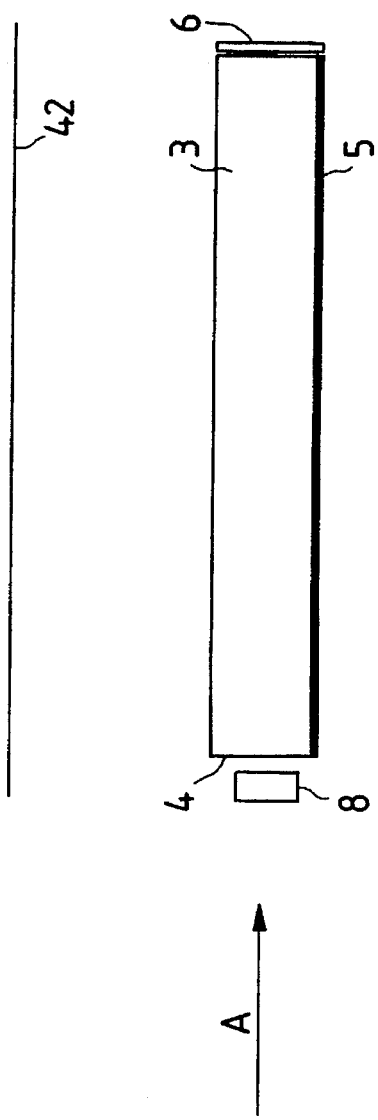
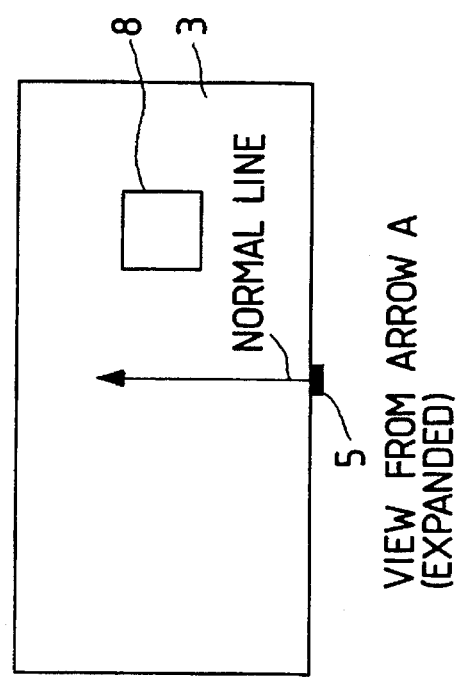

VIEW FROM ARROW A
(EXPANDED)

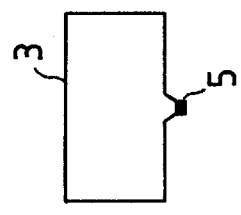
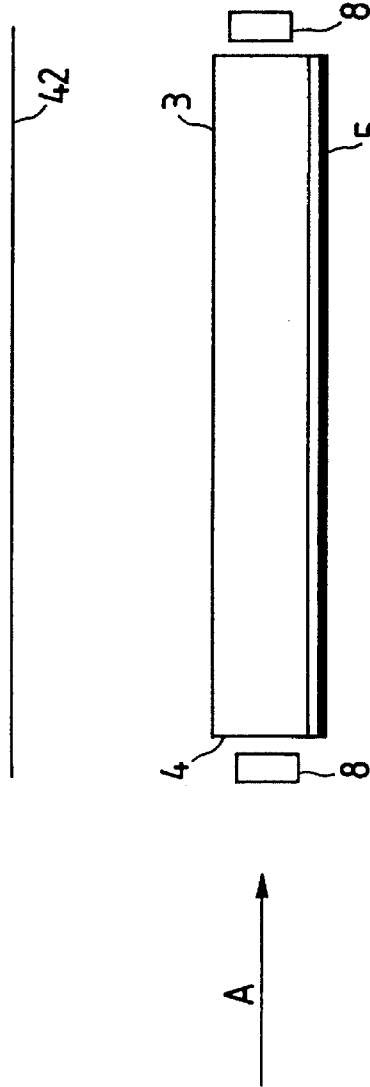
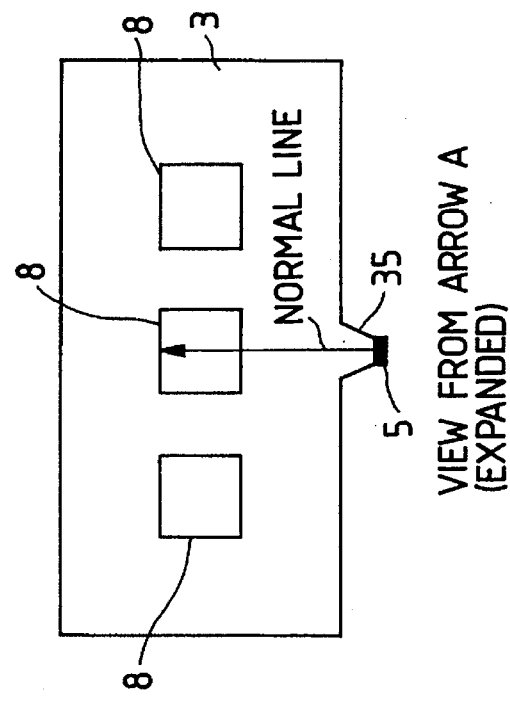

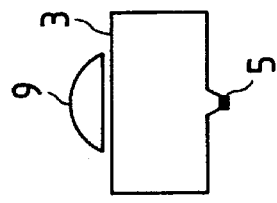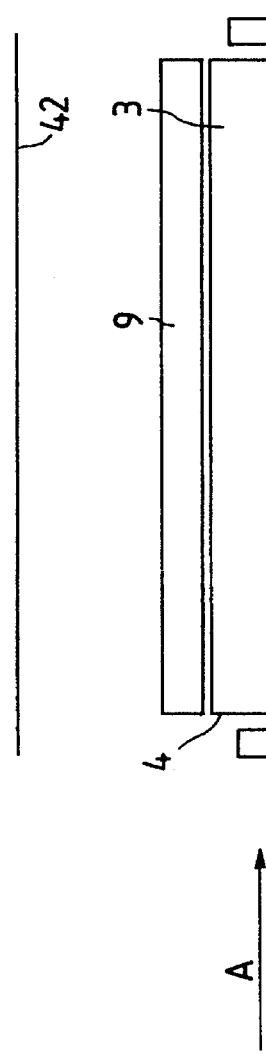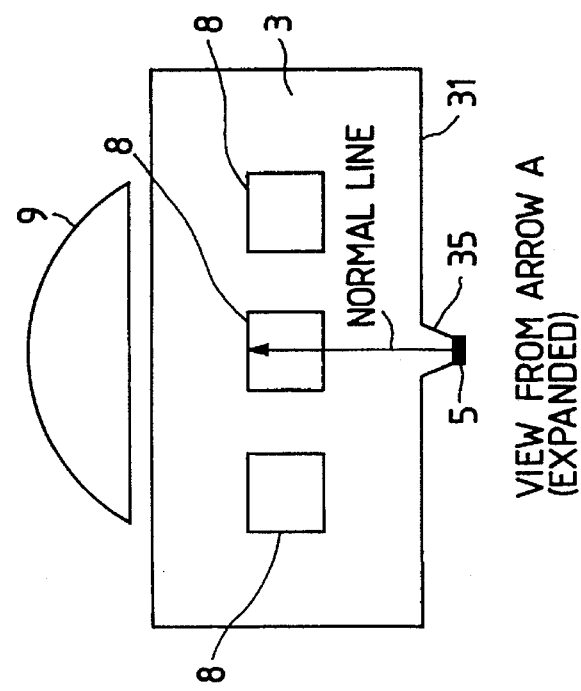

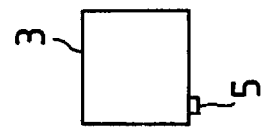
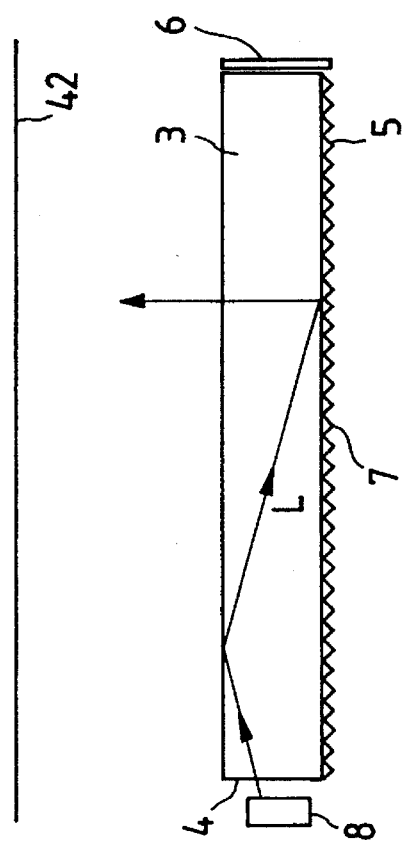
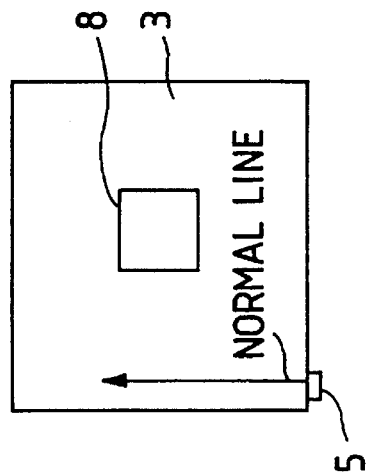

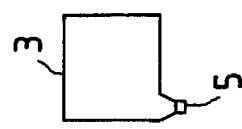
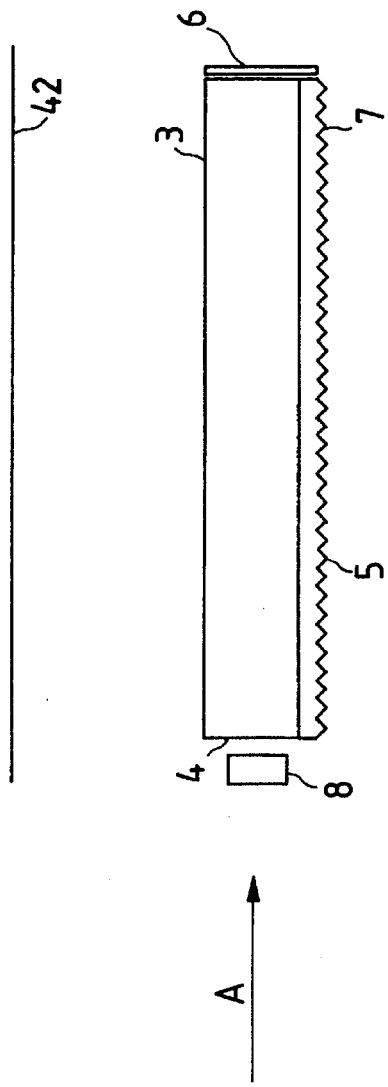
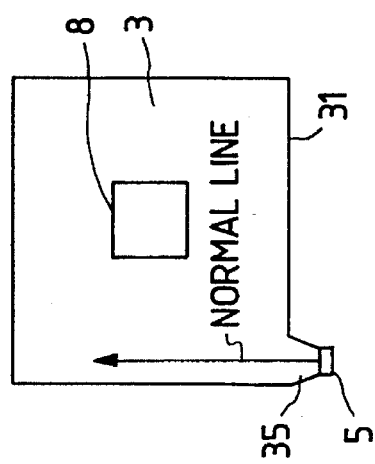

VIEW FROM ARROW A
(EXPANDED)

VIEW FROM ARROW A (EXPANDED)

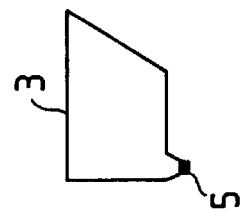
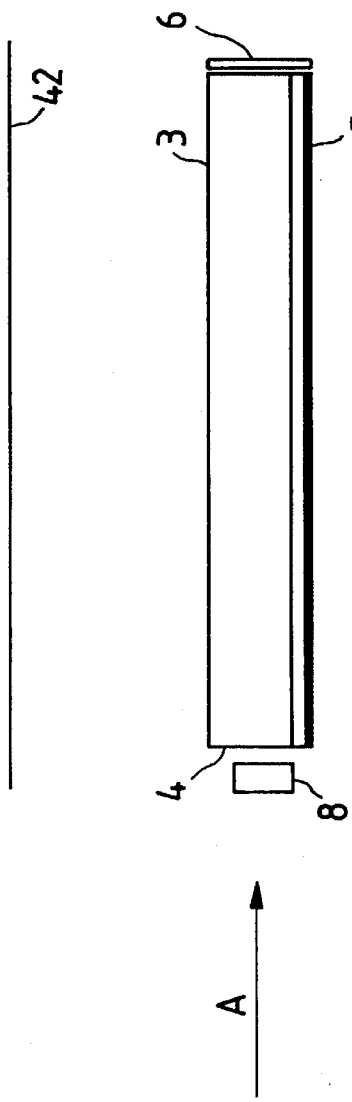
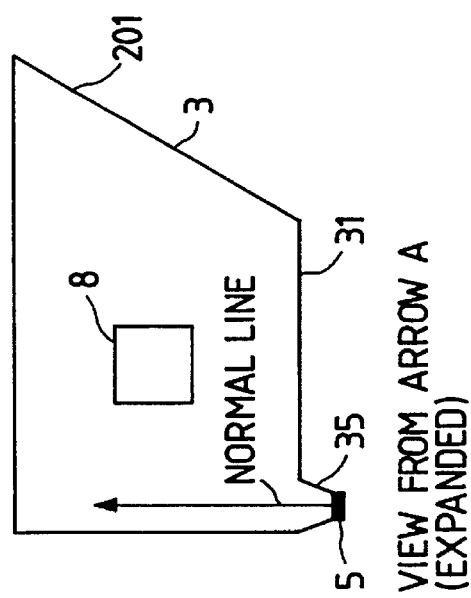

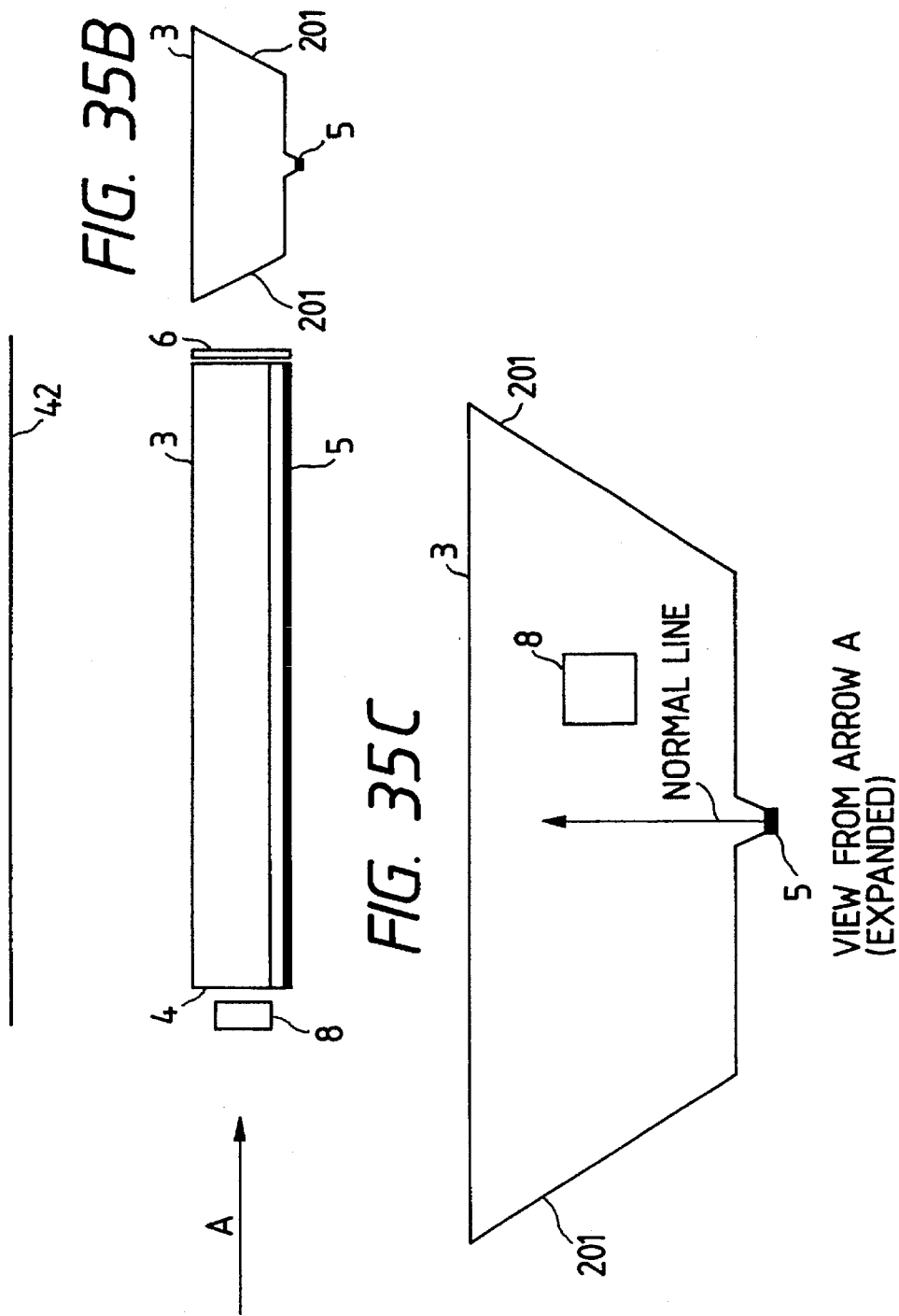

VIEW FROM ARROW A
(EXPANDED)

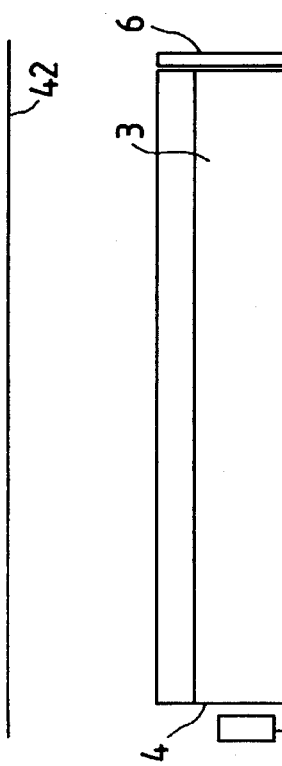
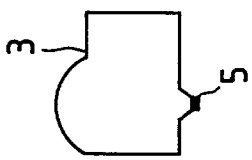
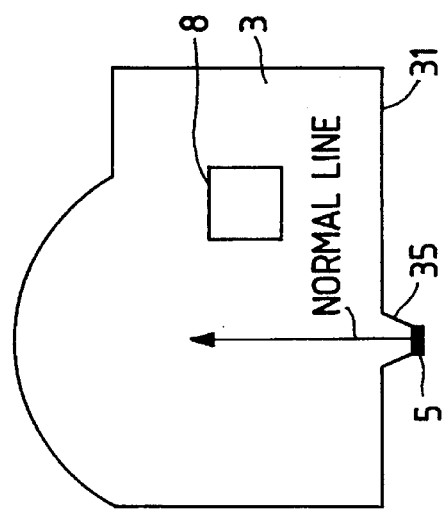
FIG. 42A
FIG. 42B
FIG. 42C
VIEW FROM ARROW A (EXPANDED)

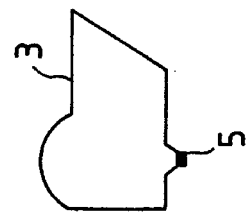
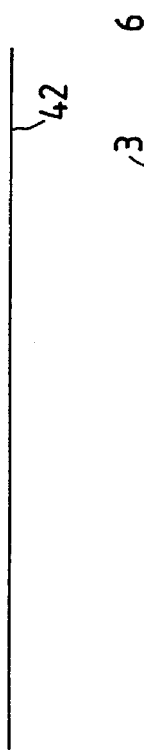
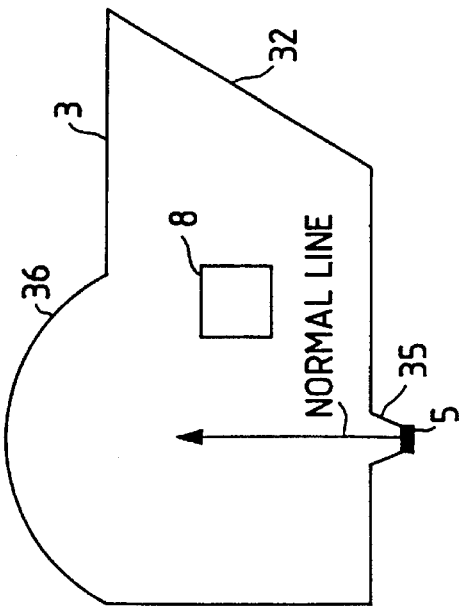

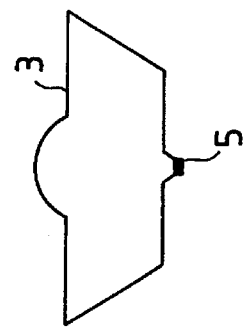
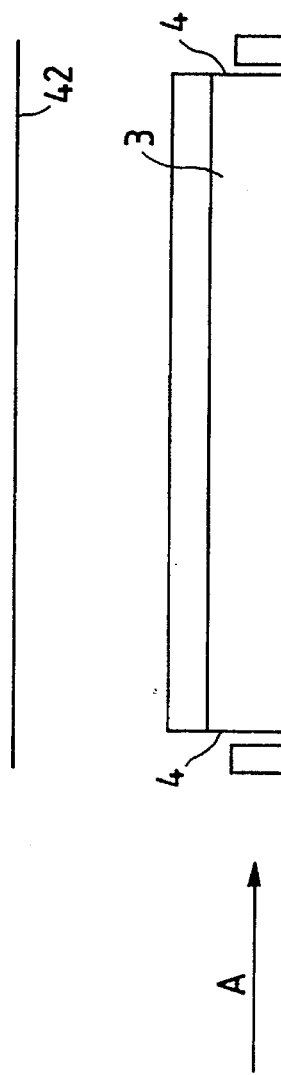
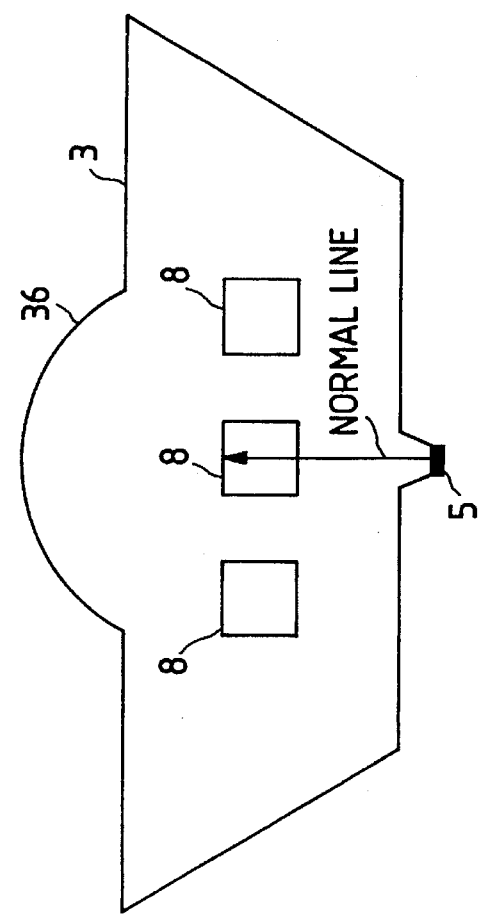

VIEW FROM ARROW A
(EXPANDED)

VIEW FROM ARROW A
(EXPANDED)

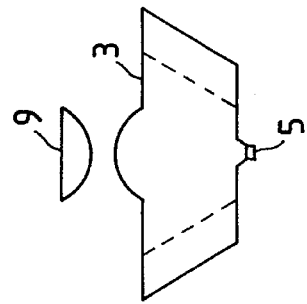
FIG. 51B
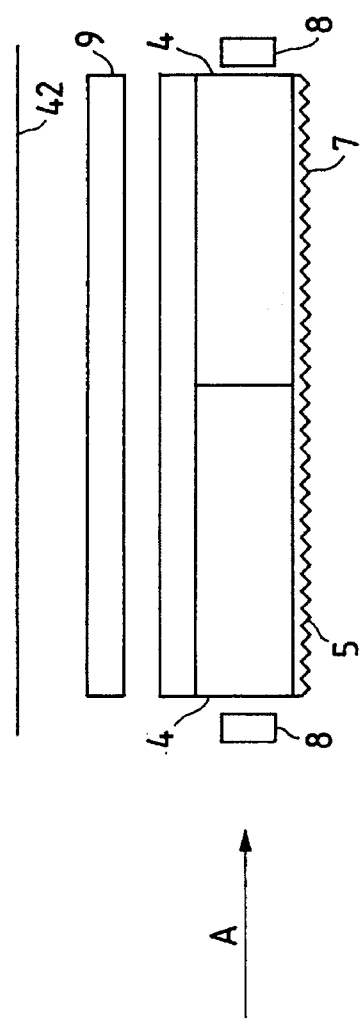
FIG. 51A
FIG. 51C
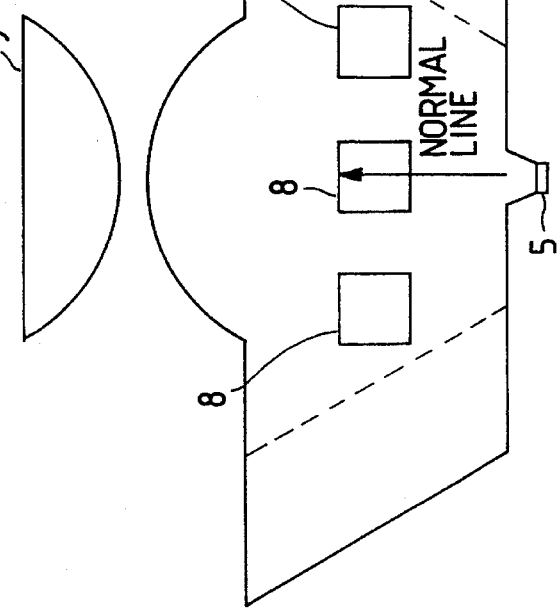
VIEW FROM ARROW A
(EXPANDED)

5,499,112

LIGHT GUIDE, ILLUMINATING DEVICE HAVING THE LIGHT GUIDE, AND IMAGE READING DEVICE AND INFORMATION PROCESSING APPARATUS HAVING THE ILLUMINATING DEVICE

BACKGROUND OF THE INVENTION

1. Field of the Invention

The present invention relates to a light guide, an illuminating device having said light guide, and an image reading device and an information processing apparatus having said illuminating device, and more particularly an information processing apparatus such as copying machine, facsimile apparatus, scanner or electronic blackboard, an image reading device adapted for use in such information processing apparatus, an illumination device adapted for use in such image reading device, and a light guide adapted for use in such illumination device.

2. Related Background Art

For illuminating the image reading device of the information processing apparatus such as the facsimile apparatus, electronic copying machine or the like, there has conventionally been employed a discharge tube such as a fluorescent lamp or an LED array consisting of an array of a plurality of LED's. Particularly in recent years, the LED arrays are being used more widely, because compact and inexpensive products are requested for home-use equipment such as the facsimile apparatus.

An example of the illumination device utilizing such LED array will be explained with reference to FIGS. 1A and 1B, wherein shown are an LED array 41, a plane 42 to be illuminated, such as the surface of an original document, and LED chips 43. FIG. 1A shows the schematic structure of the illumination device employing an LED array, together with the original to be illuminated, while FIG. 1B shows an example of the illumination intensity distribution of the surface of the original when it is illuminated with the illumination device shown in FIG. 1A. As shown in FIG. 1B, a substantially uniform and high illumination intensity can be obtained by increasing the number of the LED chip, namely by densely arranging the LED chips. However, because of the increased number of the LED chips, it is difficult to achieve a sufficiently low cost, and to reduce the power consumption beyond a certain limit even though the power required for individual LED is quite low.

A reduced number of the LED chips, or a less dense arrangement of the LED chips, for the purpose of cost reduction, will result in an uneven illumination intensity distribution on the illuminated surface, due to the increase gap between the LED chips, as will be explained in the following with reference to FIGS. 2A and 2B, wherein same components as those in FIGS. 1A and 1B are represented by same numbers.

FIG. 2A shows the schematic structure of the illumination device utilizing an LED array, together with the illuminated original, as in FIG. 1A, while FIG. 2B shows an example of the illumination intensity distribution when the original is illuminated with the illumination device shown in FIG. 2A. If the number of LED's in the array is decreased, there results, as shown in FIG. 2B, an extremely uneven illumination state in which the illumination intensity on the original surface is high in positions corresponding to the LED chips but is low in positions corresponding to the gaps between the LED chips. The precise original reading becomes difficult under such illumination intensity distribution, and there is required a circuit for compensating the unevenness in the illumination intensity distribution, eventually leading to a higher cost.

FIG. 3 is a schematic perspective view showing the details of a linear light source similar to that explained above.

As shown in FIG. 3, such linear light source is composed of LED chips 43, individually constituting a point light source, mounted linearly on a substrate 45 bearing electric wirings 49, and a voltage is applied between input terminals 48 of said wirings 49 to cause light emission from the LED chips 43, thereby constituting a linear light source.

FIG. 4 shows an elevation view of the light source, seen from a direction C shown in FIG. 3, and the light amount distribution on an illuminated surface (not shown), schematically illustrating the variation of the light amount corresponding to the positions of the LED chips 43. A curve 44 indicating the distribution of the light amount becomes higher in positions directly above the LED chips 43 but lower in positions corresponding to the gaps between said LED chips 43, because of the linear arrangement thereof. As a result, there is formed unevenness in the light amount corresponding to the arrangement of the LED chips 43. In reading image information with such a linear light source, the reflected light from the illuminated surface also involves unevenness in the light amount similar to that shown in FIG. 4, so that a large burden is required in the post-process such as image processing for improving the tonal rendition.

On the other hand, there is conceived a linear light source of the configuration as shown in FIG. 5, in which a light bulb such as a tungsten lamp or a halogen lamp is employed as the light source and the light emitted from said light source is developed into a linear form. In FIG. 5 there are shown an electric light bulb 1 such as a halogen lamp; a mirror 2 of a light condensing form such as spherical or elliptical form; a translucent member 3 with a circular cross section, such as a quartz rod; an entrance face 4 where the light beam emitted from the light bulb 1 enters the translucent member 3; an area 5 for taking out the light beam, propagating in the translucent member 3, from said member by reflection or scattering, said area 5 being formed on a part of the translucent member 3 by forming a coarse surface or coating the surface thereof with light diffusing/reflecting paint; and a reflective face 6 provided at an end of the translucent member 3 opposite to the bulb 1 and formed either by evaporating a metal such as aluminum or applying light diffusing/reflecting, paint on the end face of the translucent member 3 itself, or as a separate member. The translucent member 3 may also have a square or rectangular cross section.

The light beam L, emitted from the light bulb 1 and entering the translucent member 3 through the entrance face 4 thereof propagates in said member 3 by repeated reflections on the internal walls thereof, then is reflected by the end face opposite to the entrance face 4, and propagates again in the interior of the translucent member 3. In the course of repeated reflections, upon entering the above-mentioned area 5, the light beam is scattered therein and a part $l_1$ of said light beam is released to the exterior through an exit face opposite to said area 5. The remaining part $l_2$ of the diffused light beam, entering said exit face diagonally, is totally reflected thereon and propagates in the translucent member. The light reaching the entrance face 4 after repeated propagations is released therethrough to the exterior.

When the light bulb 1 is used as the light source, as the amount of light emission can be increased by the use of a larger electric power, there can be obtained a considerably high illumination intensity despite of the light loss by the light emission to the exterior through the entrance face 4.

However the use of the light bulb is associated with the drawbacks of a large electric power consumption in return for a high illumination intensity, difficulty in compactization of the device because of the larger heat generation, and lack of maintenance-free character as in the case of LED, since the electric light bulb has a service life considerably shorter than even that of the fluorescent lamp and has to be replaced when the light amount becomes low or when the filament is broken.

Consequently, the illumination device to be employed as the image reading light source for an information processing apparatus such as facsimile apparatus preferably employs LED's as the light source and is adapted to emit the light beam from said LED's in a linear form. As another example of the illumination device employing the LED chips as the light source, there has been conceived a configuration shown in FIGS. 6A and 6B, which respectively are a schematic view of the illumination device together with an original to be illuminated, and a chart showing an example of the illumination intensity distribution on the illuminated surface 42 when the original is illuminated with the device shown in FIG. 6A. More specifically, the illumination device shown in FIG. 6A is similar to that shown in FIG. 5 except that the light source is replaced by an LED light source 71. In FIG. 6A, the components equivalent to those in FIG. 5 are represented by same numbers.

The LED light source is available in various types, among which there is known so-called surface mounting LED chip convenient for compactization and actual mounting. FIG. 7 illustrates such surface mounting LED light source, wherein shown are an LED chip 81; a substrate 82; a reflecting frame 83; translucent resin 84 and electrodes 85, 86 formed on the substrate 82. Such LED light source is already available in a compact form, with the size of the light source itself of 2–3 mm and the height of 2 mm or less. As the electrodes 85, 86 are extended to the rear side of the substrate 82 through the lateral faces thereof, the light source can be efficiently mounted on the mounting substrate, merely by placing on said mounting substrate printed with cream solder and heating in a reflow oven. Consequently the use of such LED light source is more desirable for constructing a linear light source.

However, since such LED light source has a directionality in the light emission as shown in FIG. 7, in illuminating the original in combination with the translucent member 3 as shown in FIG. 6A, there will result an unevenness in the illumination intensity distribution, which is higher at the side of the LED light source 71 and is lower in the remaining part, as shown in FIG. 6B.

This is because the lights diagonally emitted from the LED light source 71 directly enter the area 5 of the translucent member 3 are scattered in said area 5 and released from the translucent member 3.

FIG. 8 is a schematic perspective view of another example of the conventional linear light source, in which light sources are provided on both ends of an oblong translucent member constituting a light guide 3. In FIG. 8, the light is emitted in a direction $1_1$. The oblong translucent member 3 has a constant cross section, and the faces thereof are formed as mirrors except for the light-emitting face. The light is introduced from LED chips 71 provided on substrates 45 into the oblong translucent member 3 through the end faces thereof, and is released to the exterior either directly or after reflection by the mirror faces of said translucent member 3. FIG. 9 shows an elevation view, seen from a direction D shown in FIG. 8 and the illumination intensity distribution on the illuminated surface (not shown). As shown in FIG. 9, there is obtained a uniform light amount within an area a–c but the level of light amount is low and is considerably different from that in the vicinity of the light source. 10a, 10b and 10c are cross sections at the positions a, b and c of the oblong translucent member 3, and 44a, 44b and 44c indicate the illumination intensity distributions at the corresponding positions. Also hatched portions represent mirror faces (except for the light emitting face and light entering faces of the oblong translucent member 3).

SUMMARY OF THE INVENTION

An object of the present invention is to resolve the drawbacks, associated with the conventional illumination means utilizing the linear array of LED chips and with the information processing apparatus employing such illumination means, of the difficulty in achieving a sufficiently low cost resulting from a large number of LED chips to be used, the limit in reducing the electric power consumption even though the electric power consumption in individual LED chip is considerably low, the uneven illumination state where the illumination intensity on the illuminated original is high in positions corresponding to the LED chips but is low in positions corresponding to the gaps between the LED chips, encountered when the number of the LED chips is reduced in said array, the uneven illumination intensity on the illuminated original encountered when the LED chips are positioned at the end faces of the translucent member, and the cost increase resulting from the necessity for a circuit for compensating the unevenness in the illumination intensity.

Another object of the present invention is to resolve the drawbacks, associated with the conventional illumination means utilizing the electric light bulb and with the information processing apparatus employing such illumination means, of the large electric power consumption, the difficulty in compactization of the device because of the large heat generation, and the difficulty in attaining the maintenance-free configuration.

Still another object of the present invention is to provide an illumination device featured by high uniformity in the illumination intensity, a low electric power consumption and easy compactization, a light guide adapted for use in said illumination device, and an information processing apparatus utilizing said illumination device.

Still another object of the present invention is to resolve the drawbacks of the unevenness in the illumination intensity and of the significant difference in the illumination intensity between a side close to the LED light source and the opposite side, when the LED is employed as the light source for a linear illumination device.

Still another object of the present invention is to provide a light guide having a light entrance face at an end thereof and a light exit face for emitting the introduced light, along the longitudinal direction, different from said end face comprising an area provided along said longitudinal direction in a part of the side opposite to the light exit face and adapted to reflect and/or diffuse the light beam introduced into said translucent member.

Still another object of the present invention is to provide an illumination device provided with a translucent member having a light entrance face at an end thereof and a light exit face for emitting the introduced light on a face, along the longitudinal direction, different from said end face, and a light source for emitting the light beam to be introduced through said light entrance face, wherein said translucent member comprises an area provided along said longitudinal direction on a part of the side opposite to said light exit face and adapted to reflect and/or diffuse the light introduced into said translucent member, and the center of said light source is aberrated from the direction of normal line to said area.

Still another object of the present invention is to provide an information processing apparatus provided with:

(a) a photoelectric converting device having a plurality of photoelectric converting elements positioned opposite to the image of an original sheet to be read;

(b) an illumination device for illuminating said original sheet;

(c) transport means for transporting said original sheet;

(d) an output unit for recording an image on a sheet by electrical signals corresponding to image information; and (e) a controller for controlling said photoelectric converting device, said light source, said transport means and said output unit;

wherein said illumination means includes an illumination device provided with a translucent member having a light entrance face at an end thereof and a light exit face for emitting the introduced light, along the longitudinal direction, different from said end face, and a light source for emitting the light beam to be introduced through said light entrance face, wherein said translucent member comprises an area provided along said longitudinal direction on a part of the side opposite to said light exit face and adapted to reflect and/or diffuse the light introduced into said translucent member, and the center of said light source is aberrated from the direction of normal line to said area.

Still another object of the present invention is to provide an image reading device including an illumination device provided with a translucent member having a light entrance face at an end thereof and a light exit face for emitting the introduced light, along the longitudinal direction, different from said end face, and a light source for emitting the light beam to be introduced through said light entrance face, and also including a photoelectric converting device for receiving the light emitting from said light exit face and reflected by an illuminated area, wherein said translucent member comprises an area provided along said longitudinal direction on a part of the side opposite to said light exit face and adapted to reflect and/or diffuse the light introduced into said translucent member, and the center of said light source is aberrated from the direction of normal line to said area.

Still another object of the present invention is to provide a light guide for use in an illumination device, composed of a translucent member adapted to receive the light from a light source through a face of said translucent member and to emit the light through a lateral face thereof, wherein said translucent member has uneven light emission characteristics in the longitudinal direction thereof.

Still another object of the present invention is to provide an illumination device including a light source positioned on a face of a translucent member and adapted to emit the light from a lateral face of said translucent member, therein said translucent member has uneven light emission characteristics along the longitudinal direction thereof.

Still another object of the present invention is to provide an image reading device provided with an illumination device including a light source positioned on a face of a translucent member and adapted to emit the light from a lateral face of said translucent member, and a photoelectric converting device adapted to receive the light emitted by said illumination device and reflected by an illuminated area, wherein said translucent member has uneven light emission characteristics along the longitudinal direction thereof.

Still another object of the present invention is to provide an information processing apparatus provided with:

(a) a photoelectric converting device including a plurality of photoelectric converting elements positioned opposite to the image of an original sheet to be read;

(b) an illumination device for illuminating said original sheet, said device including a light source positioned on a face of a translucent member and adapted to emit the light from a lateral face thereof;

(c) transport means for transporting said original sheet;

(d) an output unit for recording an image on a sheet by electrical signals corresponding to the image information; and (e) a controller for controlling said photoelectric converting device, said light source, said transport means and said output unit;

wherein said translucent member of said illumination means has uneven light emission characteristics along the longitudinal direction thereof.

BRIEF DESCRIPTION OF THE DRAWINGS

FIG. 7 is a schematic cross-sectional view showing an example of the LED light source;

FIGS. 17A to 17C are views showing preferred embodiments of the light guide and the illumination device of the present invention;

FIG. 18 is a view showing preferred embodiments of the light guide and the illumination device of the present invention;

FIGS. 21A to 21C are views showing preferred embodiments of the light guide and the illumination device of the present invention;

FIGS. 24A to 24C are views showing preferred embodiments of the light guide and the illumination device of the present invention;

FIGS. 25A to 25C are views showing preferred embodiments of the light guide and the illumination device of the present invention;

FIGS. 26A to 26C are views showing preferred embodiments of the light guide and the illumination device of the present invention;

FIGS. 29A to 29C are views showing preferred embodiments of the light guide and the illumination device of the present invention;

FIGS. 34A to 34C are views showing preferred embodiments of the light guide and the illumination device of the present invention;

FIGS. 35A to 35C are views showing preferred embodiments of the light guide and the illumination device of the present invention;

FIGS. 42A to 42C are views showing preferred embodiments of the light guide and the illumination device of the present invention;

FIGS. 43A to 43C are views showing preferred embodiments of the light guide and the illumination device of the present invention;

FIGS. 45A to 45C are views showing preferred embodiments of the light guide and the illumination device of the present invention;

FIGS. 51A to 51C are views showing preferred embodiments of the light guide and the illumination device of the present invention;

DETAILED DESCRIPTION OF THE PREFERRED EMBODIMENTS

In the illumination device consisting of the aforementioned linear light source, the total light amount is low and the light intensity distribution is uneven as explained before. This is because the light from the light source consisting of the LED chip is not emitted, in uniform and sufficient manner, from the oblong translucent member (light guide) 3 to the exterior.

According to the present invention, the oblong translucent member (light guide) is given uneven light emission characteristics along the longitudinal direction thereof, thereby attaining almost uniform light emission characteristics along the longitudinal direction over the entire linear light source. Thus the difference in the light amount between an area close to the light source and an area far from the light source can be reduced, and there can thus be realized a linear light source showing reduced unevenness in the light amount on the illuminated surface.

Also there can be realized an illumination device with reduced unevenness in the light amount, by providing the translucent member with an area for reflecting and/or diffusing the light introduced into said member and specifying the position of said area.

Now the present invention will be clarified in detail by preferred embodiments thereof, shown in the attached drawings.

[Embodiment 1]

Figure 1A:
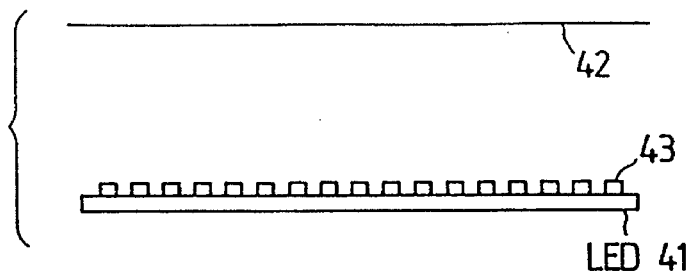
FIGS. 1A, 1B, 2A, 2B, 3 and 4 are views showing examples of the illumination device utilizing an LED array.
Figure 1B:
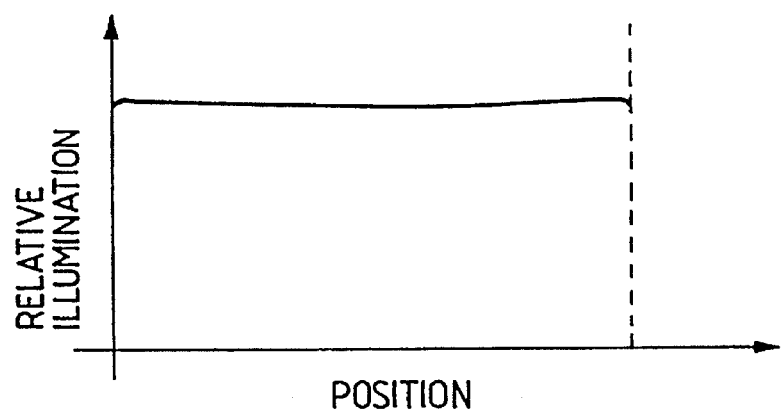
Figure 2A:
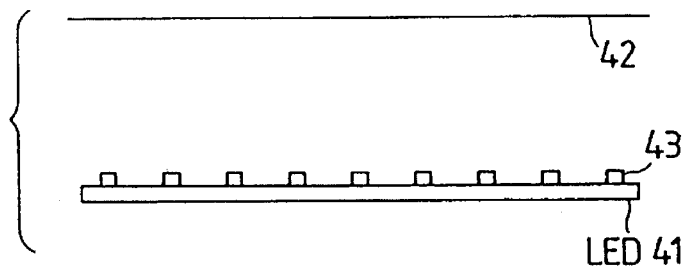
Figure 2B:
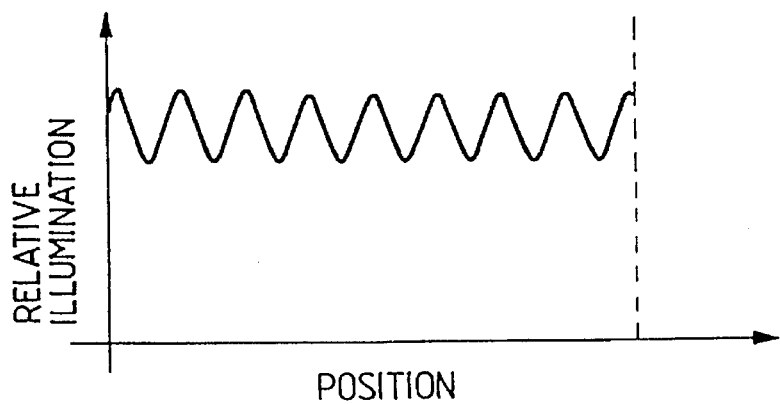
Figure 3:
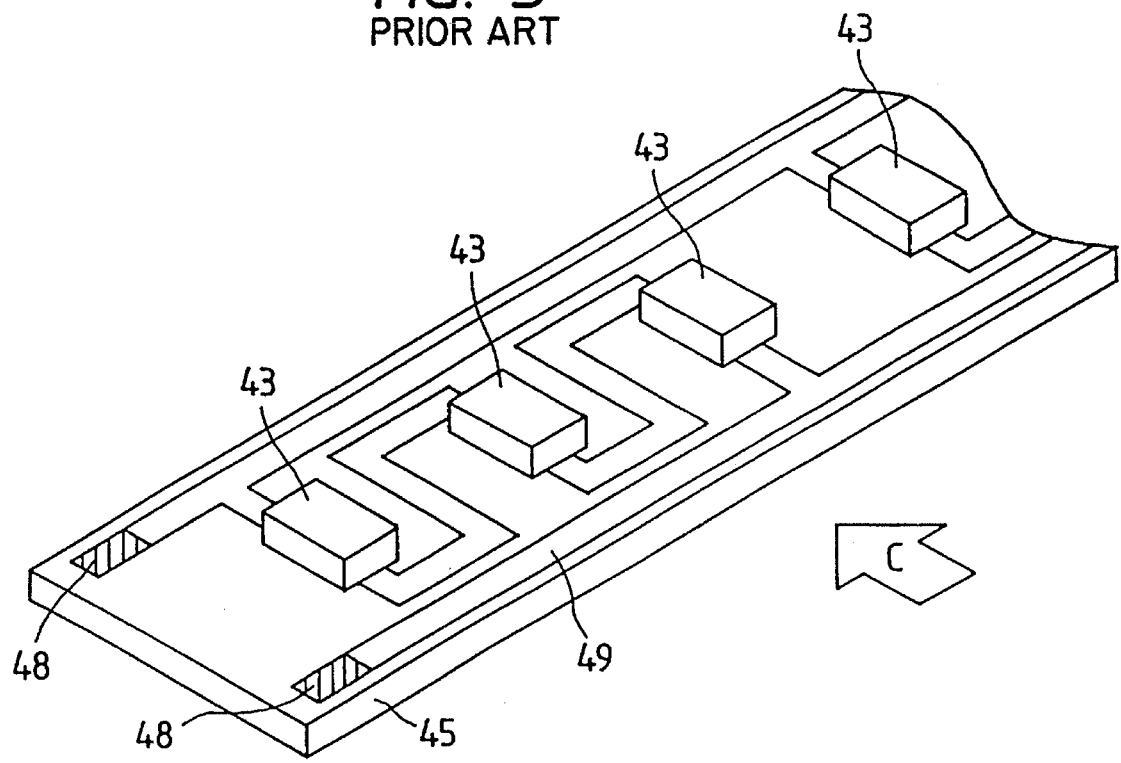
Figure 4:
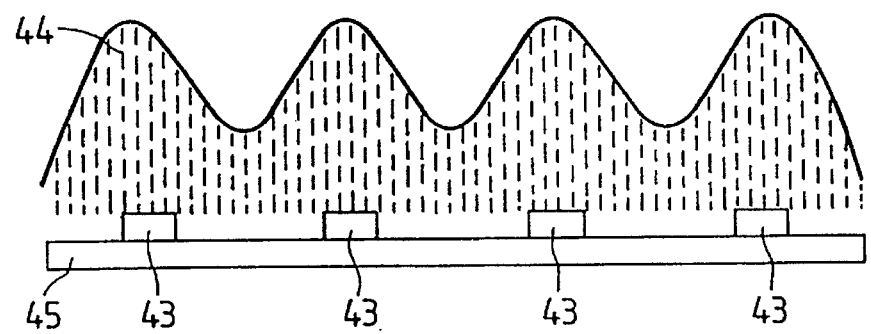
Figure 5:
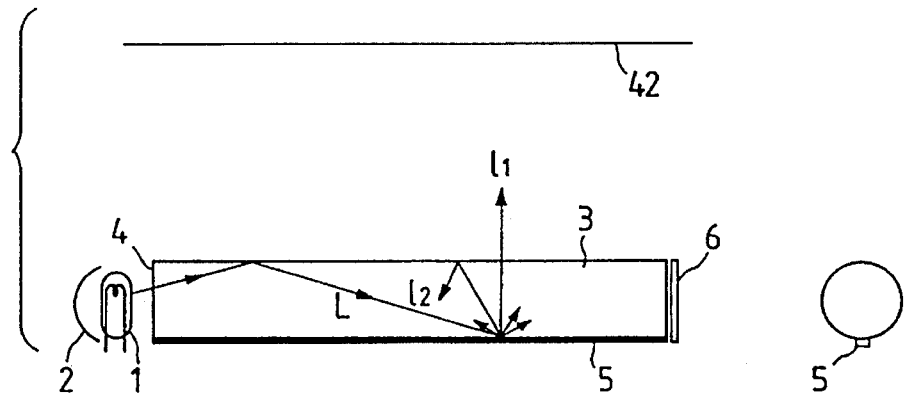
FIGS. 5, 6A and 6B are views showing examples of the illumination device utilizing a translucent member.
Figure 6A:
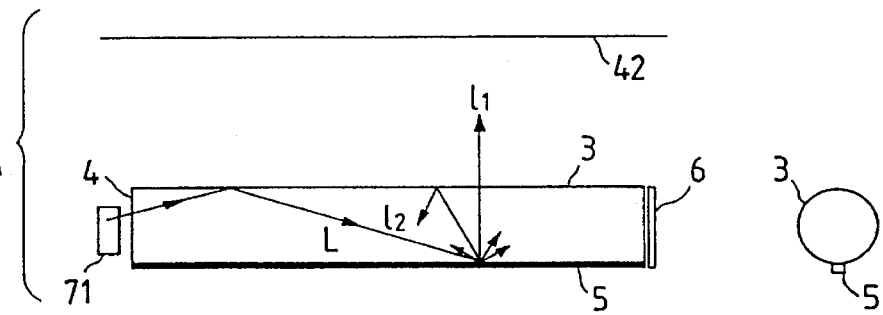
Figure 6B:
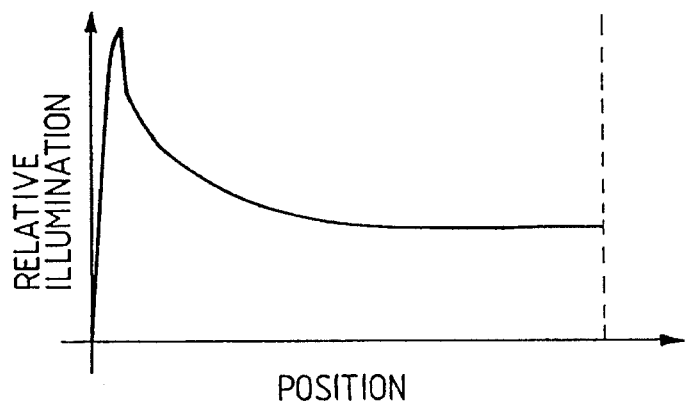
Figure 8:
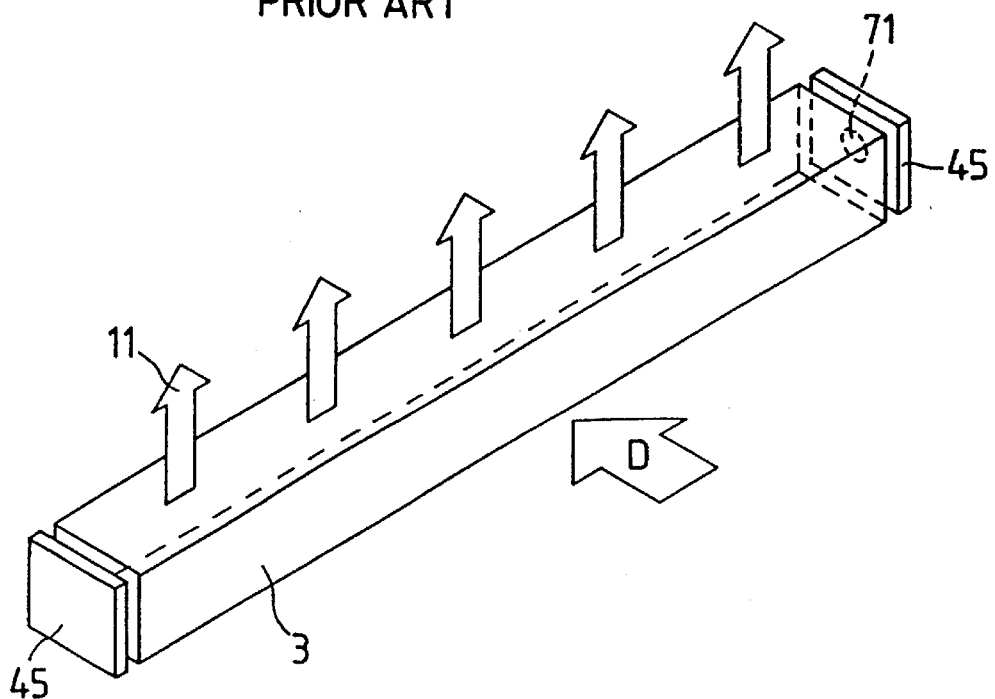
FIG. 8 is a view showing preferred embodiments of the light guide and the illumination device of the present invention.
Figure 9:
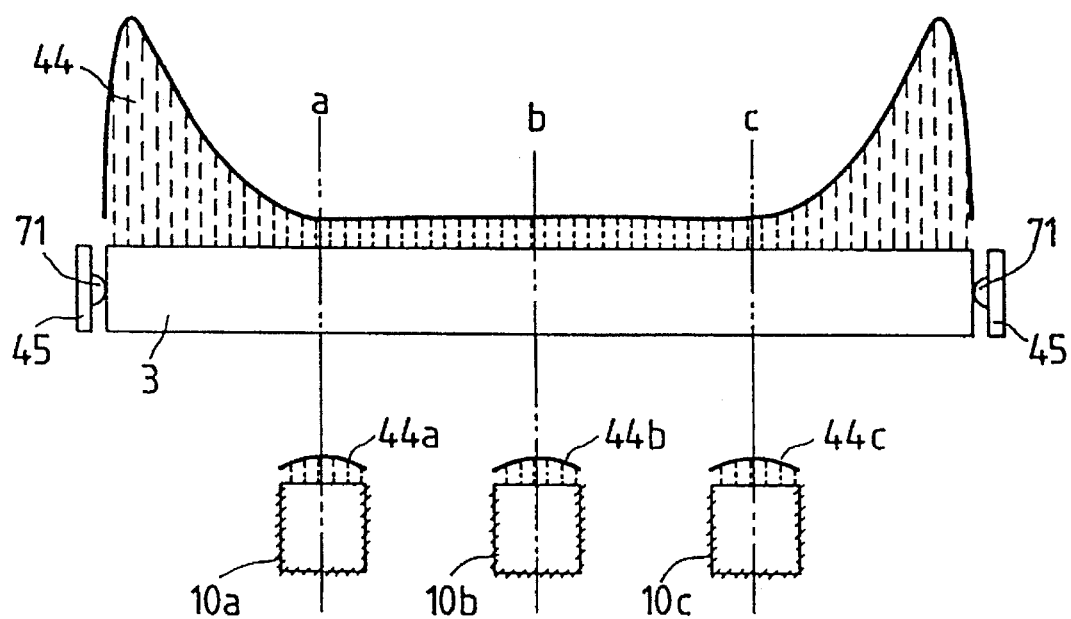
FIG. 9 is a view showing preferred embodiments of the light guide and the illumination device of the present invention.
Figure 10:
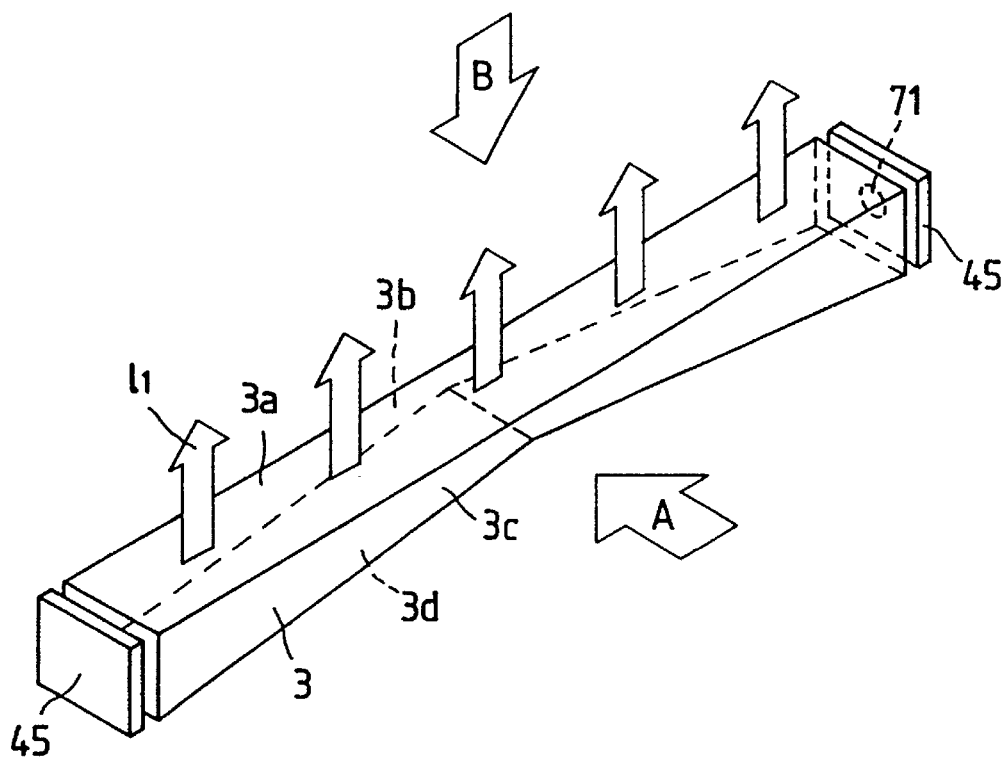
FIG. 10 is a view, showing preferred embodiments of the light guide and the illumination device of the present invention.

FIG. 10 is a perspective view showing an embodiment 1 of the linear light source of the present invention, wherein shown are an oblong transparent (translucent) member 3, substrates 45, LED chips 71 mounted on said substrates 45, and a light emitting direction $1_1$. A lateral face 3a of the transparent member 3 constitutes the light emitting face, while other lateral faces 3b, 3c and 3d are formed as mirror faces to constitute light reflecting faces.

The oblong transparent member 3 is provided at both ends thereof with the LED chips 71 constituting the light sources, and the light therefrom enters the transparent member 3 from the end faces thereof and is emitted from the lateral face 3a in the direction $1_1$ either directly or after reflection on the lateral faces 3b, 3c, 3d. In this embodiment, the lateral face 3d is so tapered that the transparent member 3 has a smaller cross section at the center, whereby the light can be efficiently reflected in the direction $1_1$. In this embodiment, said lateral face 3d is inclined by a constant angle, but such constant angle is not essential.

Figure 11:
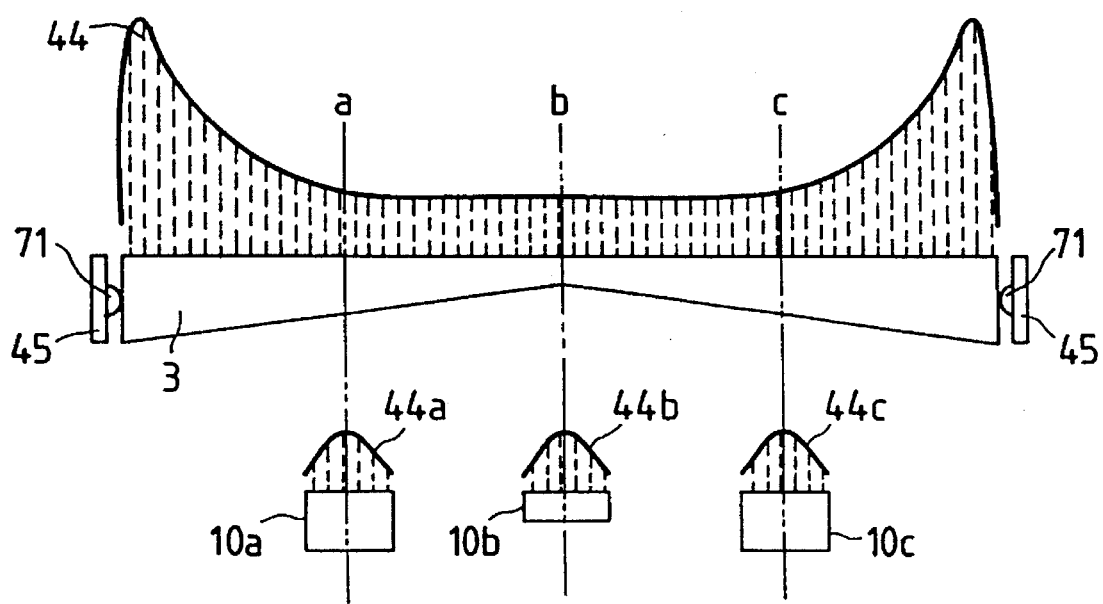
FIG. 11 is a view showing preferred embodiments of the light guide and the illumination device of the present invention.

FIG. 11 shows the elevation view of said light source seen from a direction A in FIG. 10 and the light intensity distribution on an illuminated surface (not shown), wherein a curve 44 shows the illumination intensity distribution, while 10a, 10b, 10c show the cross sections of the transparent member 3 at positions a, b, c, and 44a, 44b, 44c indicate the illumination intensity distributions at said positions. The present embodiment can provide a uniform light amount distribution with an increase amount of light in the area a–c.

[Embodiment 2]

Figure 12:
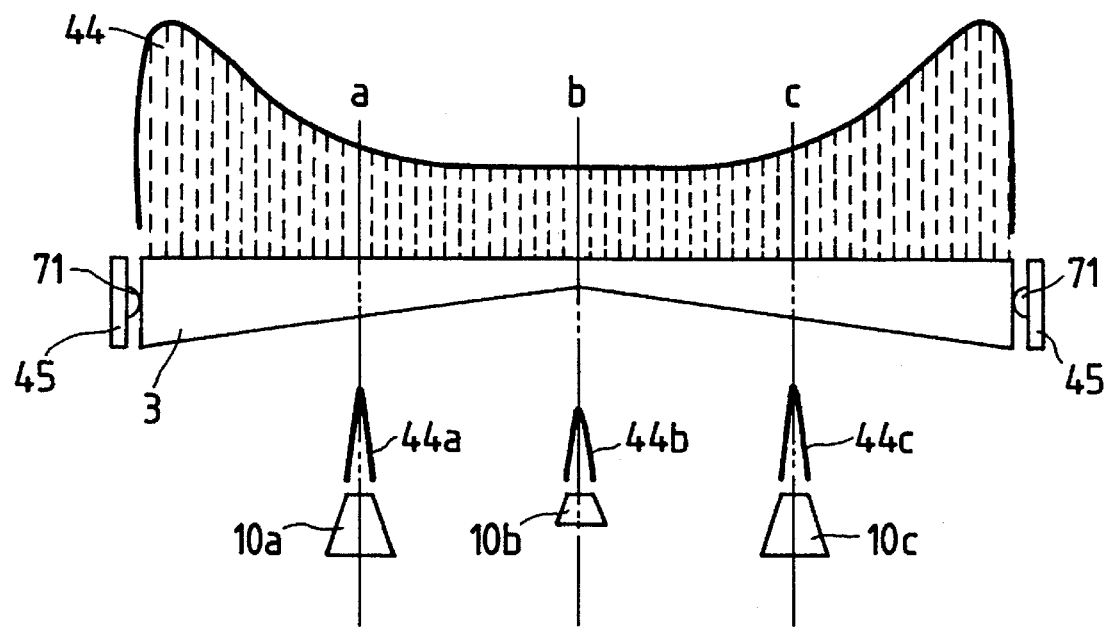
FIG. 12 is a view showing preferred embodiments of the light guide and the illumination device of the present invention.

FIG. 12 shows the elevation view of an embodiment 2 of the linear light source of the present invention, seen from the direction A shown in FIG. 10, and the light amount distribution on an illuminated surface (not shown). Components same as those shown in FIGS. 10 and 11 are represented by same numbers and will not be explained further.

Figure 13:
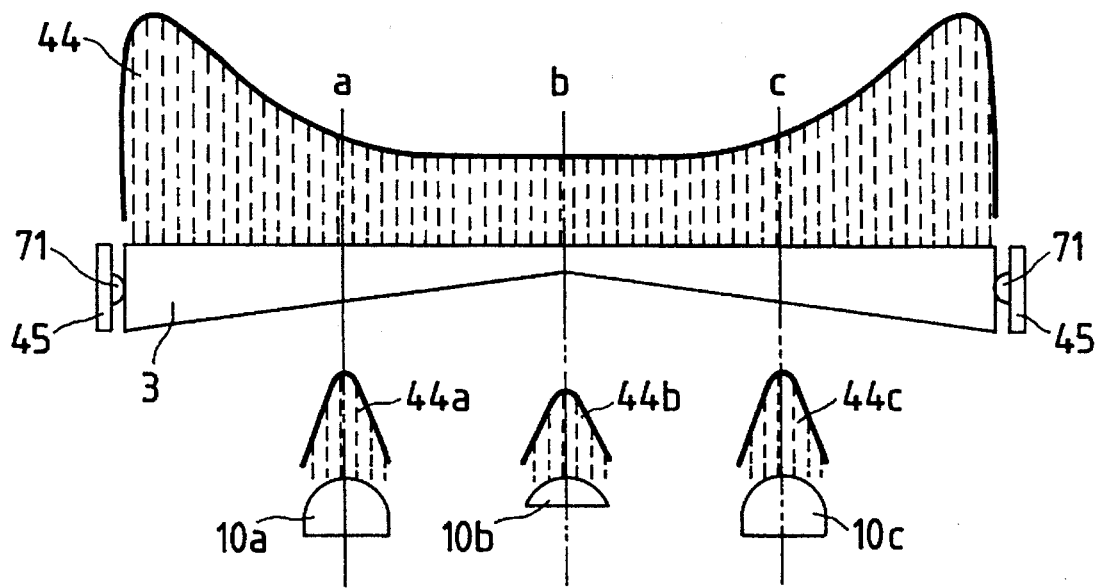
FIG. 13 is a view showing preferred embodiments of the light guide and the illumination device of the present invention.

In the present embodiment, the lateral face 3d of the oblong transparent member 3 is so tapered as to reduce the cross section thereof at the center as in the embodiment 1, and the transparent member 3 is so formed as to have a trapezoidal cross section having the shorter side at the light emitting face and the longer side at the opposite face. Such trapezoidal cross section as shown in FIG. 12 allows to emit the light in the transparent member 3, in more condensed state, into the direction $1_1$, thereby increasing the illumination intensity on the illuminated surface, in comparison with the embodiment 1, within the area a–c. The cross section of the oblong transparent member 3 is not limited to the trapezoidal form but may also be formed as a partially cut-off circle, as shown in FIG. 13.

[Embodiment 3]

Figure 14:
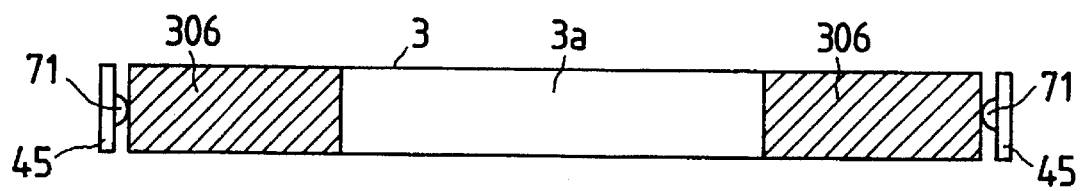
FIG. 14 is a view showing preferred embodiments of the light guide and the illumination device of the present invention.
Figure 16:
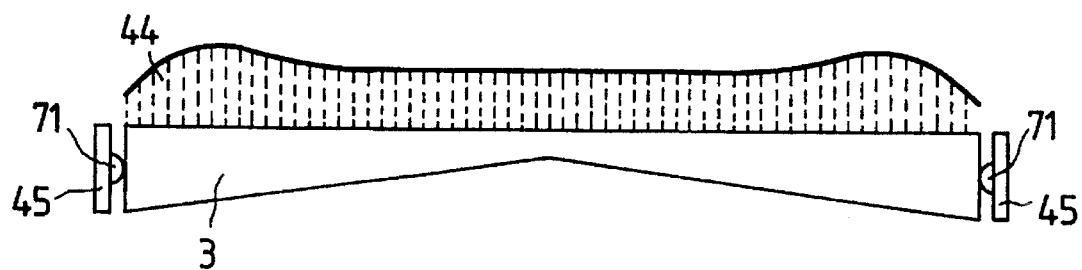
FIG. 16 is a view showing preferred embodiments of the light guide and the illumination device of the present invention.

FIG. 14 is a plan view of an embodiment 3 of the linear light source of the present invention, seen from a direction B shown in FIG. 10, and FIG. 16 shows the elevation view of said embodiment seen from a direction B shown in FIG. 10 and the light amount distribution. Components same as those shown in FIGS. 10 and 11 are represented by same lumbers and will not be explained further.

As shown in FIG. 14, the oblong transparent member 3 of this embodiment is provided, in the vicinities of the light sources on the light emitting lateral face 3a, with light attenuating films 306, which attenuate the light emitted from the vicinity of the light sources, thereby providing a light amount distribution as shown in FIG. 16, on the illuminated surface.

Figure 15:
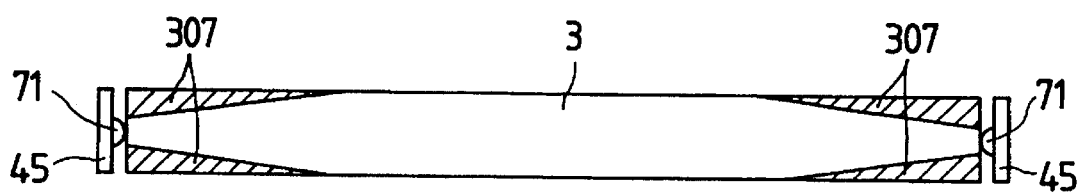
FIG. 15 is a view showing preferred embodiments of the light guide and the illumination device of the present invention.

The attenuating films 306 may be replaced by light shielding films 307 for reducing the light amount in the vicinity of the light source. FIG. 15 is a plan view showing an example in which the light shielding films are provided in the vicinities of the light sources, on the light emitting lateral face 3a of the oblong transparent member 3. The light amount distribution as shown in FIG. 16 may also be obtained on the illuminated surface by intercepting the light in the vicinity of the light source by means of the light shielding films 307 is shown in FIG. 15.

[Embodiment 4]

FIGS. 17A to 17C are schematic views of an embodiment 4 of the illumination device of the present invention, wherein FIG. 17A is a schematic lateral view of said device, illustrated together with an original constituting the illuminated surface, FIG. 17B is a schematic cross-sectional view of the translucent member 3 and an area, cut in a plane perpendicular to the plane of FIG. 17A, and FIG. 17C is a schematic lateral view of said device, seen from a direction A shown in FIG. 17A. As shown in these drawings the illumination device of this embodiment is provided with an LED light source 8 at an end face in the longitudinal direction of a translucent member 3 of a rectangular cross section, and with an area 5 for reflecting (or diffusing) the light beam, provided in a part of the translucent member 3 on a face opposed to the light emitting area thereof and formed by a coarse surface or by a coating with light diffusing-reflecting paint. On the end face opposite to the LED light source 8, there is formed a reflecting portion 6 adapted to reflect the light propagating in the translucent member 3 and formed by evaporation of a metal such as aluminum or by coating of light diffusing-reflecting paint on the end face itself of the translucent member 3 or by forming such means as a separate member.

In this embodiment, as shown in FIG. 17C, the center of the LED light source is aberrated (with an offset) from the normal line passing through the center of the shorter width of the area 5.

The light beam emitted from the LED light source 8 normally propagates inside the translucent member by repeating reflections therein, and returns toward the LED light source 8 after reaching the reflecting portion 6. Also the light entering the area 5 in the course of propagation is diffused or reflected therein and emitted through the exit portion toward the original constituting the illuminated surface ($1_1$) or propagates again within the translucent member by reflections therein ($1_2$).

In this embodiment, since the LED light source 8 is aberrated from the normal line passing through the center of the width of the area 5, the light directly entering said area 5 from the LED light source 8 is reduced, so that there can be sufficiently resolved the unevenness that the illumination intensity is higher only at the side of the LED light source 8 in the longitudinal direction of the translucent member 3. Also since the light entering the area 5 is principally the indirect light reflected inside the translucent member 3 after being emitted from the LED light source 8, the light beam emitted from the exit portion is made uniform over the longitudinal direction of the translucent member 3.

These situations will be explained further in the following, with reference to the attached drawings.

FIG. 18 shows a lateral face same as that shown in FIG. 17C, wherein a part of the light emitted from the LED light source 8 is indicated by arrows 13, 14, which respectively indicate direct and indirect lights from said light source 8.

In the present embodiment since the LED light source 8 is aberrated from the normal line passing through the center of the area 5, the proportion of the direct light $1_3$ decreases while that of the indirect light $1_4$ increases, so that the light beam emitted from the exit portion can be made uniform over the entire translucent member 3.

The amount of said aberration of the LED light source 8 is defined as at least out of the normal line passing through the center of the area 5, but it should be suitably determined in practice, because in case of an excessively large amount of aberration, the light coming from the LED light source 8 is mostly composed of the indirect light and there will also result a loss of the light beam in the translucent member 3. Particularly an extremely large aberration should be avoided since the illumination intensity becomes lower at the side of the LED light source 8.

Figure 19A:
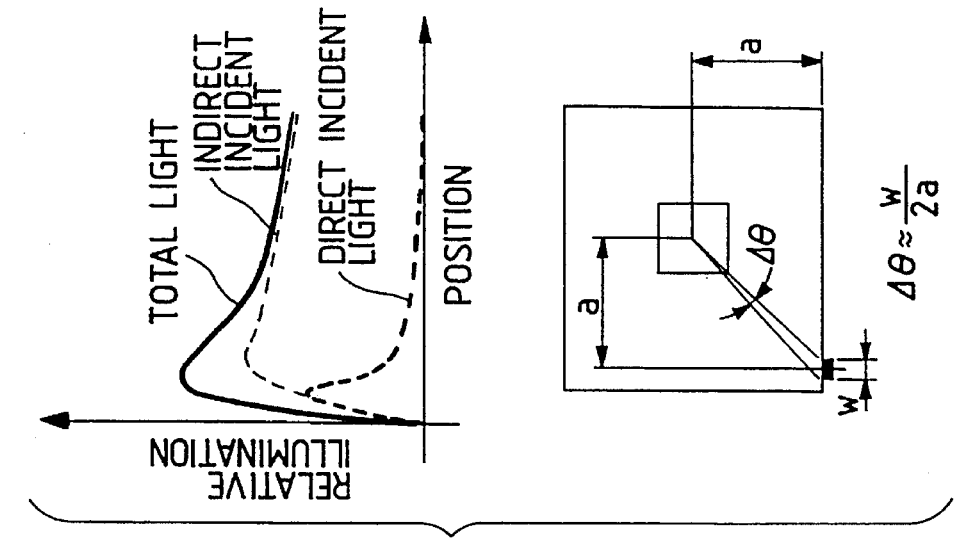
FIGS. 19A to 19C are views showing preferred embodiments of the light guide and the illumination device of the present invention.
Figure 19B:
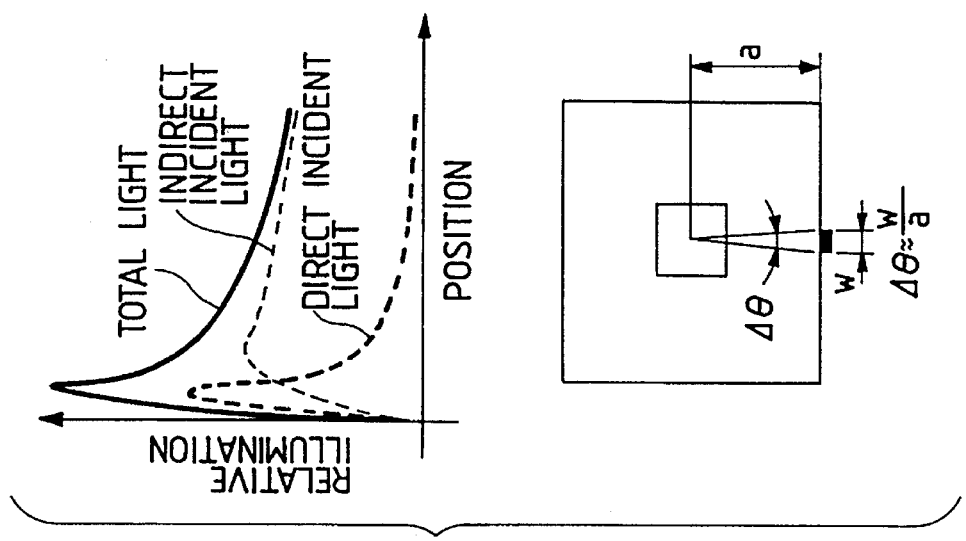
Figure 19C:
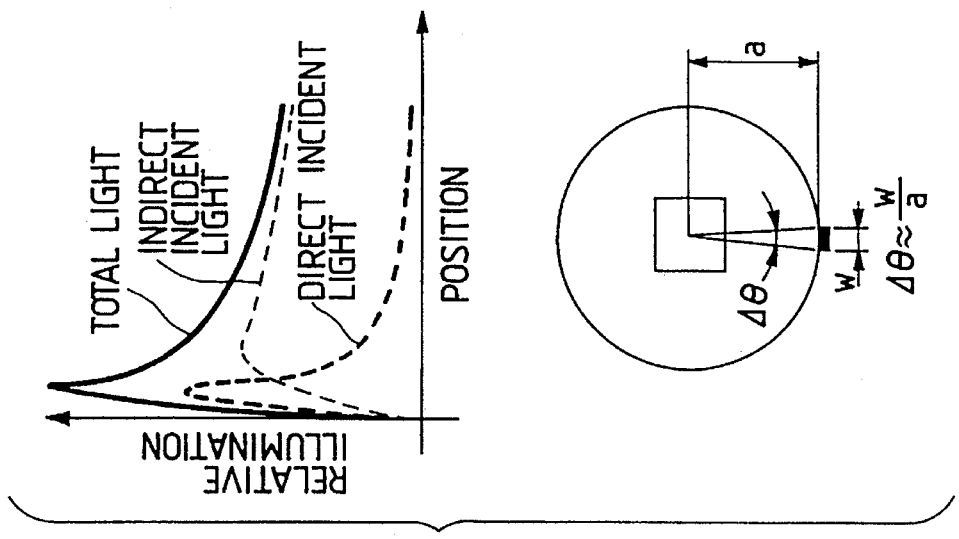

FIGS. 19A to 19C are given for explaining the difference between the illumination device of the present embodiment and other illumination devices. In these drawings there are shown schematic lateral views of the translucent member and the LED light source, seen from a direction similar to the direction A in FIG. 17A and corresponding illumination intensity distributions along the longitudinal direction of the translucent member, wherein FIGS. 19A and 19B illustrate reference example to be compared with the device of the present embodiment, while FIG. 19C illustrates the device of the present embodiment.

FIG. 19A shows an example employing a translucent member of circular cross section, which is so positioned that the center thereof coincides with the center of the LED light source and said center lies on the normal line passing through the center of the area 5. Also FIG. 19B shows an example employing a translucent member of rectangular cross section, which is so positioned that the crossing point of the diagonals of said rectangular cross section coincides with the center of the LED light source and said center lies on the normal line passing through the center of the area 5.

On the other hand, FIG. 19C shows an example of the illumination device of the present embodiment, employing a translucent member of rectangular cross section, wherein the center of the LED light source 8 is aberrated by a distance a from the normal line passing through the center of the width of the area 5.

In all the cases, the center of the light source is separated by a same distance a from a face of the translucent member on which the area 5 is formed.

The light emitted from the LED light source 8 and introduced into the translucent member can be divided into direct incident light entering the area 5 directly without any reflection the internal walls of the translucent member, and indirect incident light entering the area 5 after at least a reflection on the internal walls of the translucent member.

The amount of said direct incident light depends on the angle $\Delta\theta$ of the area 5 seen from the LED light source 8, and increases with an increase in said angle. In the arrangements shown in FIGS. 19A and 19B, where the LED light source is positioned directly above the area 5, said angle can be represented as $\Delta\theta=\{2\tan^{-1}(w/2)/2\}\cong w/a$, wherein w is the width of the area 5 and a is distance along the normal line from the LED light source to the light exit face.

On the other hand, in the present embodiment shown in FIG. 19C, wherein the LED light source is not positioned directly alcove the area 5 but is aberrated laterally by a distance a, said angle can be represented as $\Delta\theta=2\tan^{-1}\{(w/2\times 2^{1/2})/2^{1/2}\times a\}\cong w/2a$ and is therefore about a half of the angle in case of FIGS. 19A and 19B.

For this reason, the amount of the direct incident light becomes lower in the present embodiment than in the conventional configurations. On the other hand, the amount of indirect incident light increases correspondingly. As a result, the entire illumination intensity distribution is improved, because of the relaxation of the peak in the vicinity of the LED light source.

These situation will be readily understood from the curves of the relative illumination intensity as a function of the distance from the light source. In case of FIGS. 19A and 19B, the direct incident light has a peak and shows a high light amount at the side of the light source, so that the total light amount, consisting of the direct and indirect incident lights is uneven, having a peak at the side of the light source. On the other hand, the present embodiment shown in FIG. 19C provides a uniform light amount over the entire device, though the light amount at the light source side is lowered. Consequently the illumination device of the present embodiment is more convenient for

[Embodiment 5]

Figure 20B:
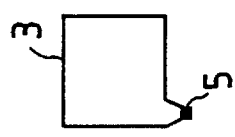
FIGS. 20A to 20C are views showing preferred embodiments of the light guide and the illumination device of the present invention.
Figure 20A:
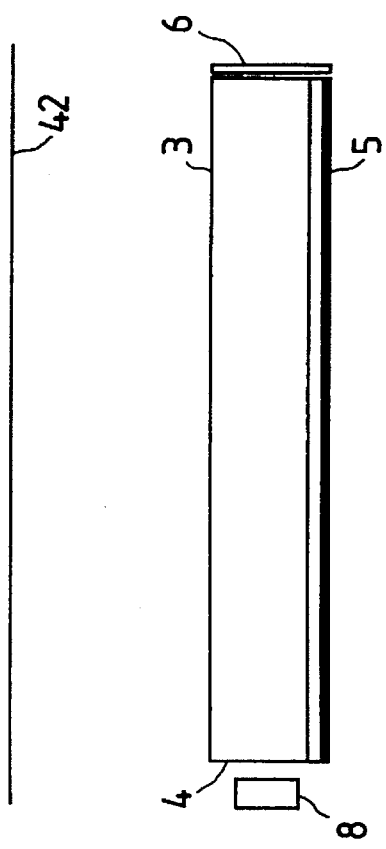
Figure 20C:
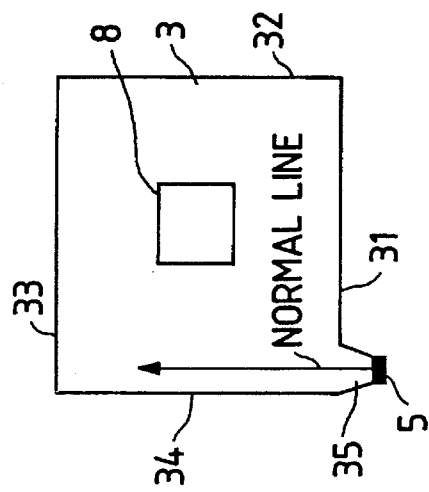

FIGS. 20A to 20C show a variation of the illumination device of the present invention shown in FIGS. 17A to 17C. Said variation is different from the latter in that the translucent member 3 is provided with a protruding portion 35, and the area 5 is formed on an end face of said protruding portion 35, in order to further reduce the direct incident light from the LED light source.

As said area 5 is formed on the lower face of the protruding portion 35, extended from a face 31 of the translucent member 3i as shown in FIGS. 19A to 19C, the amount of direct incident light from the LED light source to the area 5 becomes smaller in comparison with the case shown in FIGS. 17A to 17C. Stated differently, most of the light emitted from the LED light source does not enter the area 5 directly but after at least a reflection within the translucent member 3.

Thus, in the illumination device shown in FIGS. 20A to 20C, the amount of direct incident light decreases and the proportion of the indirect incident light becomes even higher. In comparison with the case shown in FIG. 19C, the illumination intensity at the light source side is lower due to the decreased proportion of the direct incident light, and the illumination intensity of the indirect incident light increases, though slightly, due to the increased proportion of the indirect incident light.

Consequently, the configuration shown in FIGS. 20A to 20C, providing the translucent member 3 with a protruding portion and forming the area 5 on the end face thereof allows to obtain a higher illumination intensity with improved uniformity.

[Embodiment 6]

FIGS. 21A to 21C show another variation of the device shown in FIGS. 17A to 17C. In said variation, the translucent member 3 is extended to a side opposite to the LED light source, with respect to the area 5.

Such configuration achieves more uniform illumination intensity for the indirect incident light, so that, though the illumination intensity is higher at the light source side, the illumination intensity becomes more uniform in the remaining portion excluding a part at the light source side.

[Embodiment 7]

Figure 22B:
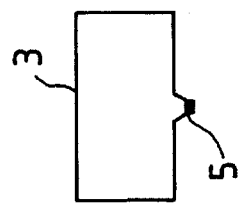
FIGS. 22A to 22C are views showing preferred embodiments of the light guide and the illumination device of the present invention.
Figure 22A:
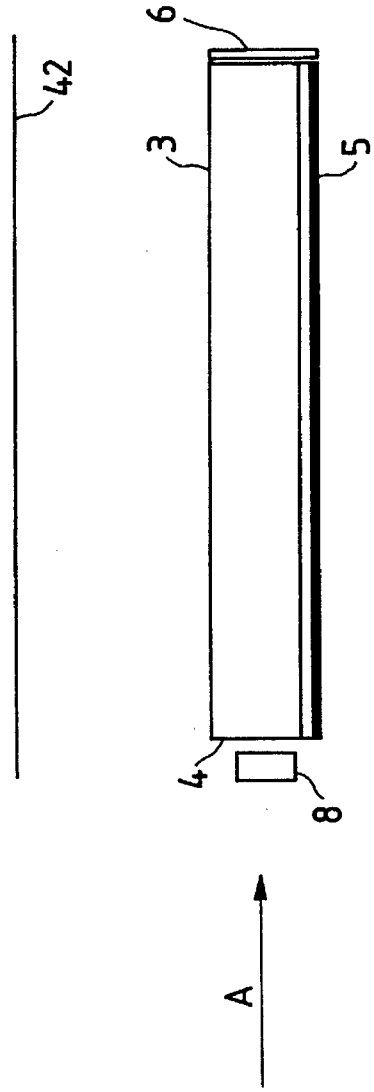
Figure 22C:
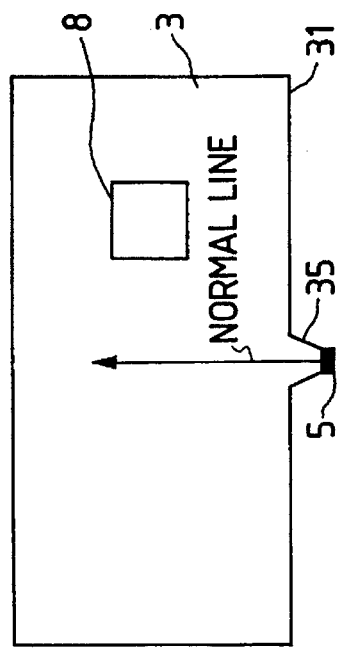

FIGS. 22A to 22C show an illumination device in which the configurations shown in FIGS. 20A to 20C and FIGS. 21A to 21C are combined. More specifically, the translucent member is provided, on a face opposite to the light exit face, with a protruding portion 35, and the area 5 is formed on the end face of said protruding portion 35, and the translucent member 3 is extended to a side opposite to the light source 8 with respect to said area 5.

In such combined structure, the area 5 principally receives the indirect incident light more reflected within the translucent member 3 so that the illumination intensity distribution becomes more uniform for the indirect incident light. The situation for the direct incident light is similar to the configuration shown in FIGS. 20A to 20C.

Consequently the total illumination intensity becomes more uniform in comparison with the case shown in FIGS. 20A to 20C, since the contribution of the indirect incident light is made more uniform.

[Embodiment 8]

The light amount of the LED light source is less than that of the incandescent electric bulb. For increasing the light amount, the number of the LED chips can be increased.

For positioning a larger number of the LED light sources while satisfying the principle of the present invention, the end face of the translucent member, where the LED light sources are to be positioned, is to be made larger.

Figure 23A:
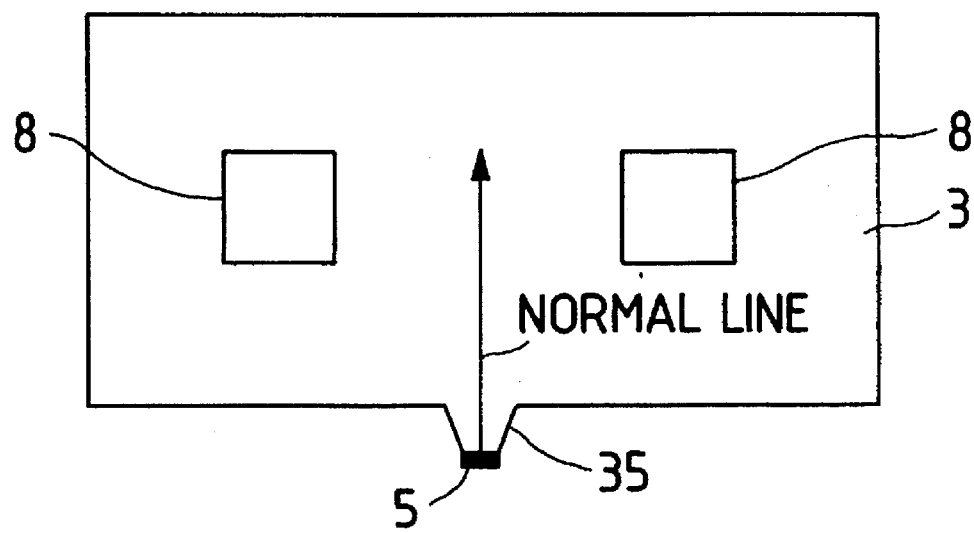
FIGS. 23A and 23B are views showing preferred embodiments of the light guide and the illumination device of the present invention.

For example, as shown in FIG. 23A, an increase in the light amount can be achieved by positioning an LED light source 8 also on the extended side of the translucent member 3. In such case, both the direct and indirect incident lights to the area 5 increase, but the illumination intensity can be made more uniform over the entire area, without local increase at the side of the LED light source 8, by suitably balancing the amounts of the direct and indirect incident lights from the LED light source 8 to the area 5 (for example by suitably separating the position of the LED light source 8 from the protruding portion 35 (area 5)).

Figure 23B:
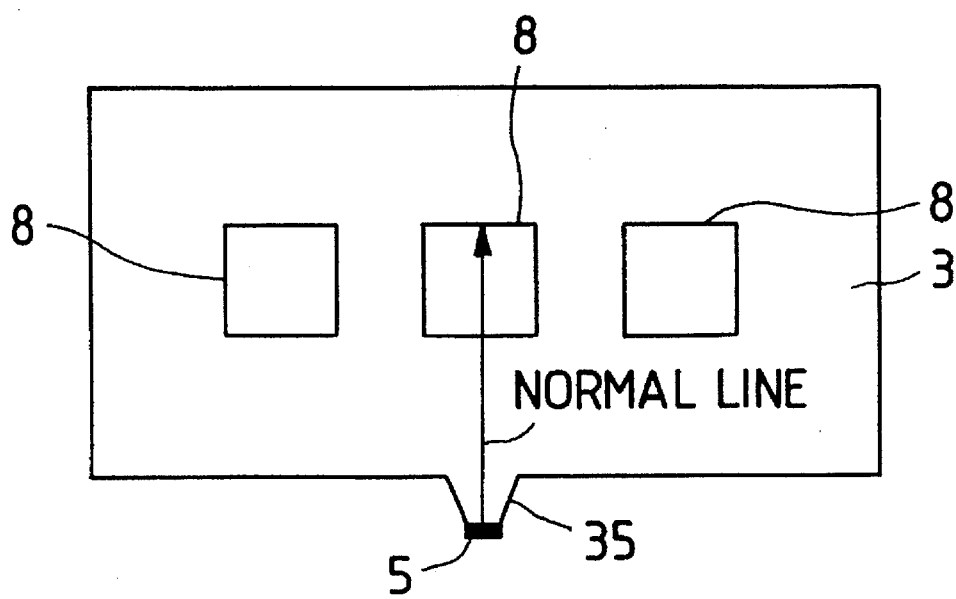

On the other hand, if the LED light sources 8 on both sides of the area 5 (protruding portion 35) are separated from said area 5, the illumination intensity may decrease at the Side of said LED light sources 8 due to the decrease of the direct incident light into the area 5 and may increase at the side far from said LED light sources 8 due to the increased proportion of the indirect incident light into the area 5. In such case there may be provided an additional LED light source 8, as shown in FIG. 23B, in a position corresponding to the area 5 (protruding portion 35) of the translucent member. Such arrangement allows to increase the illumination intensity both at the side of the LED light sources 8 and at the side far therefrom. Naturally, such arrangement of the LED light sources 8 is to be designed in consideration of the balance of the direct and indirect incident lights into the area 5.

Since the illumination intensity of the illumination device is approximately proportional to the number of the LED chips, the configuration as shown in FIG. 23A or 23B enables an additional increase in the illumination intensity.

The arrangement of the LED light sources as shown in FIG. 23A or 23B, little affecting the size of the illumination device in comparison with those shown in FIGS. 21A to 21C and 22A to 22C, is desirable in case a higher illumination intensity is required.

[Embodiment 9]

For achieving more uniform and higher illumination intensity, it is desirable instead of providing the LED light source 8 only at an end face of the translucent member 3 as in the foregoing embodiments, to provide the LED light sources 8 on both end faces of the translucent member 3.

An example of such arrangement is shown in FIGS. 4A to 24C, wherein FIG. 24A is a schematic lateral view of the illumination device of the present embodiment, illustrated together with an original constituting the illuminated surface, while FIG. 24B is a schematic cross-sectional view of the translucent member 3 and the area along a plane perpendicular to the plane of FIG. 24A, and FIG. 24C is a schematic lateral view of the illumination device seen from a direction A shown in FIG. 24A.

As shown in these drawings, the illumination device of the present embodiment is provided with the LED light sources 8 on both end faces of the translucent member 3, so that the illumination intensity can be increased further and the distribution of the illumination intensity can be made symmetrical along the longitudinal direction of the translucent member 3. Also in the foregoing embodiments 4 to 8 there may naturally be provided the LED light sources 8 on both end faces of the translucent member 3. Such LED light sources 8 are preferably provided in same number and arranged in a similar manner on both end faces, but such conditions are not essential.

[Embodiment 10]

Figure 41:
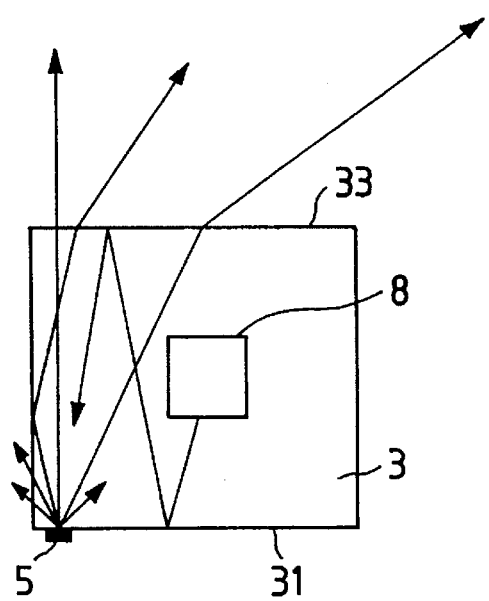
FIG. 41 is a view showing preferred embodiments of the light guide and the illumination device of the present invention.
Figure 44A:
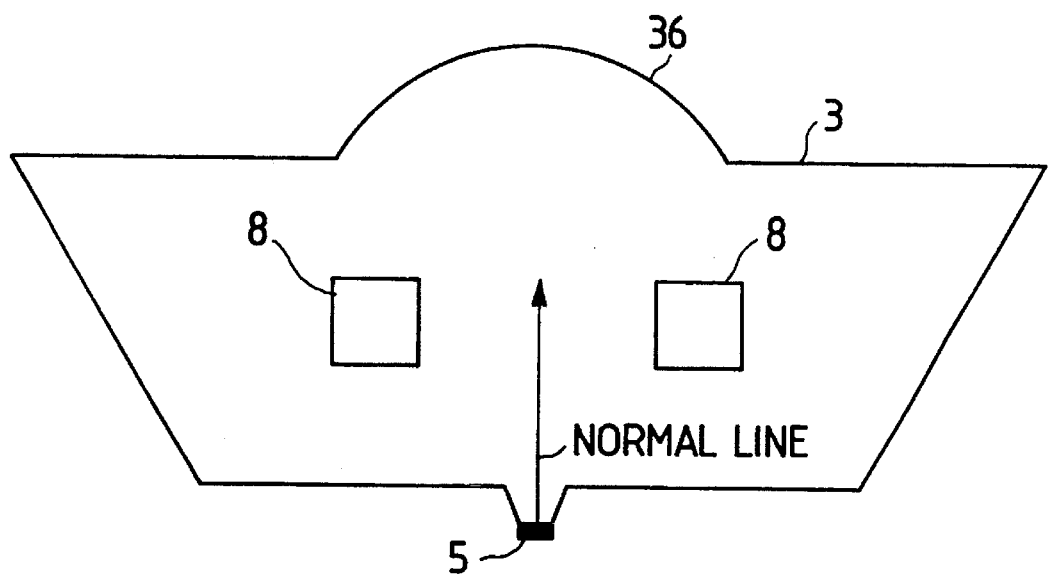
FIGS. 44A and 44B are views showing preferred embodiments of the light guide and the illumination device of the present invention.
Figure 44B:
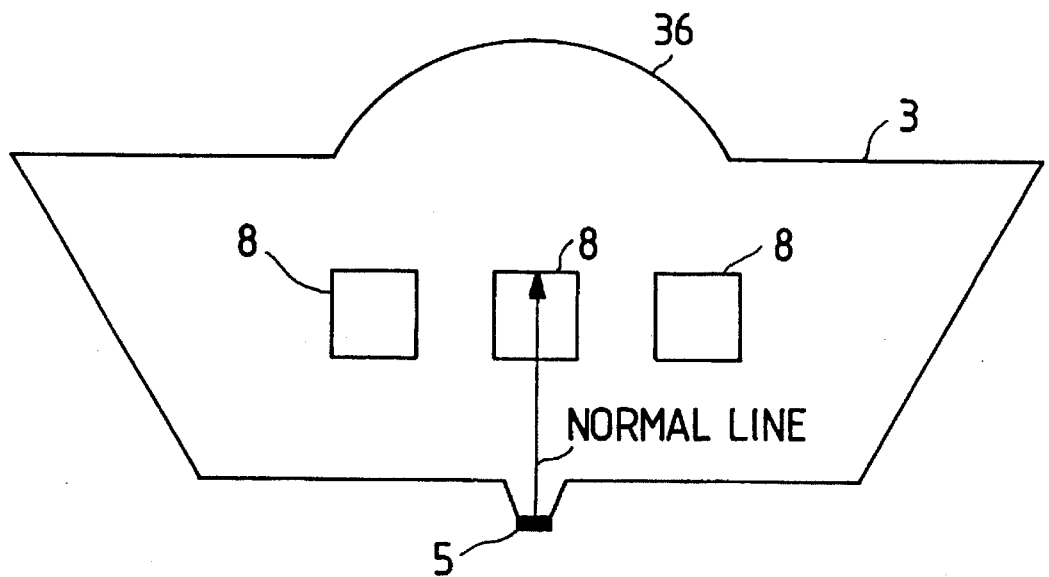

In an information processing apparatus such as facsimile apparatus, the area read by the line sensor in a scanning period, in a direction perpendicular to the scanning direction, namely in the direction of relative movement between the original and the sensor, is not so large. Also among the light scattered and/or reflected in the area 5, only a portion emitted from the exit portion opposite to the illuminated surface contributes to the illumination thereof, as illustrated in FIG. 41, and, since said emitted light is diffuse, the illumination intensity on said illuminated surface declines rapidly with an increase in distance from said light exit portion of the translucent member 3 to the illuminated surface.

Therefore, if a higher illumination intensity is desired, it is effective to condense the light, emitted from the translucent member 3, by means of a lens.

FIGS. 25A to 25C show an example of such arrangement, in which a cylindrical lens 9 is provided, facing the illuminated surface and along the translucent member 3 of the illumination device shown in FIGS. 24A to 24C. As shown in FIGS. 25A to 25C, said cylindrical lens 9 is effectively so positioned that the center thereof corresponds to the area 5, but such positioning is not essential as long as the necessary illumination intensity can be obtained.

Such lens arrangement, being capable of illumination of the illuminated surface by condensation of the light emitted from the translucent member 3 allows to increase the average illumination intensity, through the distribution thereof is substantially not affected.

Such arrangement enables the use of the sensor of a lower sensitivity, or the image reading with higher speed if the sensitivity of the sensor is not changed. It can also resolve the loss in the light amount resulting from the color filters used in color image reading, while maintaining a sufficiently high image reading speed.

[Embodiment 11]

The above-explained area 5, formed by a coarse surface or by coating with the light diffusing paint, can uniformly diffuse the incident light, but it is not satisfactory in terms of the efficiency of utilization of the light emitted from the LED light source 8, since a proportion of said light returns to the end face of the translucent member 3. For further increasing the average illumination intensity, therefore, the above-mentioned area 5 may be replaced by a reflecting face of saw-tooth shape.

FIGS. 26A to 26C show an embodiment in which the area 5 of the illumination device, shown in FIGS. 17A to 17C is formed as a reflecting face of saw-tooth shape. Said saw-tooth-shaped reflecting face of the area 5 can be formed, in a part of the lateral face of the translucent member 3, by integral molding with said translucent member 3, or by cutting work thereon, or by adhesion of a separate sawtooth-shaped member onto the lateral face of said translucent member 3 with adhesive material or by ultrasonic adhesion. Among these the integral molding with the translucent member 3 is preferable in consideration of the cost and the decrease of the manufacturing steps. The surface of said area 5 constituting the sawtooth-shaped reflecting face is preferably subjected to the evaporation of a bright metal such as aluminum or silver.

As shown in FIG. 26A, a part of the light emitted from the LED light-source 8 enters the area 5, is reflected by the reflecting face of the area 5 and illuminates the illuminated surface. Since said area 5 in this case is not composed of a coarse surface or a coating of the light diffusing paint, the light entering said area 5 is substantially not subjected to diffuse reflection. Consequently the incident light is efficiently reflected toward the illuminated surface.

Figure 27:
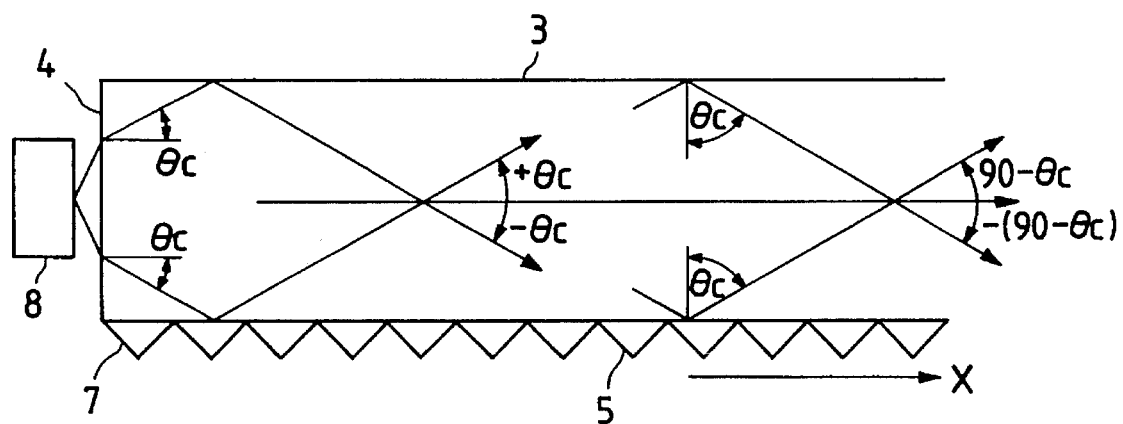
FIG. 27 is a view showing preferred embodiments of the light guide and the illumination device of the present invention.
Figure 28:
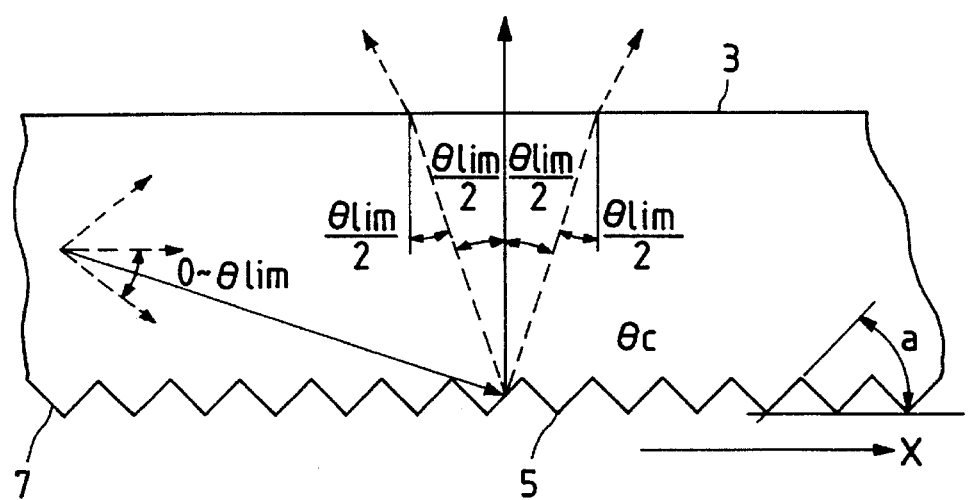
FIG. 28 is a view showing preferred embodiments of the light guide and the illumination device of the present invention.
Figure 30B:
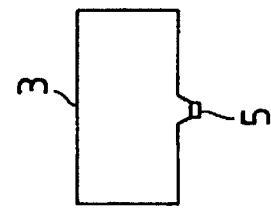
FIGS. 30A to 30C are views showing preferred embodiments of the light guide and the illumination device of the present invention.
Figure 30A:
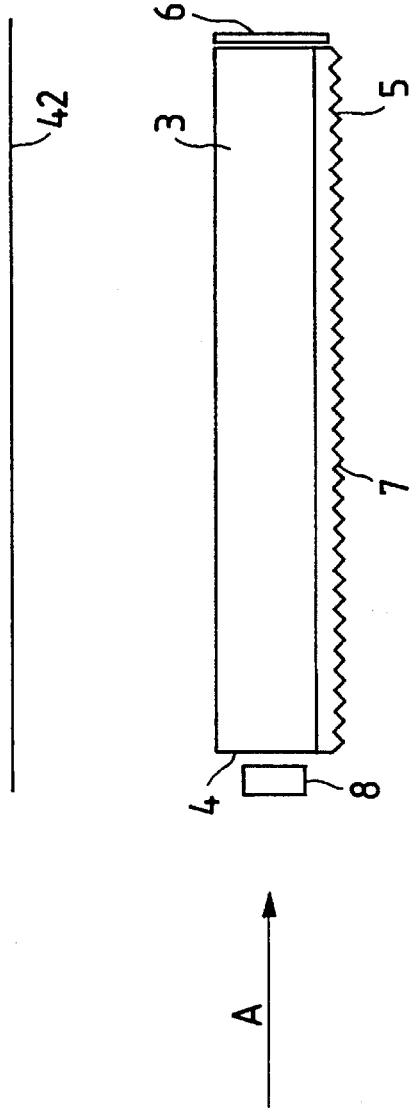
Figure 30C:
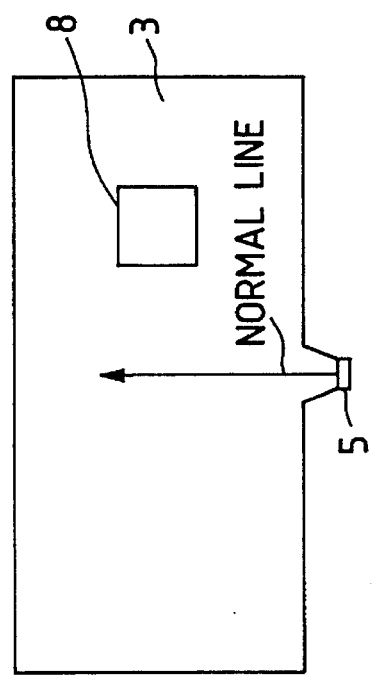

Now reference is made to FIGS. 27 and 28 for further explaining said sawtooth-shaped reflecting face constituting the area 5.

FIG. 27 is a schematic cross-sectional view of the translucent member 3, and FIG. 28 is a partial magnified view of FIG. 27. The light L emitted from the LED light source 8 enters the translucent member 3 through the entrance end face 4, and propagates in the translucent member 3, repeating reflections therein. A part of said light L reaches the sawtooth-shaped reflecting face 7 of the area 5 after being reflected in the translucent member 3, then is reflected in said area 5 and emerges from the translucent member 3.

In this manner the light from the LED light source 8 enters the reflecting faces 7, arranged along the X-direction, of the area 5, then is reflected by said reflecting faces and is taken out to the exterior.

The angle 8 of the incident light from the LED light source 8 to the X-axis in the translucent member satisfies a relation $-\theta_c<\theta<\theta_c$, wherein $\theta_c$ is the critical angle determined by the refractive indexes of the translucent member and of the external medium (normally air).

Also when the light propagates by repeating total reflections on the lateral face of the translucent member, the angle $\theta$ of such propagating light satisfies a condition $-(90-\theta_c)<\theta<(90-\theta_c)$, because said light has to have an angle exceeding the critical angle $\theta_c$ with respect to the normal line to said lateral face.

Consequently, in order that the light beam emitted from the LED light source 8 and entering the translucent member through the end face thereof can propagate in said member by repeating reflections, the angle $\theta$ of said light beam with respect to the X-axis has to satisfy the narrower one of the above-mentioned two conditions.

If $\theta_{lim}$ is taken as the smaller one of $\theta_c$ and $(90-\theta_c)$, there should be satisfied a condition $-\theta_{lim}<\theta<\theta_{lim}$.

In order that said light beam can enter and be reflected by the sawtooth-shaped reflecting faces 7, the angle $\theta$ of said light beam has to be in the negative range, or a range from 0 to $-\theta_{lim}$, as shown in FIG. 28. If the angle $\alpha$ of each reflecting face 7, with respect to the X-axis, is selected as $\alpha=\{90+(-\theta_{lim}/2)\}/2$, the light beam is reflected within an angular range of $90° \pm (\theta_{lim}/2)$ with respect to the X-axis and is released to the exterior through an exit area positioned opposite to the area 5. If said exit area and the X-axis are substantially parallel, the incident angle of said light beam to said exit area does not exceed $(\theta_{lim}/2)$. Since $\theta_{lim}$ is defined as the smaller one of $\theta_c$ and $(90-\theta_c)$, there stands a relation $\theta_{lim} \leq \theta_c$, indicating that the incident angle to the exit area is smaller than the critical angle.

Consequently there is reduced the proportion of the light which is totally reflected on the exit area, then proceeds inversely in the translucent member and is released from the entrance end face thereof, and there is obtained an illumination device of a higher illumination intensity, with a higher efficiency of utilization of the light.

Even if the above-mentioned angle $\alpha$ does not completely coincide With the foregoing definition $\{90+(-\theta_{lim}/2)\}/2$, a similar effect can be obtained as long as a condition: $(90-\theta_c)<\alpha<(90+\theta_c-\theta_{lim})$ is satisfied, because the incident angle of the light beam reflected by the sawtooth-shaped reflecting faces 7 and entering the exit area exceeds the critical angle $\theta_c$.

For example, if the translucent member 3 is composed of acrylic resin, there is obtained a condition $\theta_{lim}=\theta_c \approx 42°$. Thus, by selecting the angle $\alpha$ as $\{90+(-42/2)\}/2 = 34.5° \approx 35°$, it is possible to efficiently take out the light beam, entering from the LED light source 8, from the translucent member 3. In terms of the angle $\alpha$ mentioned above, this corresponds to a condition $24°<\alpha<47°$.

If the diameter of the translucent member 3 is sufficiently smaller than the length thereof, the light propagating therein is almost uniformly distributed within a range from $+\theta_{lim}$ to $-\theta_{lim}$. It is therefore preferable to select said angle $\alpha$ as close as possible to $90+(-\theta lim/2)$ because the principal ray of the emerging light beam becomes perpendicular to the exit area.

FIGS. 29A to 29C and 30A to 30C respectively show variations of the illumination devices shown in FIGS. 20A to 20C and 21A to 21C, wherein the area 5 is modified to the sawtooth-shaped reflecting faces 7.

Such sawtooth-shaped reflecting faces formed on the end face of the protruding portion 35 allows not only to reduce the unevenness in the illumination intensity but also to increase the average illumination intensity.

[Embodiment 12]

Figure 33:
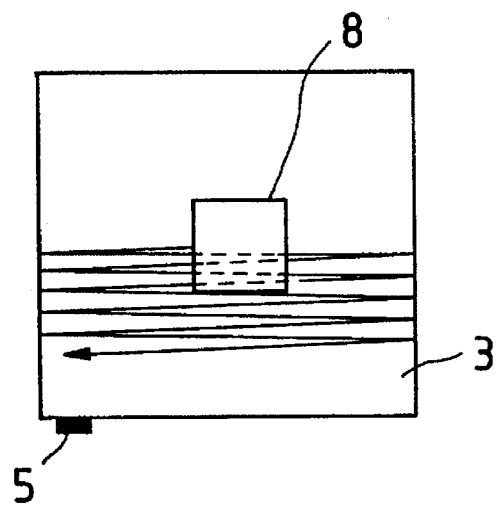
FIG. 33 is a view showing preferred embodiments of the light guide and the illumination device of the present invention.
Figure 36A:
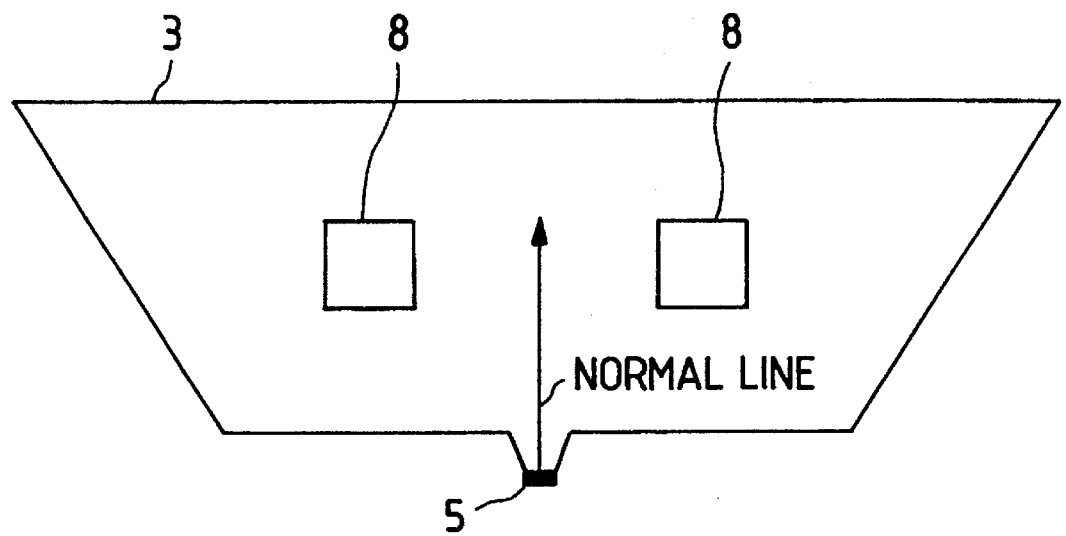
FIGS. 36A and 36B are views showing preferred embodiments of the light guide and the illumination device of the present invention.
Figure 36B:
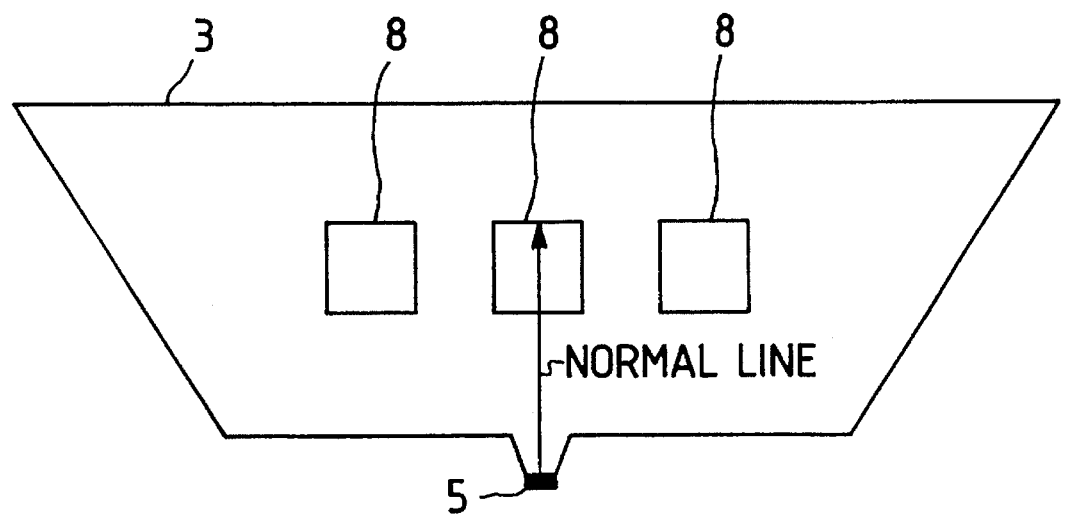
Figure 37A:
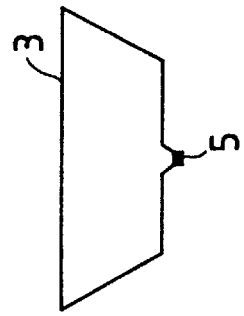
FIGS. 37A to 37C are views showing preferred embodiments of the light guide and the illumination device of the present invention.
Figure 37B:
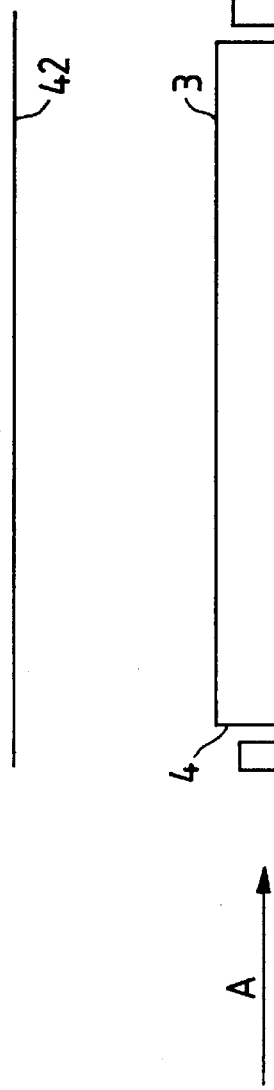
Figure 37C:
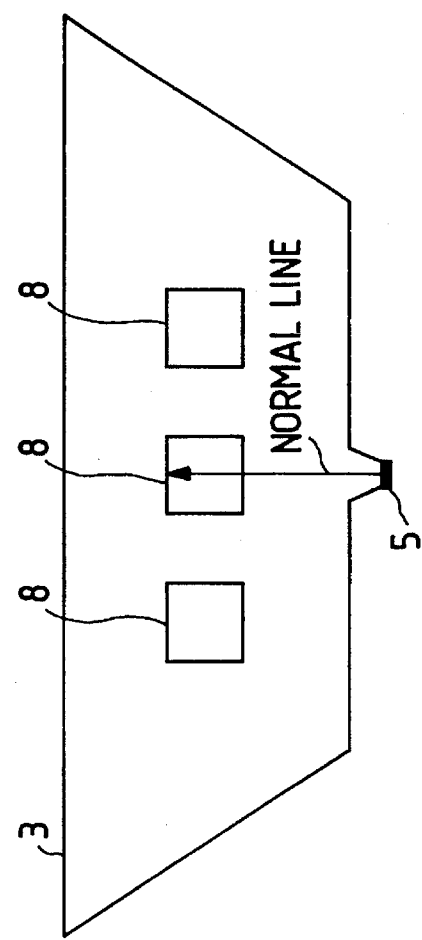
Figure 38B:
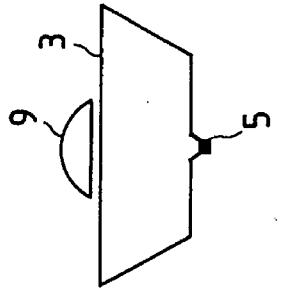
FIGS. 38A to 38C are views showing preferred embodiments of the light guide and the illumination device of the present invention.
Figure 38A:
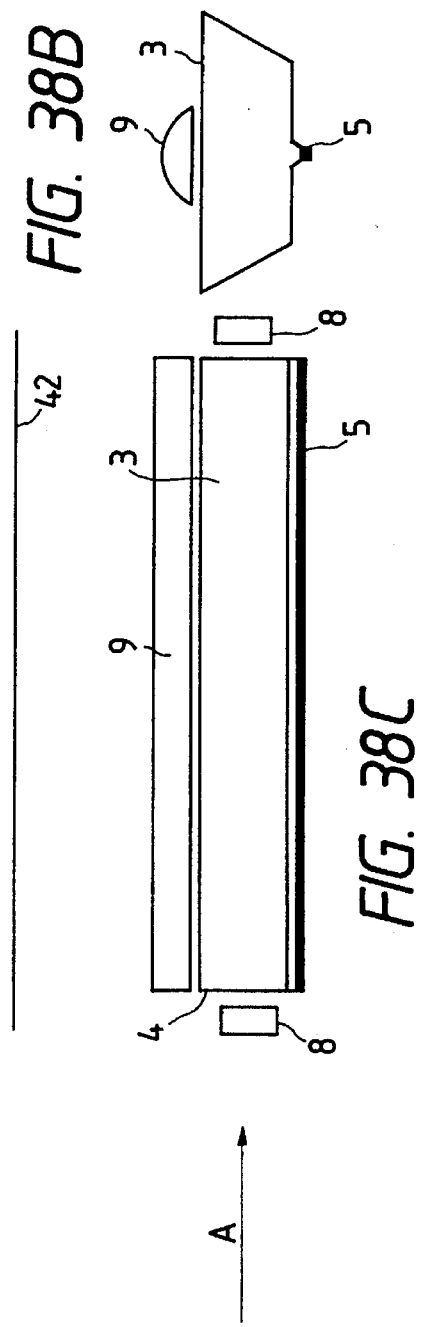
Figure 38C:
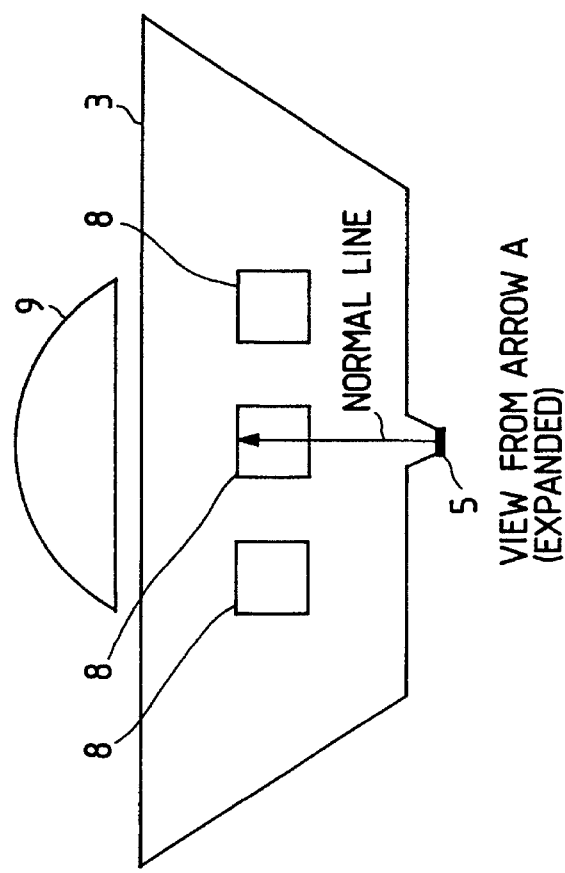

As explained in the foregoing, the light entering the translucent member 3 may be released to the exterior upon reaching the end face thereof, and such phenomenon results in a lowered efficiency of light utilization. Such loss is mostly represented by a proportion of the light that has never entered the area 5 during repeated reflections within the translucent member 3. Also among the light emitted from the LED light source 8, an angular component perpendicular to the lateral faces of the translucent member 3 or close thereto repeats the reflections between said lateral faces as shown in FIG. 33 and does not easily enter the area 5. It is therefore possible to further improve the illumination efficiency by causing a reflection so as to facilitate the entry of the light into the area 5 in the course of propagation within the translucent member 3, as will be explained in the following.

Figure 31B:
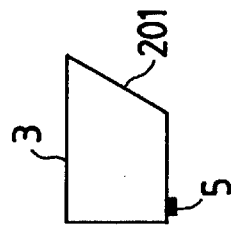
FIGS. 31A to 31C are views showing preferred embodiments of the light guide and the illumination device of the present invention.
Figure 31A:
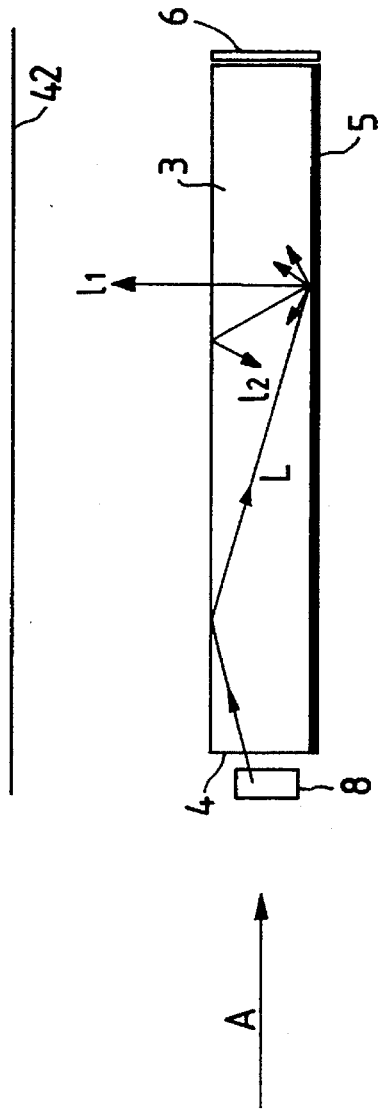
Figure 31C:
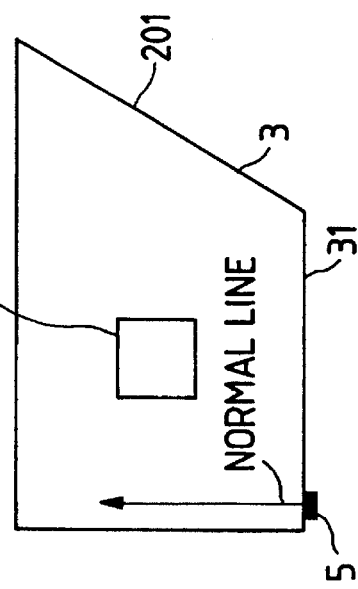

FIGS. 31A to 31C schematically show another embodiment of the illumination device of the present invention, wherein FIG. 31A is a schematic lateral view of said illumination device, illustrated together with an original constituting the illuminated surface, while FIG. 31B is a schematic cross-sectional view of the translucent member 3 and the area 5, along a plane perpendicular to that of FIG. 31A, and FIG. 31C is a schematic lateral view of said device, seen from a direction A shown in FIG. 31A. The basic configuration of the illumination device of the present embodiment is same as that shown in FIGS. 17A to 17C, except that a lateral face of the translucent member 3 positioned opposite to the area 5, is made non-parallel to another lateral face at the side of said area 5, and that the transversal length of a face, bearing the area 5 thereon, of the translucent member 3 is made shorter than that of the opposite face at the illuminated surface side. Stated differently, a lateral face of the translucent member 3, positioned farther from the area 5, is formed as an inclined face 201, spread toward the illuminated surface.

Figure 32:
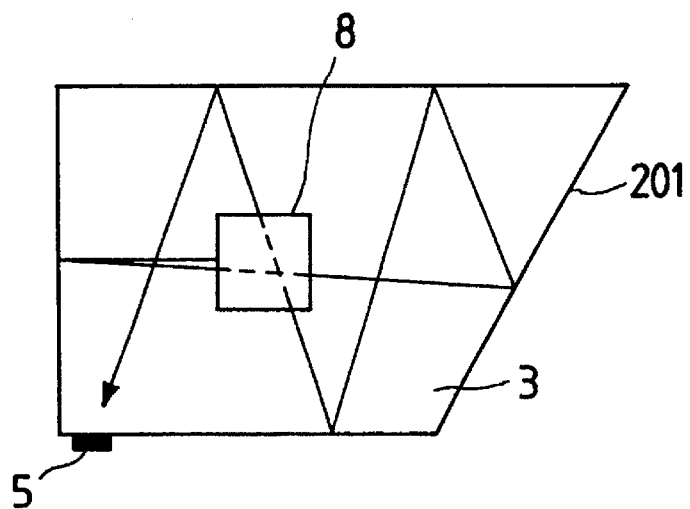
FIG. 32 is a view showing preferred embodiments of the light guide and the illumination device of the present invention.

A part of the light emitted from the LED light source 8 repeats reflections within the translucent member 3 as mentioned above and as illustrated in FIG. 32, but, in this embodiment, the inclined lateral face modifies the angle of reflection, thereby increasing the probability of entry into the area 5. As a result, the efficiency of utilization of the light emitted from the LED light source is improved, whereby the illumination intensity can be increased.

Such inclined lateral wall is also applicable to the foregoing translucent members of other shapes. In any case, the presence of such inclined lateral face increases the probability of light entry, thereby attaining a further increase in the illumination intensity. As examples, FIGS. 34A to 34C show a variation, having such inclined lateral face 201 in the translucent member 3, in the illumination device shown in FIGS. 20A to 20C, and FIGS. 35A to 38C show variations having similar inclined lateral faces 201 on both lateral faces of the translucent member 3 in the embodiments shown in FIGS. 22A to 25C. In the translucent member including the extended portion as shown in FIGS. 35A to 38C, the inclined face may be formed on at least either of the lateral faces. Also the area 5 in these Cases may naturally be either of the diffusing type and the reflecting type explained before.

[Embodiment 13]

For further increasing the illumination intensity, as explained in the foregoing, it is effective to condense the light beam, emerging from the translucent member, with a lens. However, if such lens is incorporated as a separate component into the illumination device, there will result an increase in the cost, because of the high precision required for alignment of said lens and of an increased number of assembling steps. Also since the lens is formed as a separate component, there will result a loss of the light, at the entry of the emerging light into said lens, by reflection on the lens surface. Although such loss by reflection is about 4% at maximum, such loss should naturally be prevented in order to increase the illumination intensity.

Such reflection loss itself can be substantially avoided by applying an antireflective treatment to the lens surface. However, such treatment raises the cost, because of the steps required for such antireflective treatment. Also the antireflective treatment can resolve the problem of reflection on the lens surface, but is unable to resolve the above-mentioned problems associated with the precision of assembling or the number of steps required therefor.

It is therefore desirable, in the formation of the translucent member with a plastic material such as acrylic resin or with glass to integrally form the lens at the same time. With either material the translucent member and the lens can be integrally formed for example by molding.

Figure 39B:
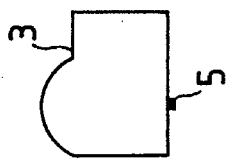
FIGS. 39A to 39C are views showing preferred embodiments of the light guide and the illumination device of the present invention.
Figure 39A:
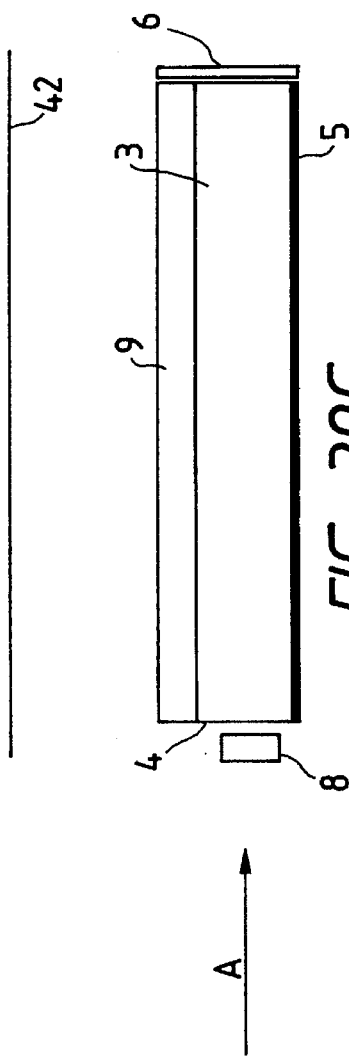
Figure 39C:
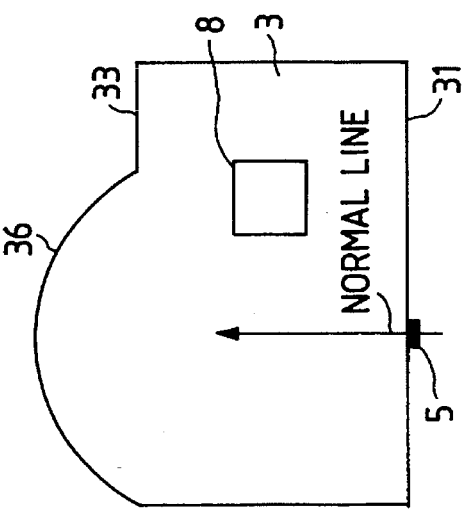

FIGS. 39A to 39C schematically show another embodiment of the illumination device of the present invention, wherein FIG. 39A is a schematic lateral view of said device, illustrated together with an original constituting the illuminated surface, FIG. 39B is a schematic cross-sectional view of the translucent member 3 and the area 5 along a plane perpendicular to that of FIG. 39A, and FIG. 39C is a schematic lateral view of said device, seen from a direction A shown in FIG. 39A. The basic structure of this embodiment is same as that shown in FIG. 17A to 17C, except that a face of the translucent member 3, opposite to the face bearing the area 5 thereon, is formed as a convex lens 36.

With such configuration, the light beam diffused and reflected in the area 5 is condensed by the function of the lens portion 36. In the device shown in FIGS. 39A to 39C, the light diffused and reflected in the area 5 emerges from the lens portion 63 of the translucent member 3 in a state of substantially parallel light beam, as will be explained in the following with reference to FIG. 40.

Figure 40:
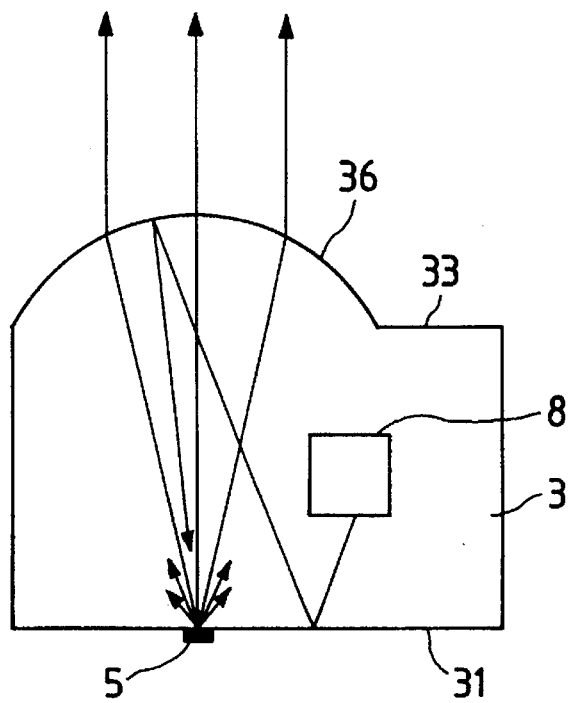
FIG. 40 is a view showing preferred embodiments of the light guide and the illumination device of the present invention.

As shown in FIG. 40, a part of the light emitted from the LED light source 8 enters the area 5 after at least a reflection in the translucent member 3. The incident light to the area 5 is diffuse reflected therein, and a part of said light is reflected again in the translucent member 3, while the remaining part proceeds toward the lens portion 36, and, upon emerging therefrom, it is condensed by the lens effect thereof and is emitted, in a state of a substantially parallel light beam, toward the illuminated surface.

Therefore, since the illuminated surface can be illuminated with a sufficiently high illumination intensity even when the illumination device is distanced from said surface, there can be achieved extremely efficient illumination. Also because of the same reason, the information processing apparatus employing said illumination device has a larger freedom in designing.

Furthermore, the structure shown in FIGS. 39A to 39C can achieve more uniform illumination, in comparison with the structure shown in FIGS. 17A to 17C, because the translucent member 3 is extended laterally by the lens portion 36.

In the present invention, the lens is not required to completely condense (or focus) the light, which is diffused or reflected in the area 5, onto the illuminated surface.

The above-explained translucent member 3 with lens function can not only achieve compactization and cost reduction, but also provide an illumination device with more uniform illumination intensity. Such translucent member 3 with lens function is not limited to the embodiment shown in FIGS. 39A to 39C, but, as illustrated in FIGS. 42A to 46C, the lens function may naturally be given to the translucent members 3 of the illumination devices shown in FIGS. 20A to 20C, 31A to 31C 36A to 36C and 37A to 37C.

[Embodiment 14]

Figure 48A:
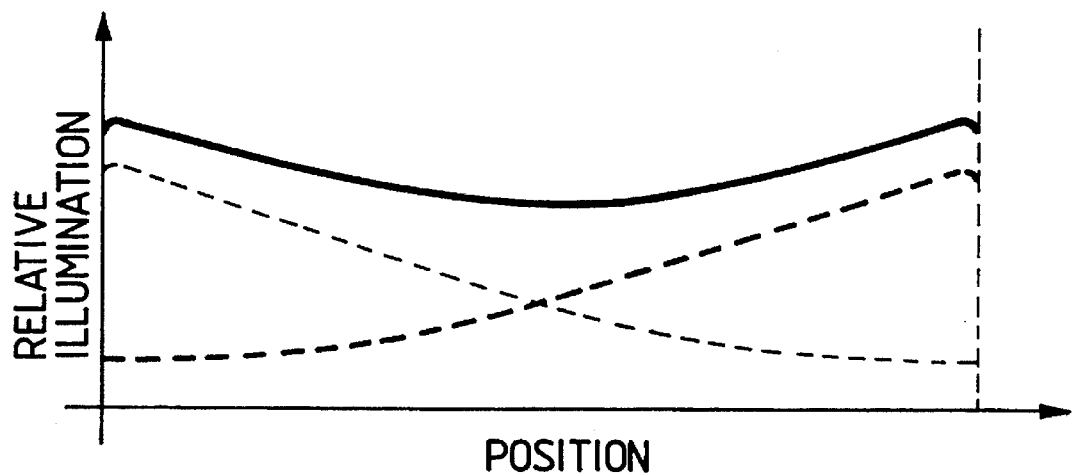
FIGS. 48A and 48B are views showing preferred embodiments of the light guide and the illumination device of the present invention.

The intensity of the indirect incident light emitted from the LED light source and entering the area 5 decreases as the light propagates inside the translucent member 3 (or as the distance from the LED light source increases). Also the intensity of the direct incident light entering the area 5 decreases as the distance from the LED light source increases. Consequently the illumination intensity at the center of the translucent member tends to become lower if it is extended longitudinally, even when it is provided with the LED light sources at both ends. FIG. 48A shows the relative illumination intensity along the longitudinal direction of the translucent member 3, in the illumination device shown in FIGS. 45A to 45C. As will be apparent from these charts, the distribution of the illumination intensity is significantly uniform in comparison with that in the conventional devices. Nevertheless the relative illumination intensity is lower in the central portion in the longitudinal direction, and it is desirable to rectify such unevenness, as will be explained in the following.

Figure 46B:
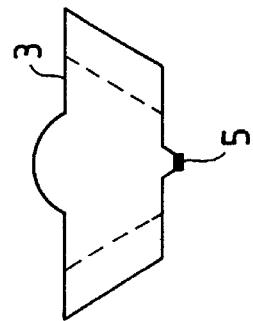
FIGS. 46A to 46C are views showing preferred embodiments of the light guide and the illumination device of the present invention.
Figure 46A:
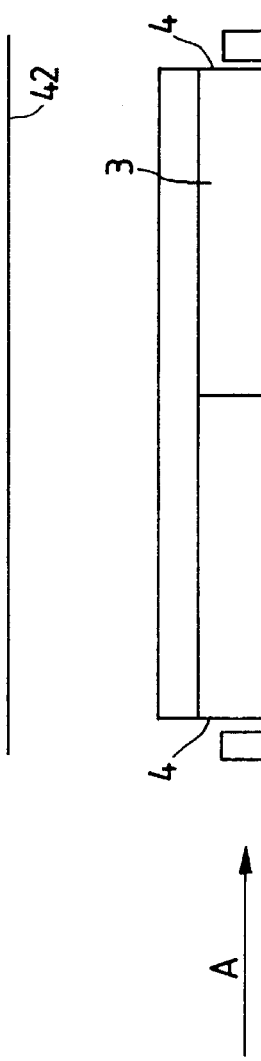
Figure 46C:
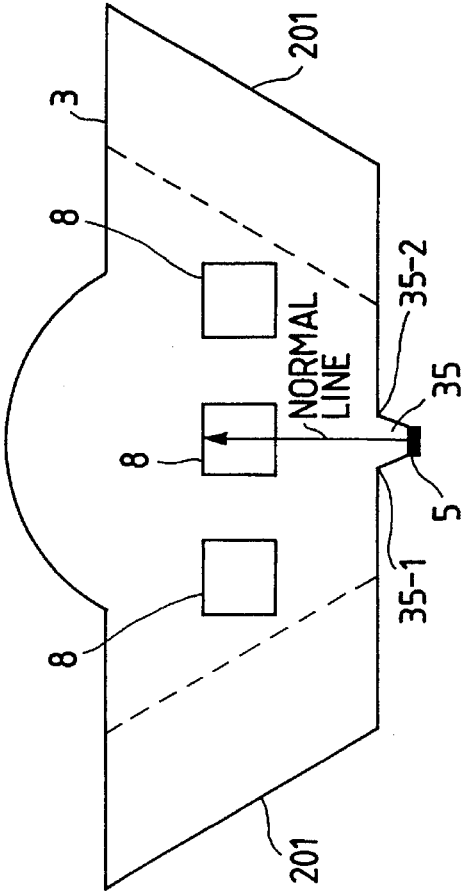

FIGS. 46A to 46C schematically illustrate another embodiment of the illumination device of the present invention, wherein FIG. 46A is a schematic lateral view of said device, illustrated together with an original constituting the illuminated surface, FIG. 46B is a schematic cross-sectional view of the translucent member 3 and the area 5 along a plane perpendicular to that of FIG. 46A, and FIG. 46C is a schematic lateral view of said device, seen from a direction A shown in FIG. 46A.

Figure 47A:
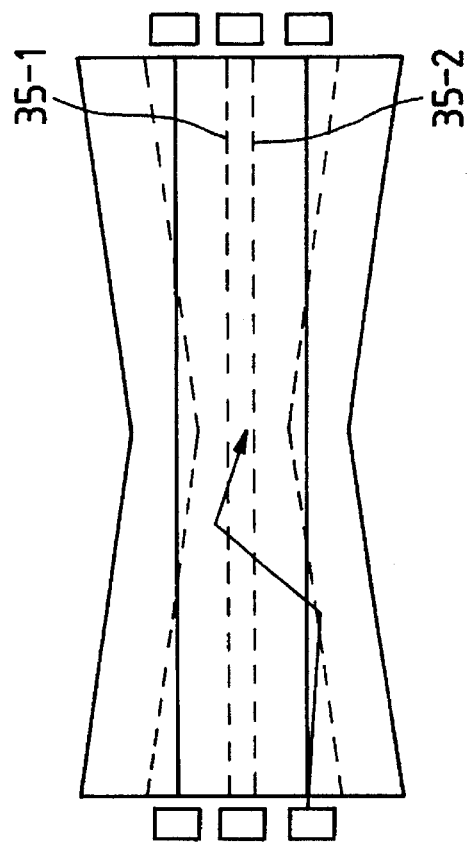
FIGS. 47A to 47C are views showing preferred embodiments of the light guide and the illumination device of the present invention.
Figure 47B:
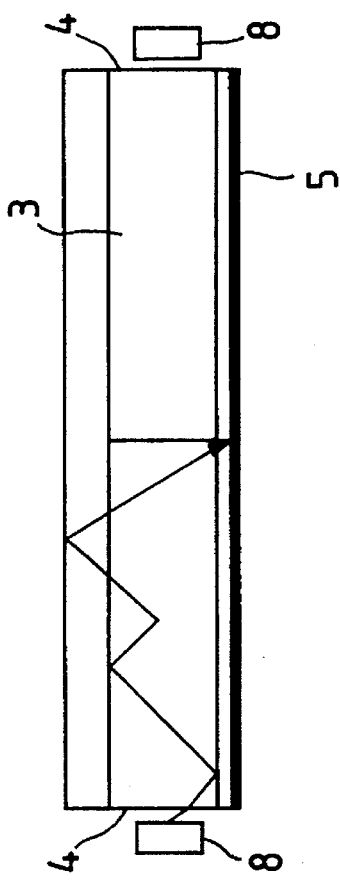
Figure 47C:
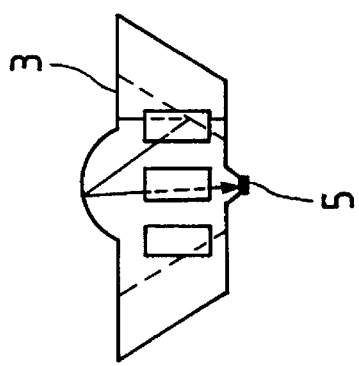

As shown in these drawings, the illumination device of the present embodiment is provided with the LED light sources 8 on both end faces of the translucent member 3 having a lens portion (light condensing portion). Said translucent member 3 is further provided, in a position opposite to said lens portion, with a protruding portion 35, and the area 5 is formed on the end face of said protruding portion 35. The cross section of the translucent member 3 is trapezoidal, with the shorter side closer to the area 5, bearing a convex lens portion thereon. On each end face, there are provided three LED light sources 8, one being at a position corresponding to the area 5 and remaining two being positioned on both sides thereof. Also in the illustrated device, the translucent member 3 is made thinner in the central portion in the longitudinal direction, than in the end portions thereof FIGS. 47A and 47B are respectively a schematic plan view and a schematic lateral view of the device of the present embodiment and FIGS. 47B and 47C respectively correspond to FIGS. 46A and 46C. In the present embodiment, as shown in these drawings, the outstretched portions of the translucent member decrease toward the center in the longitudinal direction, so that the cross sectional area of said member decreases from both ends thereof toward the center.

Figure 48B:
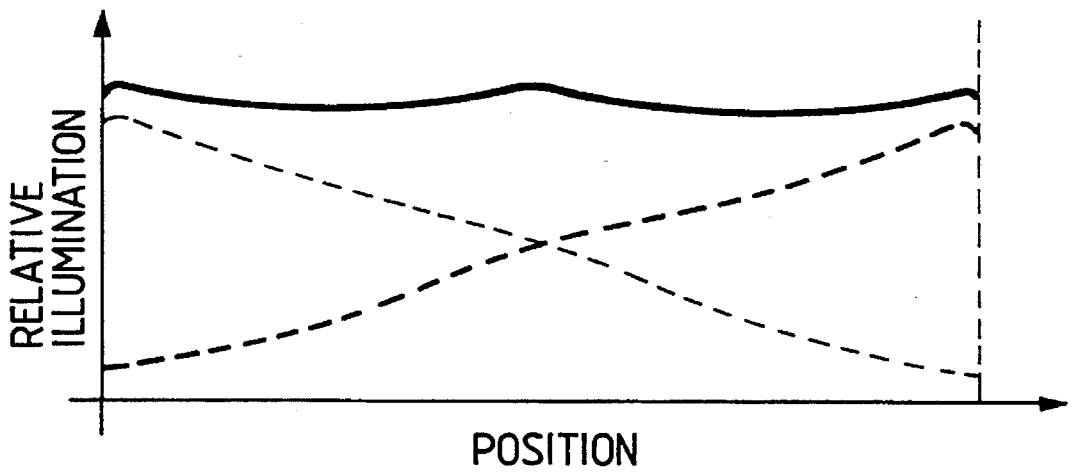

FIG. 48B shows the illumination intensity distribution of the above-explained illumination device, along the longitudinal direction of the translucent member 3. When the translucent member 3 is constricted in shape at the central portion as in the present embodiment, the illumination intensity in said central portion increases because the light emitted by the LED light source 8 at an end has a higher probability of entering the area 5 (namely becoming the indirect incident light) before reaching the other end. More specifically, the light proceeding from an end to the other by repeated reflections is eventually reflected by the inclined face 201 to constitute the indirect incident light, due to the decrease of the out-stretched portions. Consequently, in comparison with the case without such constriction, the amount of the incident light to the area 5 increases, whereby the illumination intensity over the entire area, particularly that in an area distant from the LED light source, can be increased.

The amount of said constriction is preferably determined in consideration of the length, thickness and cross sectional area of the translucent member, the width of the area 5, arrangement of the LED light source etc.

When the translucent member has the lens portion, it is desirable that said constriction does not affect the characteristics, for example the shape, of said lens portion, and it is also desirable to maintain a constant distance between the area 5 and the lens face.

Also the shape of said constriction may be linear as shown in the foregoing drawings, or may be curved or a combination of these shapes.

Figure 49:
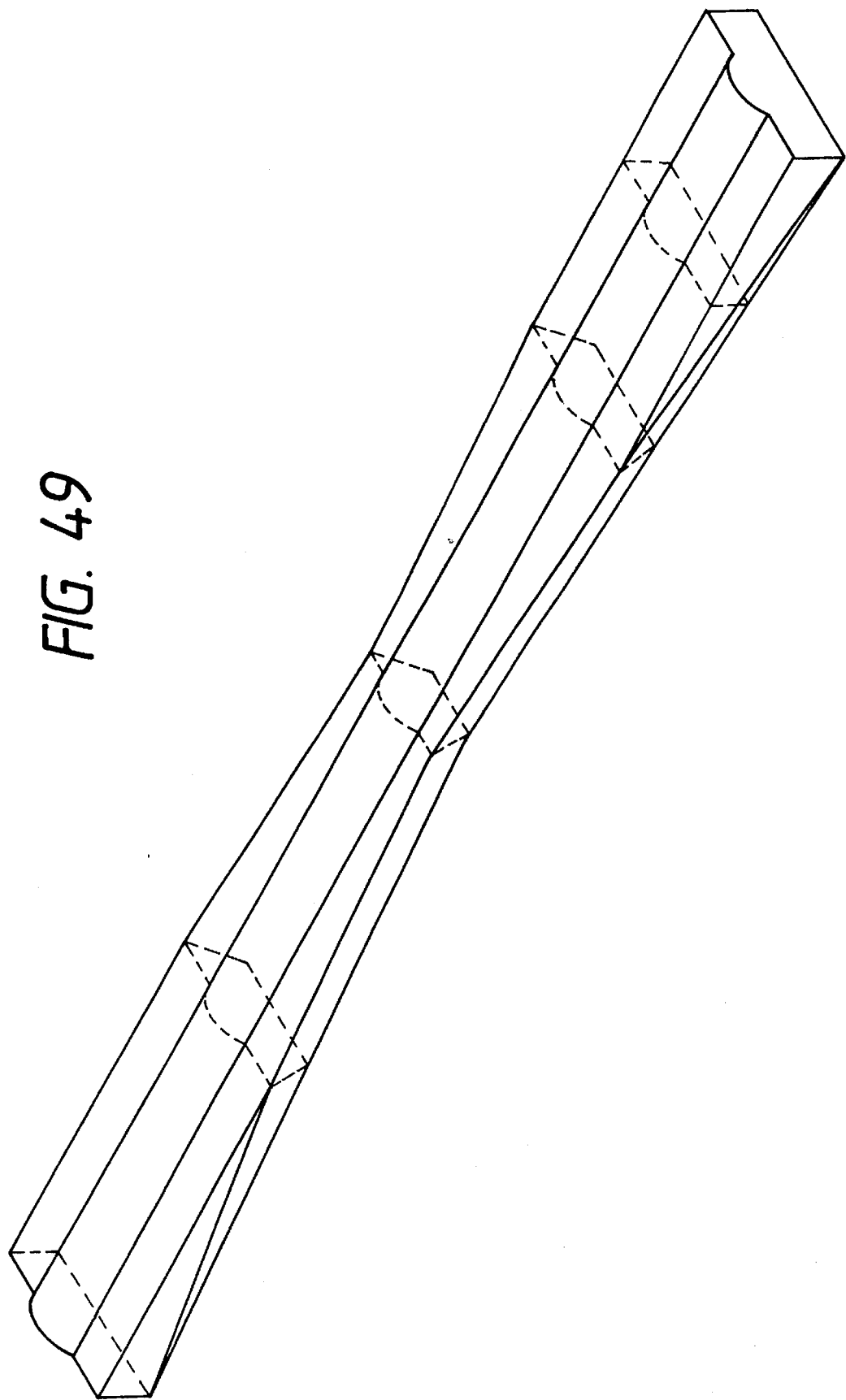
FIG. 49 is a view showing preferred embodiments of the light guide and the illumination device of the present invention.

Furthermore, the translucent member 3 may be formed as shown in FIG. 49. Said translucent member 3, excluding the lens portion, has a rectangular entrance end face for the light from the LED light source, and a trapezoidal cross section with the shorter side at the bottom, at the central portion in the longitudinal direction. In a position closer to the center from said entrance end face, the cross section is rectangular with cut-off lower corners, and said cut-off areas are progressively enlarged to develop into the inclined lateral faces of said trapezoidal cross section.

Such illustrated form can provide an illumination device having more uniform illumination intensity characteristics in the longitudinal direction.

Figure 50B:
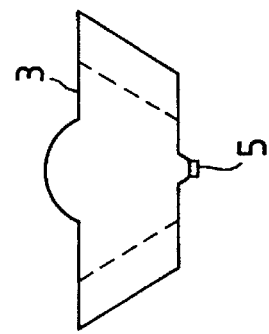
FIGS. 50A to 50C are views showing preferred embodiments of the light guide and the illumination device of the present invention.
Figure 50A:
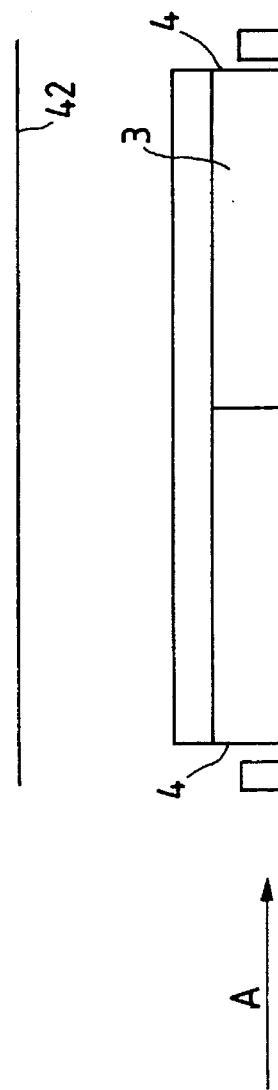
Figure 50C:
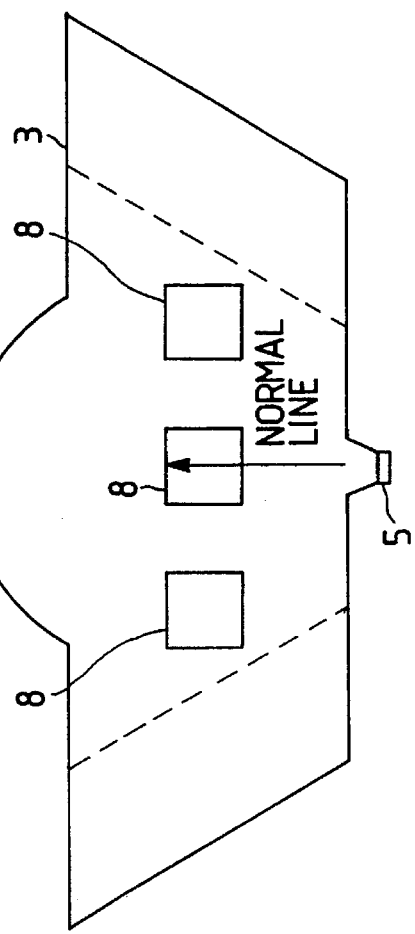

FIGS. 50A to 50C show a variation in which the area 5 of the illumination device shown in FIGS. 46A to 46C is changed from the diffusing surface to the sawtooth-shaped reflecting faces explained before. If the angle of the light condensing part, seen from the area 5, is sufficiently large (for example 60° or larger, though it depends on the depth and shape of the protruding portion), the incident angle to the area 5 becomes close to the perpendicular entry, but the sawtooth-shaped reflecting faces employed in the present embodiment reflect the incident light principally to the light condensing part, whereby the light emerges therefrom in a parallel or substantially parallel light beam. Consequently the configuration of the present embodiment provides an illumination device with a higher illumination intensity which is more uniform in the longitudinal direction.

FIGS. 51A to 51C show a variation in which a cylindrical lens 9 as the light condensing part is added to the illumination device shown in FIGS. 50A to 50C. Such configuration, being capable of further condensing the emerging parallel light beam, can illuminate the object surface with a further increased intensity.

[Embodiment 15]

In the following there will be explained the method of mounting the LED light source. In the foregoing embodiments there have been explained the arrangements of the LED light sources, but the specific mounting method therefor has not been explained. In the following there will be given a detailed explanation on such mounting method. Such mounting method is applicable to any of the aforementioned illumination devices, or to any variation or combination thereof.

In the mounting of the LED light source, there are required the mounting precisely at the designed position, a simple mounting process including the maintenance of precision, and the possibility of introduction of the light from the LED light source into the translucent member with minimum loss. The mounting method for the-LED light source has no particular limitation, as long as these requirements are met.

A simplest example of the mounting method is to adhere the LED chip onto the end face of the translucent member. However, such adhesion method does not allow easy replacement of the LED light source, and may lead to certain drawbacks such as peeling of adhesive or breakage of the LED due to the expansion and contraction resulting from variations in temperature and humidity, particularly when the translucent member is composed of a resinous material such as acrylic resin.

Also if the LED light source is positioned separate from the translucent member, there may result a light loss due to a variation in the distance between the LED light source and the end face of the translucent member, resulting from expansion and contraction thereof.

Figure 52:
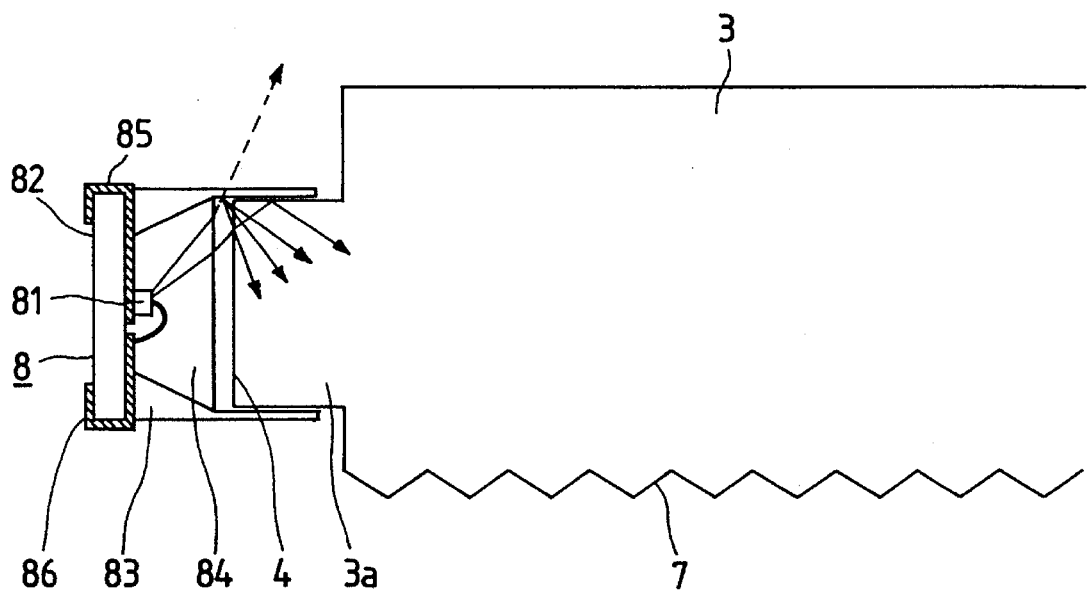
FIGS. 52 and 53 are schematic cross-sectional views showing preferred mounting methods of the light source.

FIG. 52 shows a mounting method capable of avoiding these drawbacks.

In this embodiment, as shown in FIG. 52, the translucent member 3 has a protruding portion 3a on the end face thereof, and the LED light source 8 is provided with a reflecting frame 83 extended so as to fit on said protruding portion 3a.

Such structure can avoid the light leakage to the exterior due to the presence of the reflecting frame 83, despite of the eventual presence of a gap between the external surface of transparent sealing resin 84 and the entrance end face 4 of the translucent member 3. Also since a part of the light reflected by said reflecting frame 83 enters the translucent member 3 through the entrance end face 4, the efficiency of utilizing of the light, emitted from the LED chip 81, can be improved. Said reflecting frame 83 may be adhered to the protruding portion 3a of the translucent member 3, but it is preferably fitted merely on the protruding portion, in order to relax the stress resulting from the expansion or contraction of the translucent member 3 and the reflecting frame 83.

Also the precision of positioning of the LED light source 8 can be improved by fitting said light source 8 onto the protruding portion 3a formed on the translucent member 3, and the mounting process can be simplified if the mount is conducted by mere fitting only.

Figure 53:
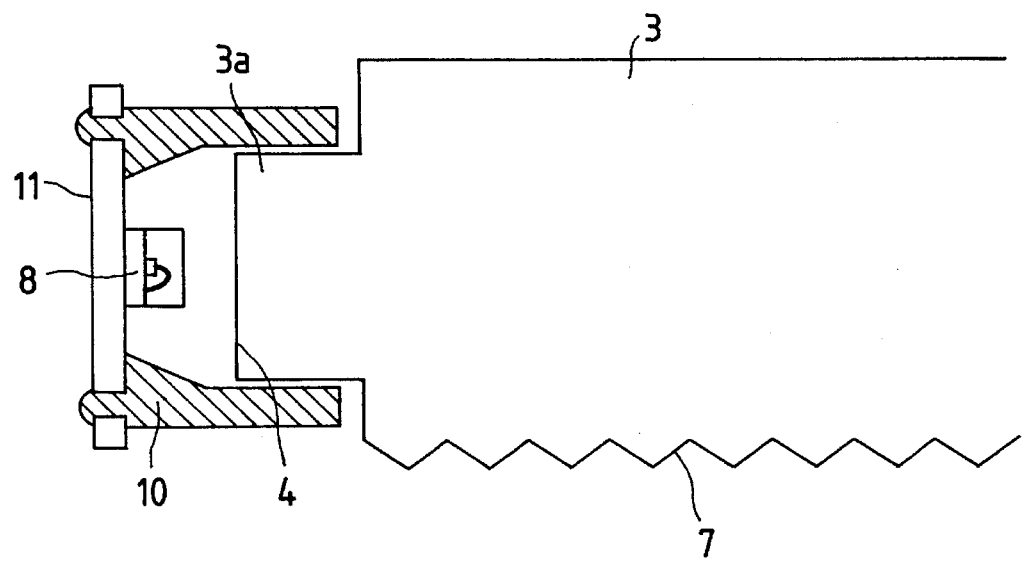

FIG. 53 shows a variation of the mounting method for the LED light source shown in FIG. 52. In this variation, the LED chip is surface mounted on a mounting board 11, and is surrounded by a reflecting frame 10, which is made of white resin or a metal integrated with said board 11 and is fitted on the protruding portion 3a.

Such configuration allows to obtain illuminating characteristics matching the requested performance in easier manner, since the protruding portion 3a can be formed with desired shape and size and the LED light source can be mounted on such protruding portion.

An additional reflecting portion may be formed in at least a part of the area, other than the mounting area for the LED light source. The presence of such reflecting portion causes the light, returning from the other end face of the translucent member, to continue the internal reflections without being released from the entrance end face, thereby improving the efficiency of light utilization.

The presence of the above-mentioned protruding portion 3a is not essential, but is preferable in consideration of the aforementioned improvement in the positioning accuracy. Said protruding portion 3a can be molded simultaneously with the formation of the translucent member 3, but it may also be formed, if necessary, by cutting and/or grinding.

The LED light Source may also be mounted by fitting into a recess formed on the entrance end face of the translucent member. Such mounting method causes a loss in a part of the light emitted from the LED chip, but is effective in the positioning precision and in a smaller protruding distance in the mounting portion.

Figure 54:
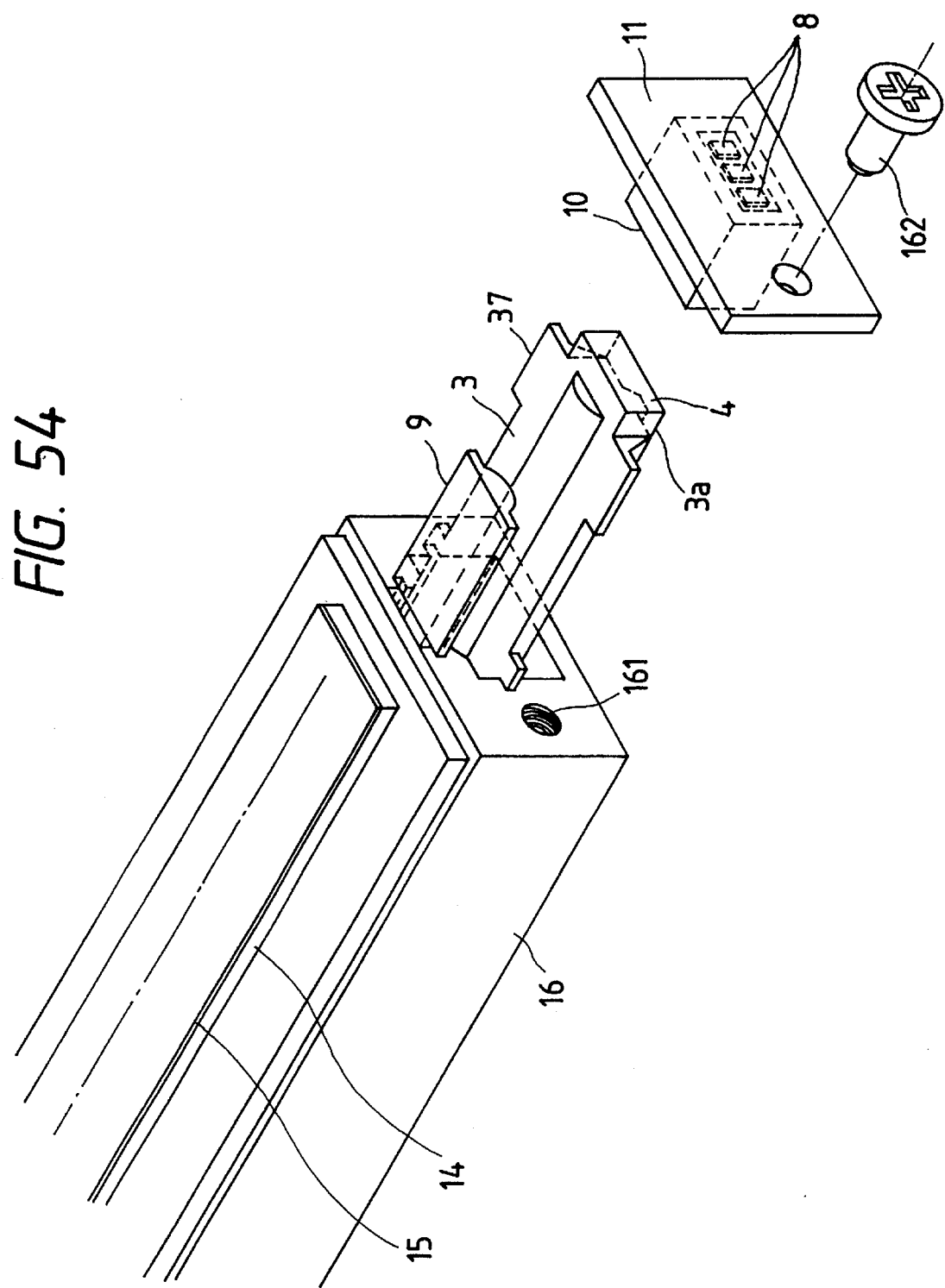
FIG. 54 is a view showing preferred embodiments of the light guide and the illumination device of the present invention.

FIG. 54 is a schematic perspective view of an example of the photoelectric converting device, utilizing the illumination device of the present invention shown in FIG. 53 and constituting an image reading device. There are shown a sensor substrate 14, a protecting glass 15, and a casing 16 of the photoelectric converting device. On said sensor substrate 14, there is provided a one-dimensional array (or plural arrays) of a plurality of photoelectric converting elements, which are formed utilizing a thin semiconductor layer for example of amorphous silicon or polysilicon. The protective glass 15 is provided on said plural photoelectric converting elements (not illustrated), for protecting said elements from eventual breakage caused by the contact with the moving original. The casing 16 is provided therein with a space for fitting with the illumination device and the cylindrical lens 9, Which are set in a predetermined position by insertion from an end face of the casing 16. The LED light sources 8 are mounted on a mounting board 11 and mounted on the protruding portion 3a of the translucent member 3 by fitting the reflecting frame 10 thereon, and said mounting board 11 is fixed by a screw 162 fitted into a threaded hole 161 formed on the casing.

The translucent member 3 is provided with mounting portions 37, engaging with the casing 16. Naturally said mounting portions 37 are not essential, nor are limited to the illustrated shape. Such mounting portions 37 may naturally be provided also in the translucent members 3 in the foregoing embodiments 1 to 14.

[Embodiment 16]

In the following there will be explained application of the illumination device of the present invention to an information processing apparatus.

Figure 55:
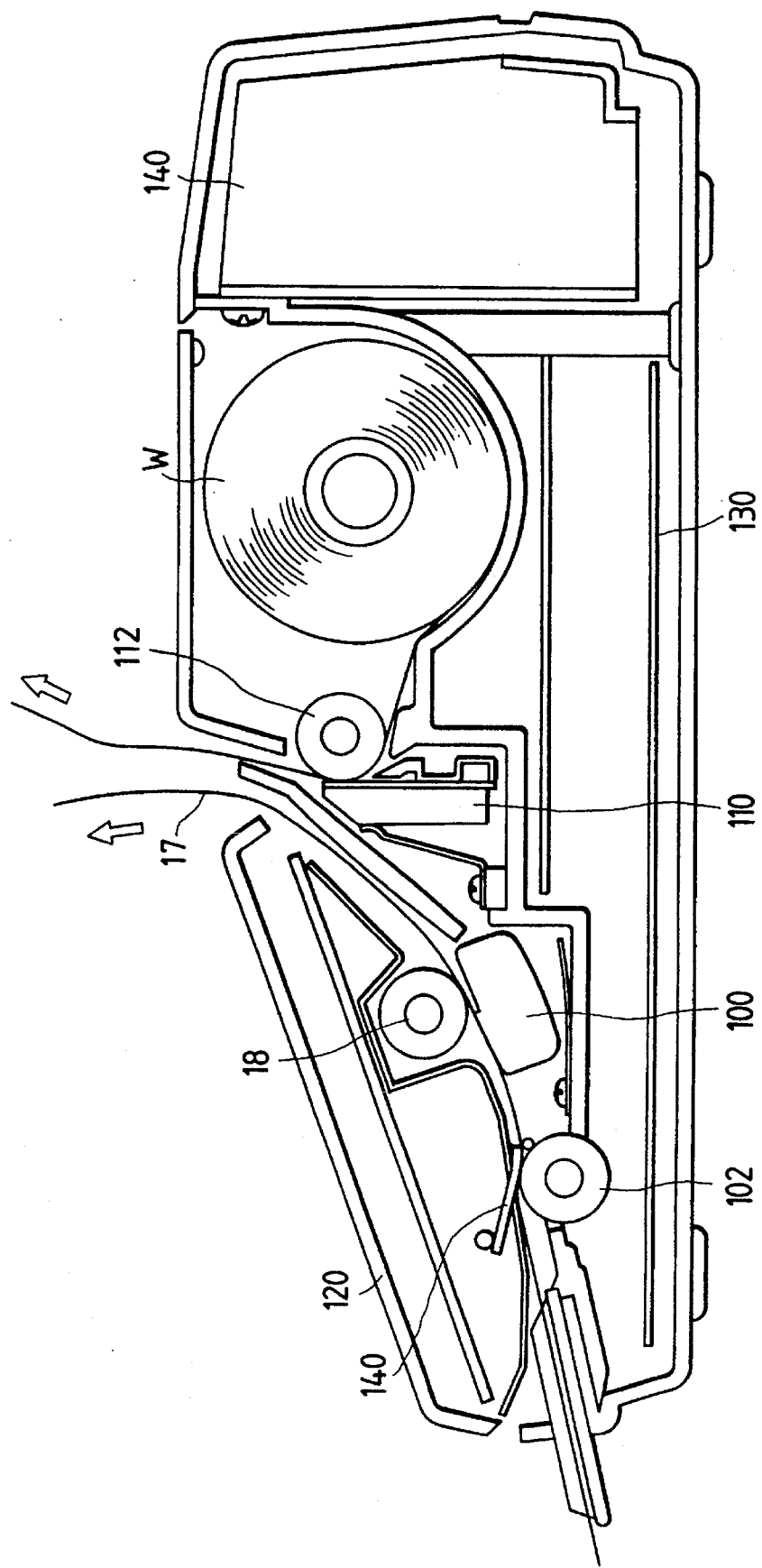
FIG. 55 is a schematic cross-sectional view of an information processing apparatus in which the illumination device of the present invention is applicable.

FIG. 55 illustrates an example of the information processing apparatus (for example a facsimile apparatus) utilizing the photoelectric converting device of the present invention.

There are shown a feed roller 102 for feeding an original 17 to a reading position; a separating member 104 for securely separating the originals P one by one; and a transport roller 18 provided at the image reading position of a photoelectric converting device 100, for defining the image reading plane of the original 17 and also serving to transport said original 17.

A recording medium W, in the form of rolled paper, is subjected to formation of an image read by the photoelectric converting device 100, or, in case of a facsimile, an image transmitted from the outside. A recording head 110, for said image formation, can be of various types such as a thermal head or an ink jet recording head. Also said recording head can be of serial type or of line type. A platen roller 112 is provided for transporting the recording medium W to the recording position by said recording head 110 and for defining the recording plane of said recording medium.

An operation panel 120 is provided with switches for entering commands for operations, and with a display unit for displaying messages and status of the apparatus.

There are further provided a system control board 130, provided thereon with a control unit for controlling various Units of the apparatus, a driving circuit for the photoelectric converting elements, a processing unit for the image information, a transmission-reception unit etc.; and a power source 140 for the apparatus.

Figure 56:
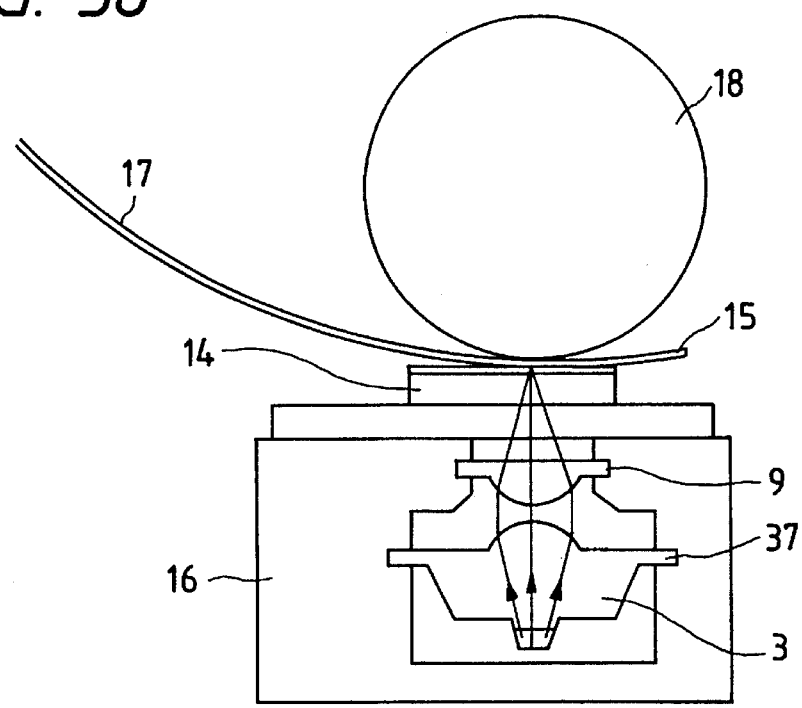
FIGS. 56 to 58 are schematic partial cross-sectional views showing information processing apparatus employing the illumination device of the present invention.
Figure 57:
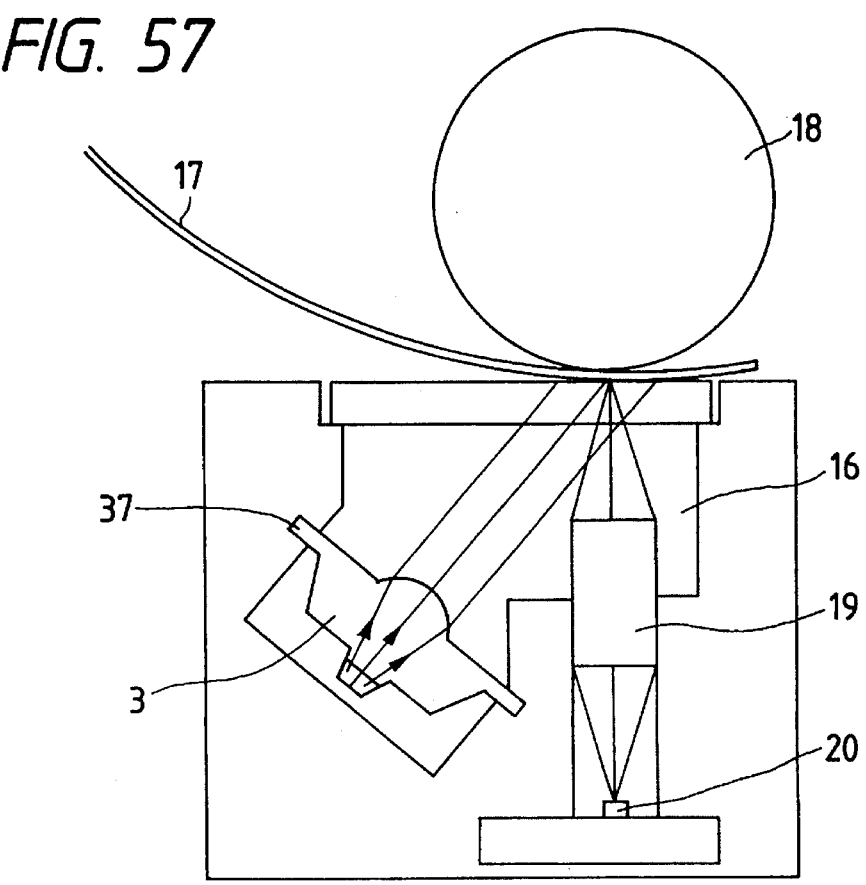

FIGS. 56 and 57 are schematic magnified views of the photoelectric converting device, employable in the information processing apparatus shown in FIG. 55. FIG. 56 shows the cause of a contact sensor, utilizing the photoelectric converting device (image reading device) shown in FIG. 54. FIG. 57 shows the case of a system employing an imaging optical system 19, wherein the original 17 is illuminated by the light emitted by illumination means of the embodiment 14 shown in FIGS. 46A to 46C, and the reflected light, corresponding to the image information, is focused on the photoelectric converting device 20 through the imaging optical system 19.

Figure 58:
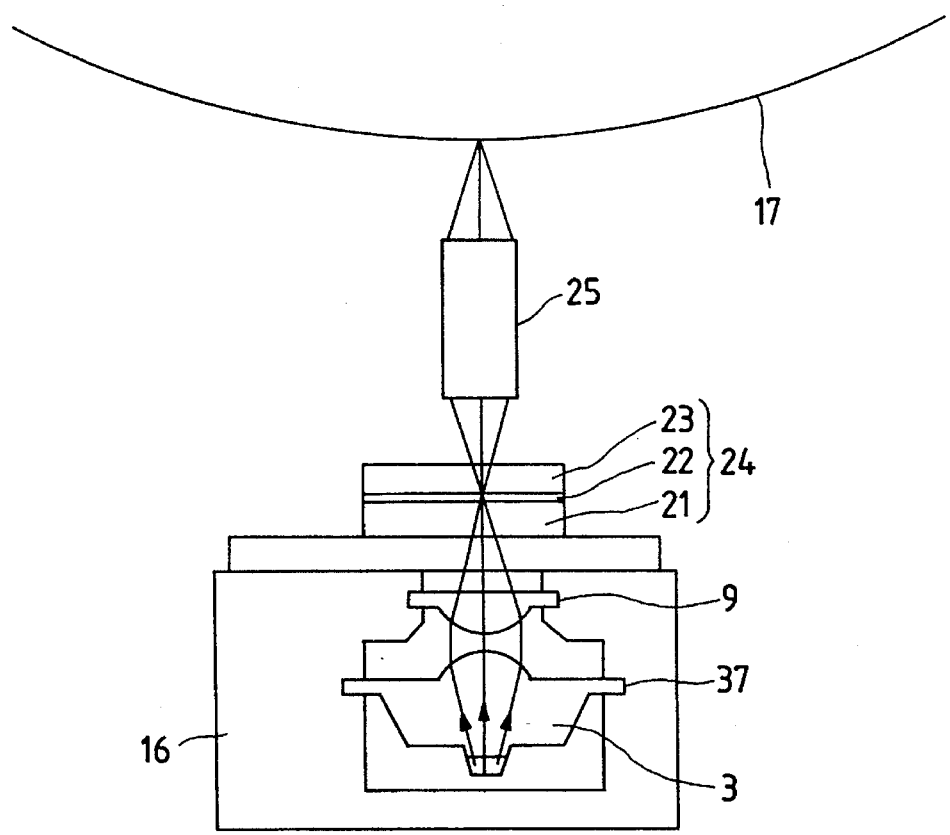

It is also possible, as shown in FIG. 58, to form an imaging optical system 25 at the original side, and to read the image by focusing, through a protective layer (protective glass) 23, on a photoelectric converting device 22 formed on a sensor substrate 21, utilizing a thin semiconductor layer.

In both cases, the original surface was illuminated with extremely uniform distribution of illumination intensity, so that the image could be read in an extremely excellent state.

Also other illumination devices explained in the foregoing embodiments 1 to 13 enables much superior image reading, in comparison with the case employing the conventional illumination devices.

The illumination device of the present invention, being capable of providing a sufficiently high light amount, is also suitable for color image reading. Also for modifying the color temperature or the hue of the illuminating light, a filter may be provided between the LED light source and the end face of the translucent member 3, or the translucent member itself may be dyed. In case of such dyeing, the entrance end face is preferably dyed, but, if surfacial dyeing is enough for the purpose, the light exit face of the translucent member is preferably dyed. This is because, if the entire translucent member is dyed or colored, the light is attenuated significantly in the course of internal reflections, whereby the light intensity becomes lower in the central portion or in a position distant from the LED light source.

For image output applicable to the information processing apparatus shown in FIG. 55, there can be considered, as explained above, the thermal transfer recording method or thermal recording method utilizing the thermal head, and the ink jet recording method utilizing the ink jet recording head.

In the following there will be explained an embodiment of the information processing apparatus, employing such recording head as the output means. The following explanation will be limited to the output part only.

Among various ink jet recording methods, the present invention brings about a particular effect when applied to a recording head of a system utilizing thermal energy for ink discharge because the entire information processing apparatus can fully enjoy the effect of compactization of the illumination device, as the recording head itself can be made compact.

The principle and representative configuration of said system are disclosed, for example, in the U.S. Pat. Nos. 4,723,129 and 4,740,796. This system is applicable to so-called on-demand recording or continuous recording, but is particularly effective in the on-demand recording because the entire apparatus can be compactized.

In brief, in this system, an electrothermal converting member positioned corresponding to a liquid channel or a sheet containing therein is given at least a drive signal, corresponding to the recording information and capable of causing a rapid temperature increase exceeding nucleus boiling, to generate thermal energy in said electrothermal converting member, thereby inducing film boiling on a heat action surface of the recording head and forming a bubble in the ink in one-to-one correspondence to said recording signal. The ink is discharged from a discharge opening by the growth and contraction of said bubble, thereby forming at least an ink droplet. Said signal is preferably formed as a pulse, as it realizes instantaneous growth and contraction of the bubble, thereby attaining highly responsive discharge of the ink.

Such pulse-shaped drive signal is preferably that disclosed in the U.S. Pat. Nos. 4,463,359 and 4,345,262. Also the conditions described in the U.S. Pat. No. 4,313,124 relative to the temperature increase rate of said heat action surface allows to obtain further improved recording.

The configuration of the recording head is given by the combinations of the ink discharge openings, liquid channels and electrothermal converter elements with linear or rectangular liquid channels, disclosed in the above-mentioned patents, but a configuration disclosed in the U.S. Pat. No. 4,558,333 in which the heat action part is positioned in a flexed area, and a configuration disclosed in the U.S. Pat. No. 4,459,600 also belong to the present invention.

Furthermore the present invention is effective in a structure disclosed in the Japanese Patent Laid-open Application No. 59-123670, having a slit common to plural electrothermal converter elements as a discharge opening therefor, or in a structure disclosed in the Japanese Patent Laid-open Application No. 59-138461, having an aperture for absorbing the pressure wave of thermal energy, in correspondence with each discharge opening.

A full-line type recording head, capable of simultaneously recording over the entire width of the recording sheet, may be obtained by plural recording heads so combined as to provide the required length as disclosed in the above-mentioned patents, or may be constructed as a single integrated recording head.

Furthermore there may be employed a recording head of interchangeable chip type, which can receive ink supply from the main apparatus and can be electrically connected therewith Upon mounting on said main apparatus, or a recording head of cartridge type in which an ink cartridge is integrally constructed with the recording head.

Also the information processing apparatus of the present invention is preferably provided with the discharge recovery means and other auxiliary means for the recording head In order to realize further advanced maintenance free system.

Examples of such means for the recording head include capping meant, cleaning means, pressurizing or suction means, heating means composed for example of an electrothermal converter element for heating the recording head, and means for effecting an idle ink discharge independent from the recording operation, all of which are effective for achieving stable recording operation.

Furthermore, the recording mode is not limited to recording of a single main color such as black, but also covers recording of plural colors or a full-color image, by means either of an integrally constructed recording head or of a combination of plural recording heads.

In the foregoing explanation, the ink is assumed to be liquid, but there may also be employed ink which is solid below room temperature but softens at room temperature. In the above-explained ink jet recording system, the ink itself is usually temperature controlled within a range of 30° C.–70° C. for maintaining the ink viscosity within a stable discharge range, so that the ink needs to be liquidous only when the recording signal is given. In addition there may also be employed ink which is intentionally changed from solid to liquid by heating with thermal energy.

In the following there will be given a brief explanation on an ink jet recording head, utilized in such ink discharge recording system utilizing thermal energy.

Figure 59:
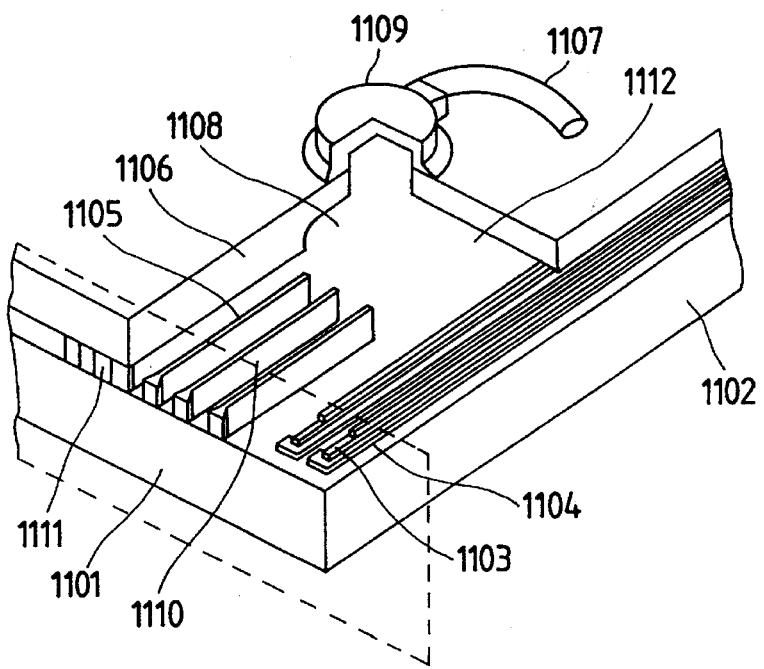
FIG. 59 is a schematic perspective view of an ink jet recording head applicable to the information processing apparatus of the present invention.

FIG. 59 is a schematic view of such ink jet recording head, composed of electrothermal converter elements 1103, electrodes 1104, liquid channels 1105 and a ceiling plate 106, formed on a substrate 1102 through a semiconductor process involving the steps of etching, evaporation sputtering etc. The recording ink 1112 is supplied from an unrepresented ink reservoir to a common ink chamber 1108 of the recording head 1101 through a supply pipe 1107, provided with a connector 1109 therefor.

The ink 1112 in the common ink chamber 1108 is supplied into the liquid channel 1110 by the capillary action, and is stably held therein, by forming a meniscus at the discharge opening (orifice) at the end thereof. Electric power supply to the electrothermal converter element 1103 rapidly heats the liquid thereon, thus forming a bubble in said liquid chamber, and the liquid is discharged from the opening 1111 by the expansion and contraction of said bubble, thereby forming a liquid droplet.

The above-explained configuration allows to arrange the discharge openings with a high density such as 16 nozzle/mm or even higher, whereby obtained is an ink jet head with 128 or 256 discharge openings, or even a full-line ink jet recording head having an array of the discharge openings over the entire recording width.

Figure 60:
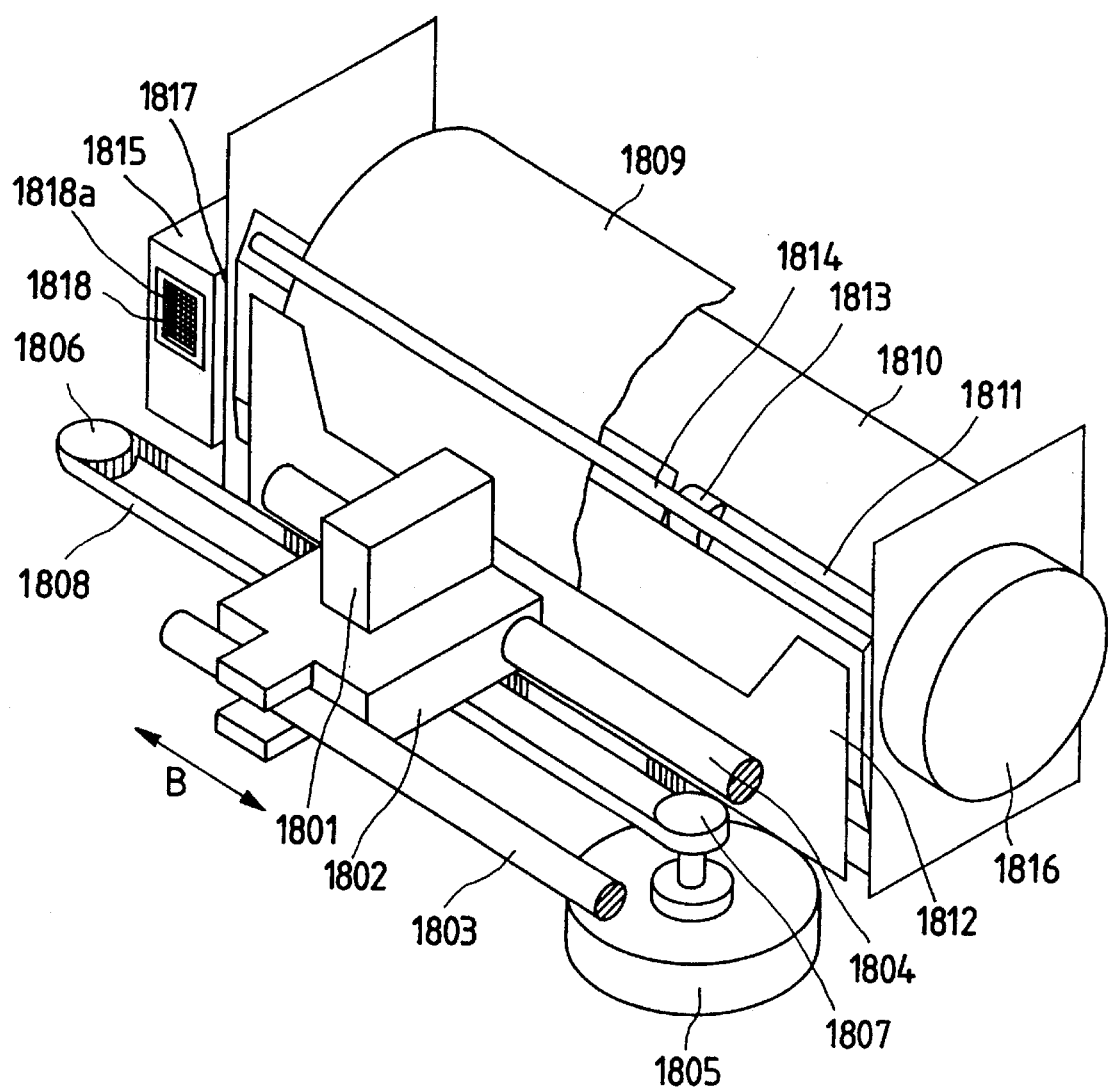
FIGS. 60 and 62 are schematic perspective views showing examples of the ink jet recording unit applicable to the information processing apparatus of the present invention.

FIG. 60 is a schematic perspective view of the external structure of an output unit utilizing the ink jet recording method.

In FIG. 60 there are shown an ink jet recording head 1801 for discharging ink according to the recording signals, thereby recording a desired image; and a carriage 1802 for moving said recording head 1801 in the recording (main scanning) direction. Said carriage 1802 is slidably supported by guide shafts 1803, 1804, and reciprocates in the main scanning direction by means of a timing belt 1808, which is supported by pulleys 1806, 1807 and driven by a carriage motor 1805 through said pulley 1807.

A recording sheet 1809 is guided by a paper pan 1810, and is pressed, by pinch rollers, to an unrepresented transport roller for transporting said sheet.

Said sheet transportation is achieved by a feeding motor 1816. The transported recording sheet 1809 is given a tension by a discharge roller 1813 and a grooved roller 1814, and is transported in close contact with a heater 1811, by means of an elastic pressure plate 1812. Thus the recording sheet 1809, bearing thereon the ink, discharged from the recording head 1801 and deposited on said sheet, is heated by the heater 1811, whereby said deposited ink is dried and fixed to the recording sheet 1809.

A recovery unit 1815 is provided for maintaining the proper ink discharge state of the recording head 1801, by removing the dusts and highly viscous ink, deposited on the discharge openings (not illustrated) of the recording head 1801.

A cap member 1818a, constituting a part of said recovery unit 1815, is provided to cap the discharge openings of the recording head 1801, thereby preventing the clogging of said openings. Inside said cap 1818a, there is preferably provided an ink absorbent member 1818.

At a side of the recovery unit 1815, closer to the recording area, there is provided a blade 1817 for coming into contact with a face, having the discharge openings, of the recording head 1801, thereby eliminating the dusts and ink sticking to said face.

Figure 61:
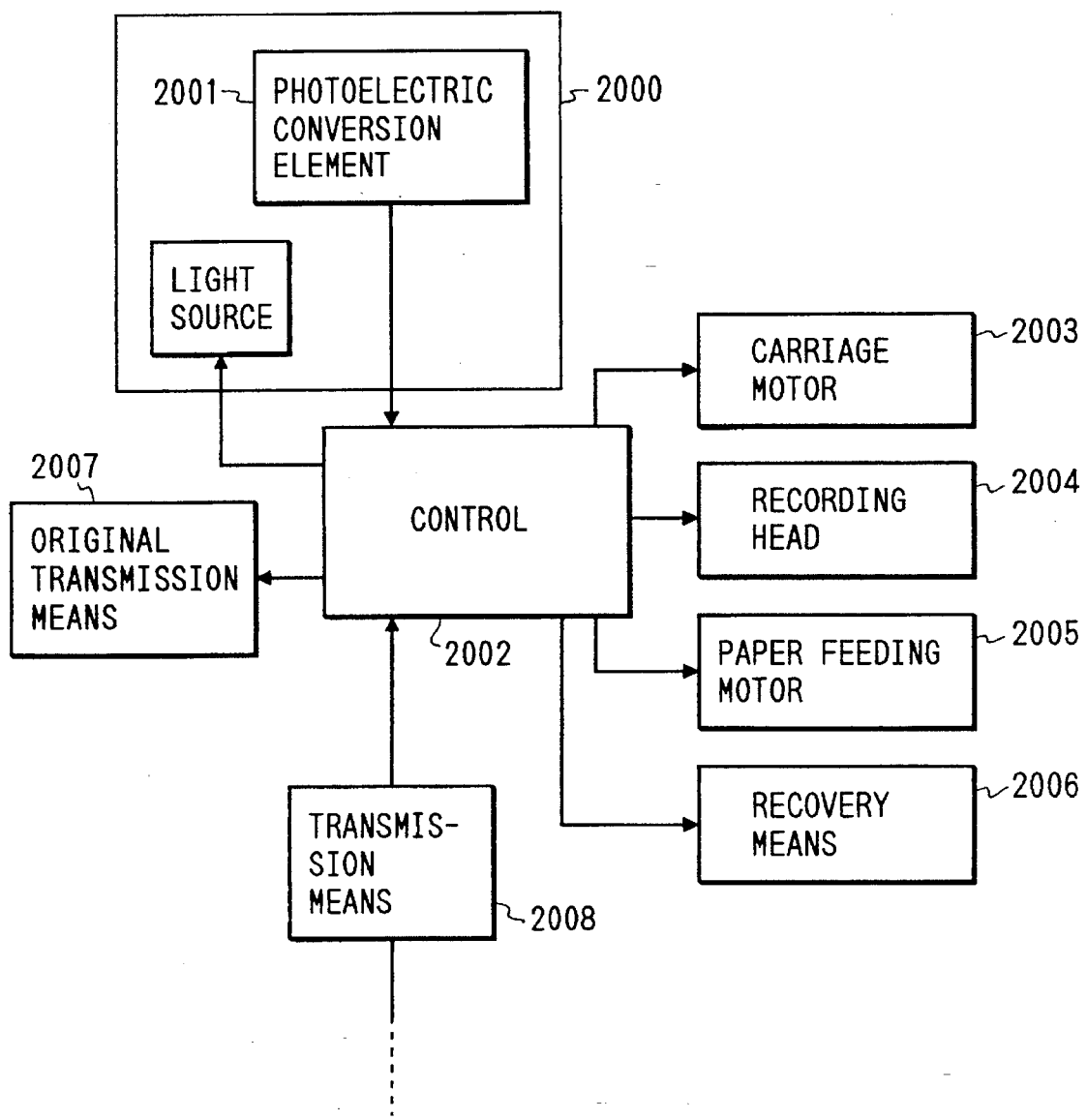
FIG. 61 is a block diagram showing an example of the configuration of the information processing apparatus of the present invention.

In the present invention, as shown in a block diagram shown in FIG. 61, the original transported by original transport means 2007 to the image reading part of an image reading device 2000 is read by photoelectric converter elements 2001 thereof, then thus obtained electrical signals bearing image information are converted by image processing means (not shown) into electrical signals for recording, and the recording operation is conducted by a controller such as a CPU 2000 controlling the carriage motor 2003, recording head 2004, sheet feeding motor 2005, recovery unit 2006 etc.

Said electrical signals bearing image information may be transmitted through communication means 2008 to another image processing apparatus for image output therein, or may be received from another information processing apparatus through said communication means 2008 and recorded by the above-mentioned recording head 2004.

Figure 62:
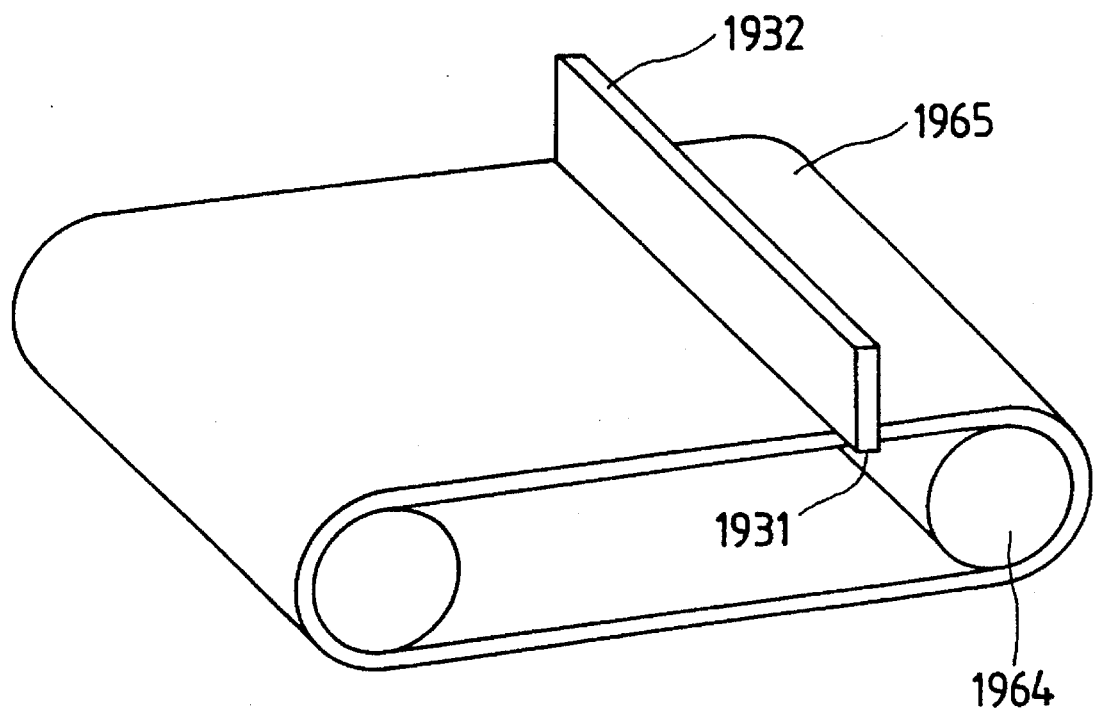

FIG. 62 schematically shows the output unit provided with a recording head 1932 of full-line type.

A conveyor belt 1965 transports an unrepresented recording medium, by the rotation of a transport roller 1932. The bottom face 1931 of the recording head 1932 is provided with a plurality of discharge openings, corresponding to the recording area of the recording medium.

Also in this case the recording operation can be conducted in a similar manner as in the recording head of serial type explained above.

Naturally the output units explained above are given as examples, and there can be conceived various modifications.

However the above-explained ink discharge system utilizing thermal energy, being capable not only of compactization but also of more highly precise recording, can exhibit the effect of the present invention more conspicuously, and can therefore provide an information processing apparatus excellent in overall performance.

As detailedly explained in the foregoing, the present invention can provide a compact illumination device capable of uniform illumination with a high intensity Also the present invention can provide an illumination device which is simple in structure and can simplify also the manufacturing process.

Furthermore the present invention can provide a photoelectric converting device and an information processing apparatus capable of stable image reading.

Furthermore the present invention can provide a secure mounting method for the light source, which is simplified in the mounting steps.

Furthermore the, present invention can realize a linear light source with reduced unevenness in the amount of illuminating light on the illuminated surface, thereby achieving improved tonal rendition without increasing the burden of image processing.

The present invention is subject to various modifications within the scope and spirit of the appended claims. Also the embodiments explained before may naturally be combined in suitable manner.

What is claimed is:

1. A light guide comprising a light transparent member provided, on an end portion thereof, with a light entrance face and, on a face along the longitudinal direction, different from said end portion, with a light exit face for emitting the introduced light, comprising an area provided along said longitudinal direction in a part of the side opposite to said light exit face and adapted to reflect and/or diffuse the light introduced into said light transparent member, said area being arranged so that a normal line passing through a center of a width of said area is shifted from a center of an edge and a surface parallel to the edge of said light guide.

2. A light guide according to claim 1, wherein said area is formed on an end face of a protruding portion formed on a face of the side opposite to said light exit face.

3. A light guide according to claim 1, wherein the cross section parallel 31 to said end portion of said light guide is substantially rectangular.

4. A light guide according to claim 1, wherein the cross section parallel 31 to said end portion of said light guide is substantially trapezoidal.

5. A light guide according to claim 1, wherein the cross section parallel to said end portion of said light guide is substantially rectangular in said end portion and is substantially trapezoidal in a central portion.

6. A light guide according to claim 1, wherein said area is formed with light reflecting paint.

7. A light guide according to claim 1, wherein said area is composed of a coarse surface.

8. A light guide according to claim 1, wherein said area comprises sawtooth-shaped reflecting faces.

9. A light guide according to claim 1, comprising a light condensing part at the side of said light exit face.

10. An illumination device comprising a translucent member provided, on an end portion thereof, with a light entrance face and, on a face along the longitudinal direction, different from said end portion, with a light exit face for emitting the introduced light; and a light source for emitting the light to be introduced from said light entrance face; wherein said translucent member comprises an area provided along said longitudinal direction in a part of the side opposite to said light exit face and adapted to reflect and/or diffuse the light introduced in said translucent member, and the center of said light source is placed in a position aberrated from the direction of the normal line to said area.

11. An illumination device according to claim 10, wherein said area is formed on an end face of a protruding portion formed on a face of the side opposite to said light exit face.

12. An illumination device according to claim 10, wherein the cross section parallel to said end portion of said translucent member is substantially rectangular.

13. An illumination device according to claim 10, wherein the cross section parallel to said end portion of said translucent member is substantially trapezoidal.

14. An illumination device according to claim 10, wherein the cross section parallel to said end portion of said translucent member is substantially rectangular in said end portion and is substantially trapezoidal in a central portion.

15. An illumination device according to claim 10, wherein said area is formed with light reflecting paint.

16. An illumination device according to claim 10, wherein said area is composed of a coarse surface.

17. An illumination device according to claim 10, wherein said area comprises sawtooth-shaped reflecting faces.

18. An illumination device according to claim 10, comprising a light condensing part at the side of said light exit face.

19. An illumination device according to claim 10, wherein said light entrance end portion is provided with a protruding portion adapted to fit with the light source.

20. An illumination device according to claim 10, wherein said light source is composed of a light-emitting diode.

21. An illumination device according to claim 10, wherein said translucent member is provided with a mounting portion.

22. An illumination device according to claim 10, comprising a casing fitting at least with said translucent member.

23. An information processing apparatus provided with:

(a) a photoelectric converting device having a plurality of photoelectric converting elements positioned opposite to the image of an original sheet to be read;

(b) an illumination device for illuminating said original sheet;

transport means for transporting said original (c) transport means for transporting said original sheet;

(d) an output unit for outputting to recording an image on according medium according to an electrical signal corresponding to an image information; and (e) a controller for controlling said photoelectric converting device, said light source, said transport means and said output unit, wherein, in said illumination means including a translucent member provided, on an end portion thereof, with a light entrance face and, on a face along the longitudinal direction, different from said end portion, with a light exit face for emitting the introduced light, and a light source provided along said longitudinal direction in a part of the side opposite to said light exit face and adapted to reflect and/or diffuse the light introduced in said translucent member, and the center of said light source is placed in a position aberrated from the direction of the normal line to said area.

24. An information processing apparatus according to claim 23, wherein said area is formed on an end face of a protruding portion formed on a face of the side opposite to said light exit face.

25. An information processing apparatus according to claim 23, wherein the cross section parallel to said end portion of said translucent member is substantially rectangular.

26. An information processing apparatus according to claim 23 wherein the cross section parallel to said end portion of said translucent member is substantially trapezoidal.

27. An information processing apparatus according to claim 23, wherein the cross section parallel to said end portion of said translucent member is substantially rectangular in said end portion and is substantially trapezoidal in a central portion.

28. An information processing apparatus according to claim 23, wherein aid area is formed with light reflecting paint.

29. An information processing apparatus according to claim 23, wherein aid area is composed of a coarse surface.

30. An information processing apparatus according to claim 23, wherein said area comprises saw-tooth-shaped reflecting faces.

31. An information processing apparatus according to claim 23, comprising a light condensing part at the side of said light exit face.

32. An information processing apparatus according to claim 23, wherein said light entrance end portion is provided with a protruding portion adapted to fit with the light source.

33. An information processing apparatus according to claim 23, wherein said light source is composed of a light-emitting diode.

34. An information processing apparatus according to claim 23, wherein to said translucent member is provided with a mounting portion.

35. An information processing apparatus according to claim 23, wherein said illumination means comprises a casing fitting at least with said translucent member.

36. An information processing apparatus according to claim 23, wherein s aid output unit comprises at least either of an ink jet recording head or a thermal recording head.

37. An information processing apparatus according to claim 36, wherein said ink jet recording head includes an electrothermal converting member for generating thermal energy for forming a bubble for discharging ink from said ink jet recording head.

38. An information processing apparatus according to claim 36, further comprising recovery means for rectifying discharge failure of said ink jet recording head and/or cleaning means for cleaning said ink jet recording head.

39. An information processing apparatus according to claim 38 wherein said recovery means includes capping means.

40. An information processing apparatus according to claim 40, wherein said capping means includes an ink absorbent member.

41. An information processing apparatus according to claim 38, wherein said cleaning means is composed of a cleaning blade.

42. An information processing apparatus according to claim 36, wherein said ink jet recording head is a full-line recording head.

43. An information processing apparatus according to claim 23, further comprising communication means controlled by said controller.

44. An information processing apparatus according to claim 23, further comprising a heater for heating the discharged recording sheet.

45. An image reading device including a translucent member provided, on an end portion thereof, with a light entrance face and, on a face along the longitudinal direction, different from said end portion, with a light exit face for emitting the introduced light, a light source for emitting the light to be introduced from said light entrance face, and a photoelectric converting device for receiving the light emitted from said light exit face and reflected by an illuminated surface, wherein said translucent member comprises an area provided along said longitudinal direction in a part of the side opposite to said light exit face and adapted to reflect and/or diffuse the light introduced in said translucent member, and the center of said light source is placed in a position aberrated from the direction of the normal line to said area.

46. An image readying device according to claim 45, wherein said area is formed on an end face of a protruding portion formed on a face of the side opposite to said light exit face.

47. An image reading device according to claim 45, wherein the cross section parallel to said end portion of said translucent member is substantially rectangular.

48. An image reading device according to claim 45, wherein the cross section parallel to said end portion of said translucent member is substantially trapezoidal.

49. An image reading device according to claim 45, wherein the cross section parallel to said end portion of said translucent member is substantially rectangular in said end portion and is substantially trapezoidal in a central portion.

50. An image reading device according to claim 45, wherein said area is formed with light reflecting paint.

51. An image reading device according to claim 45, wherein said area is composed of a coarse surface.

52. An image reading device according to claim 45, wherein said area comprises sawtooth-shaped reflecting faces.

53. An image reading device according to claim 45, comprising a light condensing part at the side of said light exit face.

54. An image reading device according to claim 45, wherein said light entrance end portion is provided with a protruding portion adapted to fit with the light source.

55. An image reading device according to claim 45, wherein said light source is composed of a light-emitting diode.

56. An image reading device according to claim 45, wherein said translucent member is provided with a mounting portion.

57. An image reading device according to claim 45, wherein said illumination device comprises a casing fitting at least with said translucent member.

58. A light guide comprising a light transparent member provided, on an end portion thereof, with a light entrance face and, on a face along the longitudinal direction, different from said end portion, with a light exit face for emitting the introduced light, comprising an area having a protruding section of said light transparent member provided along said longitudinal direction, and adapted to reflect and/or diffuse the light introduced into an end of said protruding section opposite to said light exit face.

59. A light guide according to claim 58, wherein said light guide, exclusive of the protruding section, has a substantially square or rectangular cross-sectional area.

60. A light guide according to claim 59, wherein said light guide, exclusive of the protruding section, has a substantially square or rectangular cross-sectional area at an end thereof, and a substantially trapezoidal cross-sectional area in a middle portion thereof.

61. A light guide according to claim 58, wherein said light guide, exclusive of the protruding section, has a substantially trapezoidal cross-sectional area.

62. A light guide according to claim 58, wherein said area is made of a light-reflective paint.

63. A light guide according to claim 58, wherein said area is a coarse surface.

64. A light guide according to claim 58, wherein said area has a light-reflective sawtoothed surface.

65. A light guide according to claim 58, further comprising a light-collecting section at a side of the light exit face.

* * * * *